US009898411B2

(12) United States Patent
Hooker et al.

(10) Patent No.: US 9,898,411 B2
(45) Date of Patent: Feb. 20, 2018

(54) CACHE MEMORY BUDGETED BY CHUNKS BASED ON MEMORY ACCESS TYPE

(71) Applicant: VIA ALLIANCE SEMICONDUCTOR CO., LTD., Shanghai (CN)

(72) Inventors: Rodney E. Hooker, Austin, TX (US); Douglas R. Reed, Austin, TX (US); John Michael Greer, Austin, TX (US); Colin Eddy, Austin, TX (US)

(73) Assignee: VIA ALLIANCE SEMICONDUCTOR CO., LTD., Shanghai (CN)

( * ) Notice: Subject to any disclaimer, the term of this patent is extended or adjusted under 35 U.S.C. 154(b) by 76 days.

(21) Appl. No.: 14/890,898

(22) PCT Filed: Dec. 14, 2014

(86) PCT No.: PCT/IB2014/003260
§ 371 (c)(1),
(2) Date: Nov. 12, 2015

(87) PCT Pub. No.: WO2016/097812
PCT Pub. Date: Jun. 23, 2016

(65) Prior Publication Data
US 2016/0350227 A1 Dec. 1, 2016

(51) Int. Cl.
*G06F 12/00* (2006.01)
*G06F 13/00* (2006.01)
(Continued)

(52) U.S. Cl.
CPC ...... *G06F 12/0864* (2013.01); *G06F 12/0223* (2013.01); *G06F 12/0846* (2013.01);
(Continued)

(58) Field of Classification Search
CPC .. G06F 12/0223; G06F 12/08; G06F 12/0864; G06F 2212/1021;
(Continued)

(56) References Cited

U.S. PATENT DOCUMENTS 5,255,384 A * 10/1993 Sachs .................... G06F 9/3802
                                                      711/207
5,353,425 A * 10/1994 Malamy ................ G06F 12/126
                                                      711/136
(Continued)

FOREIGN PATENT DOCUMENTS

CN  1662887 A  8/2005
CN  1746865 A  3/2006
(Continued)

OTHER PUBLICATIONS

Hajimiri, Hadi, et al. "Dynamic Cache Tuning for Efficient Memory Based Computing in Multicore Architectures." 2013 26th International Conference on VLSI Design and the 12th International Conference on Embedded Systems. Jan. 5, 2013. pp. 49-54.
(Continued)

*Primary Examiner* — Sheng-Jen Tsai
(74) *Attorney, Agent, or Firm* — McClure, Qualey & Rodack, LLP

(57) ABSTRACT

A set associative cache memory, comprising: an array of storage elements arranged as M sets by N ways, each set belongs in one of L mutually exclusive groups; an allocation unit allocates the storage elements in response to memory accesses that miss in the cache; each memory access has an associated memory access type (MAT) of a plurality of predetermined MAT; a mapping, for each group of the L mutually exclusive groups: for each MAT, associates the MAT with a subset of the N ways; and for each memory access, the allocation unit allocates into a way of the subset of ways that the mapping associates with the MAT of the
(Continued)

memory access and with one of the L mutually exclusive groups in which the selected set belongs.

16 Claims, 29 Drawing Sheets

(51) Int. Cl.
*G06F 13/28* (2006.01)
*G06F 12/0864* (2016.01)
*G06F 12/02* (2006.01)
*G06F 12/0846* (2016.01)
*G06F 12/0895* (2016.01)
*G06F 12/0862* (2016.01)
*G06F 12/123* (2016.01)
*G06F 12/126* (2016.01)
*G06F 12/128* (2016.01)

(52) U.S. Cl.
CPC ...... *G06F 12/0895* (2013.01); *G06F 12/0862* (2013.01); *G06F 12/123* (2013.01); *G06F 12/126* (2013.01); *G06F 12/128* (2013.01); *G06F 2212/1021* (2013.01); *G06F 2212/1041* (2013.01); *G06F 2212/1044* (2013.01); *G06F 2212/284* (2013.01); *G06F 2212/608* (2013.01); *G06F 2212/6082* (2013.01)

(58) Field of Classification Search
CPC ....... G06F 2212/1041; G06F 2212/284; G06F 2212/608; G06F 12/0846; G06F 12/0862; G06F 12/0895; G06F 12/123; G06F 12/126; G06F 12/128; G06F 2212/1044
USPC ........................................................ 711/128
See application file for complete search history.

(56) References Cited

U.S. PATENT DOCUMENTS

| | | | |
|---|---|---|---|
| 5,584,014 A | 12/1996 | Nayfeh et al. | |
| 5,890,211 A | 3/1999 | Sokolov et al. | |
| 6,047,358 A * | 4/2000 | Jacobs | G06F 12/126 |
| | | | 711/128 |
| 6,055,605 A | 4/2000 | Sharma et al. | |
| 6,138,209 A | 10/2000 | Krolak et al. | |
| 6,223,256 B1 | 4/2001 | Gaither | |
| 6,240,488 B1* | 5/2001 | Mowry | G06F 9/383 |
| | | | 711/128 |
| 6,272,595 B1 | 8/2001 | Rosen et al. | |
| 6,370,622 B1* | 4/2002 | Chiou | G06F 12/0831 |
| | | | 711/119 |
| 6,681,295 B1 | 1/2004 | Root et al. | |
| 7,711,901 B2* | 5/2010 | Shannon | G06F 12/128 |
| | | | 711/122 |
| 7,783,836 B2* | 8/2010 | Wang | G06F 12/123 |
| | | | 711/133 |
| 7,930,484 B2* | 4/2011 | Thompson | G06F 9/30032 |
| | | | 711/125 |
| 8,335,122 B2* | 12/2012 | Dreslinski, Jr. | G06F 12/0864 |
| | | | 365/226 |
| 8,412,885 B2 | 4/2013 | Cheng et al. | |
| 9,275,714 B1* | 3/2016 | Kim | G11C 11/1673 |
| 2002/0194433 A1* | 12/2002 | Yamazaki | G06F 12/121 |
| | | | 711/136 |
| 2003/0023827 A1 | 1/2003 | Palanca et al. | |
| 2003/0079087 A1 | 4/2003 | Kuwata | |
| 2003/0217229 A1* | 11/2003 | Rowlands | G06F 12/082 |
| | | | 711/129 |
| 2003/0225976 A1* | 12/2003 | Hokenek | G06F 12/0842 |
| | | | 711/133 |
| 2004/0006669 A1 | 1/2004 | Endo et al. | |
| 2004/0059875 A1* | 3/2004 | Garg | G06F 12/0806 |
| | | | 711/141 |
| 2004/0133746 A1* | 7/2004 | Edirisooriya | G06F 12/126 |
| | | | 711/133 |
| 2004/0143708 A1* | 7/2004 | Caprioli | G06F 12/125 |
| | | | 711/136 |
| 2005/0198442 A1 | 9/2005 | Mandler | |
| 2005/0223173 A1* | 10/2005 | Yamazaki | G06F 12/123 |
| | | | 711/128 |
| 2005/0268076 A1* | 12/2005 | Henry | G06F 9/30058 |
| | | | 712/239 |
| 2006/0004963 A1* | 1/2006 | Mattina | G06F 12/084 |
| | | | 711/130 |
| 2006/0041720 A1 | 2/2006 | Hu et al. | |
| 2007/0260818 A1* | 11/2007 | Damaraju | G06F 12/0864 |
| | | | 711/128 |
| 2008/0037356 A1 | 2/2008 | Kajigaya | |
| 2008/0114941 A1 | 5/2008 | Nishlyama | |
| 2008/0229070 A1 | 9/2008 | Charra et al. | |
| 2009/0113132 A1* | 4/2009 | Cain, III | G06F 12/127 |
| | | | 711/133 |
| 2009/0144503 A1 | 6/2009 | Faucher et al. | |
| 2009/0172289 A1* | 7/2009 | Yamamura | G06F 12/127 |
| | | | 711/128 |
| 2010/0070714 A1* | 3/2010 | Hoover | G06F 12/0842 |
| | | | 711/128 |
| 2010/0077153 A1 | 3/2010 | Archambault et al. | |
| 2010/0191916 A1* | 7/2010 | Balakrishnan | G06F 12/0808 |
| | | | 711/134 |
| 2010/0275044 A1* | 10/2010 | Balakrishnan | G06F 1/3203 |
| | | | 713/320 |
| 2010/0306473 A1* | 12/2010 | Luick | G06F 12/0888 |
| | | | 711/122 |
| 2010/0318742 A1 | 12/2010 | Plondke et al. | |
| 2011/0010502 A1* | 1/2011 | Wang | G06F 12/121 |
| | | | 711/128 |
| 2011/0010503 A1* | 1/2011 | Yamamura | G06F 12/121 |
| | | | 711/128 |
| 2011/0055485 A1* | 3/2011 | Eddy | G06F 12/0864 |
| | | | 711/128 |
| 2011/0055827 A1 | 3/2011 | Lin et al. | |
| 2011/0072218 A1 | 3/2011 | Manne et al. | |
| 2011/0258391 A1* | 10/2011 | Atkisson | G06F 11/108 |
| | | | 711/118 |
| 2011/0276762 A1* | 11/2011 | Daly | G06F 12/0804 |
| | | | 711/122 |
| 2012/0030430 A1 | 2/2012 | Hayashi | |
| 2012/0054442 A1 | 3/2012 | Walker | |
| 2012/0191924 A1 | 7/2012 | Iaculo et al. | |
| 2013/0151780 A1* | 6/2013 | Daly | G06F 12/0897 |
| | | | 711/122 |
| 2013/0219125 A1 | 8/2013 | Kusters et al. | |
| 2013/0282987 A1 | 10/2013 | Koob et al. | |
| 2013/0297876 A1* | 11/2013 | Yu | G06F 12/126 |
| | | | 711/122 |
| 2014/0129778 A1* | 5/2014 | Duggins | G06F 12/084 |
| | | | 711/134 |
| 2014/0143495 A1* | 5/2014 | Olson | G06F 12/0802 |
| | | | 711/126 |
| 2014/0181412 A1* | 6/2014 | Thottethodi | G06F 12/0848 |
| | | | 711/133 |
| 2014/0189244 A1* | 7/2014 | Grayson | G06F 12/0891 |
| | | | 711/128 |
| 2014/0281248 A1 | 9/2014 | Alameldeen et al. | |
| 2016/0196214 A1* | 7/2016 | Hooker | G06F 12/0877 |
| | | | 711/128 |
| 2016/0283376 A1* | 9/2016 | Reed | G06F 13/14 |
| 2016/0350227 A1* | 12/2016 | Hooker | G06F 12/0223 |
| 2016/0350228 A1* | 12/2016 | Hooker | G06F 12/0864 |
| 2016/0350229 A1* | 12/2016 | Reed | G06F 12/00 |
| 2016/0357664 A1* | 12/2016 | Reed | G06F 12/0864 |
| 2016/0357680 A1* | 12/2016 | Hooker | G06F 8/4442 |
| 2016/0357681 A1* | 12/2016 | Reed | G06F 12/0864 |
| 2017/0026266 A1* | 1/2017 | Krutsch | H04L 43/0817 |

FOREIGN PATENT DOCUMENTS

| | | |
|---|---|---|
| CN | 101046775 | 10/2007 |
| CN | 101763316 A | 6/2010 |

(56) References Cited

FOREIGN PATENT DOCUMENTS

| GB | 2311880 A | 10/1997 |
|----|-----------|---------|
| JP | 2002373115 | 12/2002 |
| WO | WO2001050273 A1 | 7/2001 |
| WO | WO2010027549 A1 | 3/2010 |
| WO | WO2013155673 | 10/2013 |

OTHER PUBLICATIONS

Ravindran, Rajiv et al. "Compiler-Managed Partitioned Data Caches for Low Power." Proceedings of the 2007 ACM SIGPLAN/SIGBED Conference on Languages, Compiler, and Tools for Embedded Systems. *LCTES*'07. Jun. 13-15, 2007. pp. 237-247 San Diego, CA.

Zhang, Chuanjun et al. "Divide-and-Conquer: A Bubble Replacement for Low Level Caches." Proceedings of the 2009 ACM Sigarch International Conference on Supercomputing. Yorktown Heights, New York. Jun. 8-12, 2009. pp. 80-89.

Basu, Arkaprava et al. "FreshCache:Statically and Dynamically Exploiting Dataless Ways." Downloaded Jan. 10, 2014 from http://research.cs.wisc.edu/multifacet/papers/iccd13_freshcache.pdf pp. 1-8.

PCT/IB2014/003219. International Search Report (ISR) and Written Opinion (WO). Provided by State Intellectual Property Office of the P.R. China. dated Sep. 9, 2015. pp. 1-8.

PCT/IB2014/003261. International Search Report (ISR) and Written Opinion (WO). Provided by State Intellectual Property Office of the P.R. China. dated Sep. 24, 2015. pp. 1-8.

PCT/IB2014/003260. International Search Report (ISR) and Written Opinion (WO). Provided by State Intellectual Property Office of the P.R. China. dated Sep. 24, 2015. pp. 1-8.

PCT/IB2014/003220. International Search Report (ISR) and Written Opinion (WO). Provided by State Intellectual Property Office of the P.R. China. dated Aug. 28, 2015. pp. 1-9.

PCT/IB2014/003221. International Search Report (ISR) and Written Opinion (WO). Provided by State Intellectual Property Office of the P.R. China. dated Sep. 9, 2015. pp. 1-9.

\* cited by examiner

| | MEMORY ACCESS TYPE (MAT) | SUBSET OF WAYS |
|---|---|---|
| 0 | BOXPF | 15 |
| 1 | FP_LOAD | 0-8 |
| 2 | FP_STORE | 0-8 |
| 3 | FUSED_FP_STORE | 0-8 |
| 4 | FUSED_LOAD | 0-12 |
| 5 | FUSED_STORE | 0-12 |
| 6 | FUSED_STORE_APS | 6-10 |
| 7 | FUSED_STORE_UPDATE | 0-3 |
| 8 | GPF | 15 |
| 9 | L1DPF | 14 |
| 10 | LOAD | 0-15 |
| 11 | LOAD_APS | 6-10 |
| 12 | LOAD_DESCR | 15 |
| 13 | LOAD_NAC | 1,2,4 |
| 14 | LOAD_NT | 0, 4, 8 |
| 15 | LOAD_STORE | 6-12 |
| 16 | LOAD_SUPERVISOR | 5 |
| 17 | LOAD_ZX | 7 |
| 18 | PF_L1D | 13 |
| 19 | PF_L2 | 12 |
| 20 | PF_NT | 11 |
| 21 | PF_W | 10 |
| 22 | STORE | 0-15 |
| 23 | STORE_APS | 6-10 |
| 24 | STORE_MASK | 9 |
| 25 | STORE_NT | 0, 4, 8 |
| 26 | STORE_NT_APS | 6-10 |
| 27 | STORE_PUSH | 15 |
| 28 | STORE_SUPERVISOR | 5 |
| 29 | STORE_UPDATE | 0-3 |
| 30 | STORE_UPDATE_NAC | 3 |
| 31 | TABLEWALK | 15 |

*FIG. 22C*  PARCELS GLOBAL TO ALL SETS OF THE ARRAY
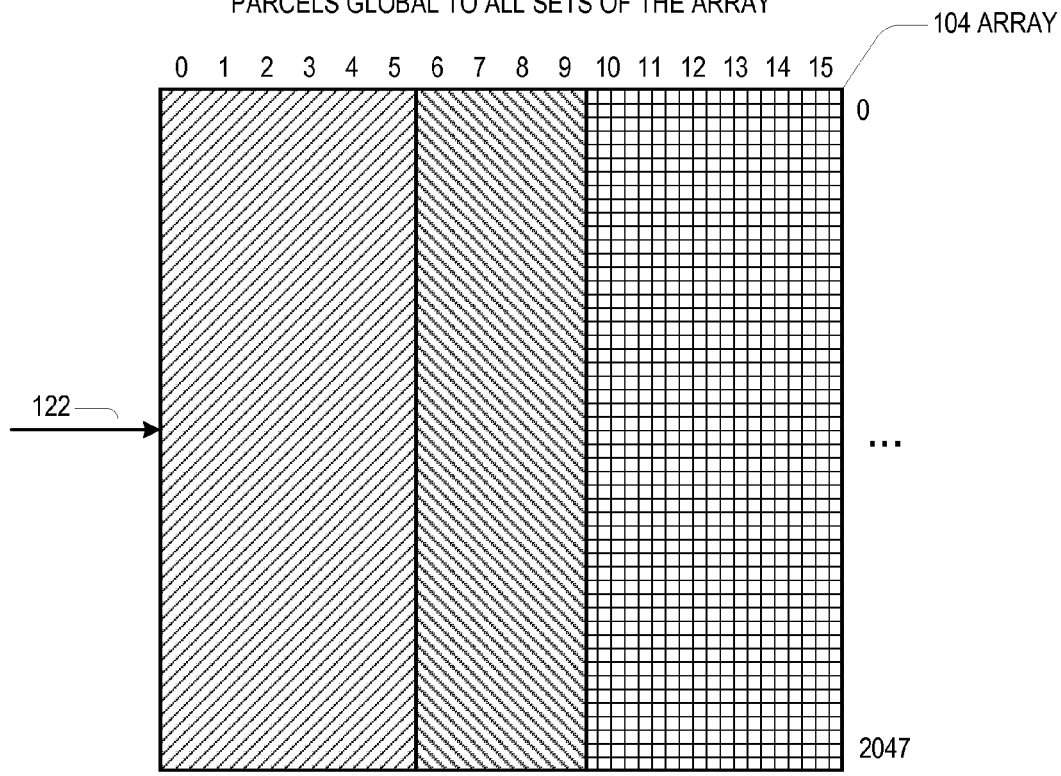
SETS WITH PARCELS SPECIFIED BY PARCEL SPECIFIER 1
SETS WITH PARCELS SPECIFIED BY PARCEL SPECIFIER 2
SETS WITH PARCELS SPECIFIED BY PARCEL SPECIFIER 3

FIG. 22E

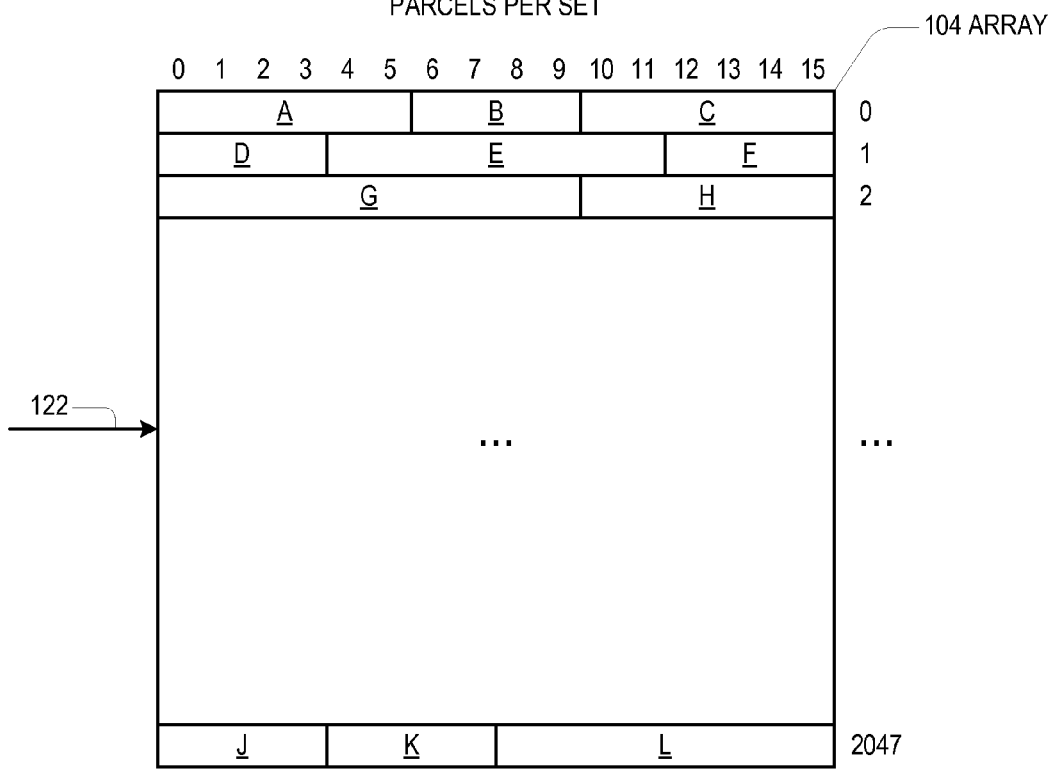

| A | SETS WITH PARCELS SPECIFIED BY PARCEL SPECIFIER 1 |
| B | SETS WITH PARCELS SPECIFIED BY PARCEL SPECIFIER 2 |
| C | SETS WITH PARCELS SPECIFIED BY PARCEL SPECIFIER 3 |
| D | SETS WITH PARCELS SPECIFIED BY PARCEL SPECIFIER 4 |
| E | SETS WITH PARCELS SPECIFIED BY PARCEL SPECIFIER 5 |
| F | SETS WITH PARCELS SPECIFIED BY PARCEL SPECIFIER 6 |
| G | SETS WITH PARCELS SPECIFIED BY PARCEL SPECIFIER 7 |
| H | SETS WITH PARCELS SPECIFIED BY PARCEL SPECIFIER 8 |
| J | SETS WITH PARCELS SPECIFIED BY PARCEL SPECIFIER 9 |
| K | SETS WITH PARCELS SPECIFIED BY PARCEL SPECIFIER 10 |
| L | SETS WITH PARCELS SPECIFIED BY PARCEL SPECIFIER 11 |

| | MEMORY ACCESS TYPE (MAT) | THRESHOLD |
|---|---|---|
| 0 | BOXPF | 50 |
| 1 | FP_LOAD | 70 |
| 2 | FP_STORE | 70 |
| 3 | FUSED_FP_STORE | 70 |
| 4 | FUSED_LOAD | 90 |
| 5 | FUSED_STORE | 90 |
| 6 | FUSED_STORE_APS | 300 |
| 7 | FUSED_STORE_UPDATE | 30 |
| 8 | GPF | 45 |
| 9 | L1DPF | 35 |
| 10 | LOAD | 150 |
| 11 | LOAD_APS | 44 |
| 12 | LOAD_DESCR | 73 |
| 13 | LOAD_NAC | 99 |
| 14 | LOAD_NT | 90 |
| 15 | LOAD_STORE | 76 |
| 16 | LOAD_SUPERVISOR | 321 |
| 17 | LOAD_ZX | 67 |
| 18 | PF_L1D | 21 |
| 19 | PF_L2 | 59 |
| 20 | PF_NT | 102 |
| 21 | PF_W | 115 |
| 22 | STORE | 450 |
| 23 | STORE_APS | 33 |
| 24 | STORE_MASK | 90 |
| 25 | STORE_NT | 5 |
| 26 | STORE_NT_APS | 45 |
| 27 | STORE_PUSH | 56 |
| 28 | STORE_SUPERVISOR | 88 |
| 29 | STORE_UPDATE | 98 |
| 30 | STORE_UPDATE_NAC | 33 |
| 31 | TABLEWALK | 100 |

| | MEMORY ACCESS TYPE (MAT) | MAT GROUP 2909 |
|---|---|---|
| 0 | BOXPF | 0 |
| 1 | FP_LOAD | 1 |
| 2 | FP_STORE | 1 |
| 3 | FUSED_FP_STORE | 1 |
| 4 | FUSED_LOAD | 1 |
| 5 | FUSED_STORE | 1 |
| 6 | FUSED_STORE_APS | 0 |
| 7 | FUSED_STORE_UPDATE | 2 |
| 8 | GPF | 3 |
| 9 | L1DPF | 0 |
| 10 | LOAD | 1 |
| 11 | LOAD_APS | 0 |
| 12 | LOAD_DESCR | 3 |
| 13 | LOAD_NAC | 3 |
| 14 | LOAD_NT | 3 |
| 15 | LOAD_STORE | 1 |
| 16 | LOAD_SUPERVISOR | 2 |
| 17 | LOAD_ZX | 1 |
| 18 | PF_L1D | 1 |
| 19 | PF_L2 | 1 |
| 20 | PF_NT | 1 |
| 21 | PF_W | 1 |
| 22 | STORE | 1 |
| 23 | STORE_APS | 0 |
| 24 | STORE_MASK | 3 |
| 25 | STORE_NT | 3 |
| 26 | STORE_NT_APS | 3 |
| 27 | STORE_PUSH | 2 |
| 28 | STORE_SUPERVISOR | 2 |
| 29 | STORE_UPDATE | 2 |
| 30 | STORE_UPDATE_NAC | 3 |
| 31 | TABLEWALK | 3 |

| MAT GROUP 2909 | THRESHOLD 2998 |
|---|---|
| 0 | 400 |
| 1 | 60 |
| 2 | 40 |
| 3 | 12 |

| | MEMORY ACCESS TYPE (MAT) | MAT PRIORITY 3277 |
|---|---|---|
| 0 | BOXPF | 6 |
| 1 | FP_LOAD | 1 |
| 2 | FP_STORE | 1 |
| 3 | FUSED_FP_STORE | 1 |
| 4 | FUSED_LOAD | 3 |
| 5 | FUSED_STORE | 1 |
| 6 | FUSED_STORE_APS | 0 |
| 7 | FUSED_STORE_UPDATE | 4 |
| 8 | GPF | 3 |
| 9 | L1DPF | 5 |
| 10 | LOAD | 1 |
| 11 | LOAD_APS | 3 |
| 12 | LOAD_DESCR | 3 |
| 13 | LOAD_NAC | 4 |
| 14 | LOAD_NT | 3 |
| 15 | LOAD_STORE | 1 |
| 16 | LOAD_SUPERVISOR | 2 |
| 17 | LOAD_ZX | 1 |
| 18 | PF_L1D | 7 |
| 19 | PF_L2 | 1 |
| 20 | PF_NT | 6 |
| 21 | PF_W | 1 |
| 22 | STORE | 1 |
| 23 | STORE_APS | 0 |
| 24 | STORE_MASK | 3 |
| 25 | STORE_NT | 2 |
| 26 | STORE_NT_APS | 3 |
| 27 | STORE_PUSH | 2 |
| 28 | STORE_SUPERVISOR | 7 |
| 29 | STORE_UPDATE | 2 |
| 30 | STORE_UPDATE_NAC | 3 |
| 31 | TABLEWALK | 3 |

CACHE MEMORY BUDGETED BY CHUNKS BASED ON MEMORY ACCESS TYPE

CROSS-REFERENCE TO RELATED APPLICATIONS

This application is related to the following U.S. Non-Provisional Applications filed concurrently herewith, each of which is a national stage application under 35 U.S.C. 371 of the correspondingly indicated International Application filed Dec. 14, 2014, each of which is hereby incorporated by reference in its entirety.

| U.S. Non-Provisional Ser. No. | International application No. |
|---|---|
| 14/890,893 | PCT/IB2014/003219 |
| 14/890,895 | PCT/IB2014/003261 |
| 14/890,898 | PCT/IB2014/003260 |
| 14/890,902 | PCT/IB2014/003220 |
| 14/890,904 | PCT/IB2014/003221 |

BRIEF SUMMARY

In one aspect the present invention provides a set associative cache memory, comprising: an array of storage elements arranged as M sets by N ways, wherein each set of the M sets belongs in one of L mutually exclusive groups; an allocation unit that allocates the storage elements of the array in response to memory accesses that miss in the cache memory; wherein each of the memory accesses selects a set of the M sets; wherein each of the memory accesses has an associated memory access type (MAT) of a plurality of predetermined MATs, wherein the MAT is received by the cache memory; a mapping that, for each group of the L mutually exclusive groups: for each MAT of the plurality of predetermined MATs, associates the MAT with a subset of one or more of the N ways of the array; and wherein for each memory access of the memory accesses, the allocation unit allocates into a way of the subset of one or more ways of the selected set that the mapping associates with the MAT of the memory access and with one of the L mutually exclusive groups in which the selected set belongs.

In another aspect, the present invention provides a method for operating a set associative cache memory having an array of storage elements arranged as M sets by N ways, wherein each set of the M sets belongs in one of L mutually exclusive groups, and an allocation unit that allocates the storage elements of the array in response to memory accesses that miss in the cache memory, wherein each of the memory accesses selects a set of the M sets, wherein each of the memory accesses has an associated memory access type (MAT) of a plurality of predetermined MATs, the method comprising: storing a mapping that, for each group of the L mutually exclusive groups: for each MAT of the plurality of predetermined MATs, associates the MAT with a subset of one or more of the N ways of the array; and for each memory access of the memory accesses, allocating into a way of the subset of one or more ways of the selected set that the mapping associates with the MAT of the memory access and with one of the L mutually exclusive groups in which the selected set belongs.

In yet another aspect, the present invention provides a set associative cache memory, comprising: an array of storage elements arranged as M sets by N ways, wherein each set of the M sets belongs in one of L mutually exclusive groups; a mapping that specifies a plurality of chunks of the array, wherein a chunk encompasses the storage elements of the array that are a logical intersection of one group of the L mutually exclusive groups and one or more ways of the N ways of the array; an allocation unit that allocates the storage elements of the array in response to memory accesses that miss in the cache memory, wherein each of the memory accesses selects a set of the M sets; wherein each of the memory accesses has an associated memory access type (MAT) of a plurality of predetermined MATs, wherein the MAT is received by the cache memory; the mapping further, for each chunk of the plurality of chunks, associates one or more MATs of the plurality of MATs with the chunk; and wherein for each memory access of the memory accesses, the allocation unit allocates into a way of the selected set that is included in a chunk of the plurality of chunks intersected by the selected set.

In yet another aspect, the present invention provides a method for operating a set associative cache memory having an array of storage elements arranged as M sets by N ways, wherein each set of the M sets belongs in one of L mutually exclusive groups, and an allocation unit that allocates the storage elements of the array in response to memory accesses that miss in the cache memory, wherein each of the memory accesses selects a set of the M sets, the method comprising: holding a mapping that specifies a plurality of chunks of the array, wherein a chunk encompasses the storage elements of the array that are a logical intersection of one group of the L mutually exclusive groups and one or more ways of the N ways of the array; wherein each of the memory accesses has an associated memory access type (MAT) of a plurality of predetermined MATs, wherein the MAT is received by the cache memory; the mapping further, for each chunk of the plurality of chunks, associates one or more MATs of the plurality of MATs with the chunk; and for each memory access of the memory accesses, allocating into a way of the selected set that is included in a chunk of the plurality of chunks intersected by the selected set.

BRIEF DESCRIPTION OF THE DRAWINGS

FIG. 2 is a mapping 108 of MATs to their respective subsets of ways of the cache memory 102 of FIG. 1.

FIG. 22C is a block diagram illustrating an embodiment of the cache memory 1902 of FIG. 19 that employs a heterogeneous replacement policy.

FIG. 22E is a block diagram illustrating an embodiment of the cache memory 1902 of FIG. 19 that employs a heterogeneous replacement policy.

FIG. 24 is a mapping of MATs to their respective thresholds 2308 of FIG. 23 according to one embodiment.

FIG. 29 is a block diagram illustrating a mapping 2908 of MATs to MAT groups 2909 and a mapping of MAT groups 2909 to thresholds 2911, according to one embodiment.

FIG. 32 is a mapping of MATs to their respective priorities 3108 of FIG. 31 according to one embodiment.

DETAILED DESCRIPTION OF THE EMBODIMENTS

Figure 1:
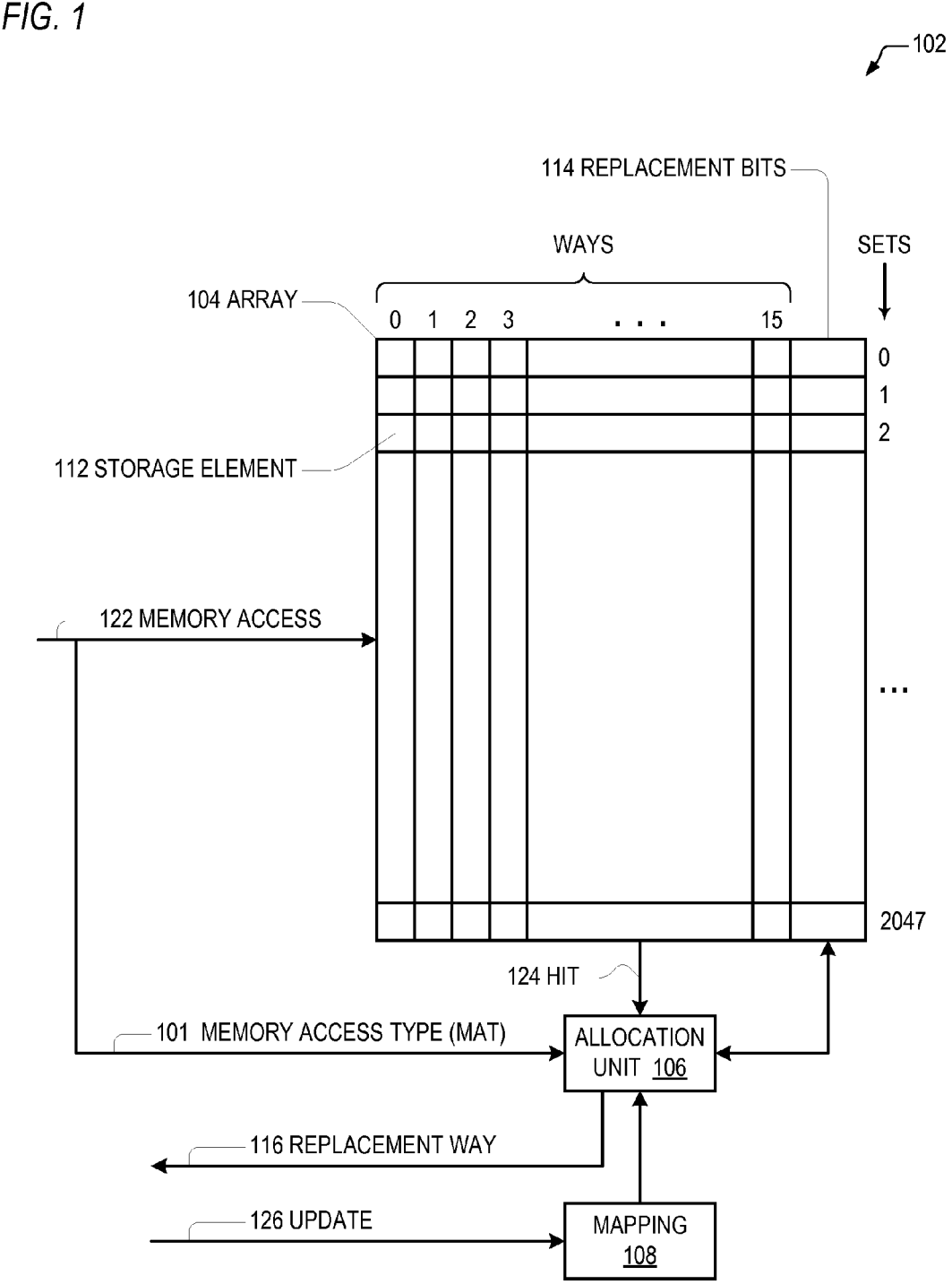
FIG. 1 is a block diagram illustrating a set associative cache memory.

Referring now to FIG. 1, a block diagram illustrating a set associative cache memory 102 is shown. The cache memory 102 includes an array 104 of storage elements 112. The array 104 is arranged as a plurality of ways. In the example of FIG. 1, the array 104 has 16 ways, referred to as 0 through 15. The array 104 is also arranged as a plurality of sets. The cache memory 102 receives a memory access 122. The memory access 122 includes a memory address and a memory access type (MAT) 101. The cache memory 102 is included in a processor, such as the processor 3900 described with respect to FIG. 39 below.

A memory access type (MAT) is a characteristic of a memory access that is derived from either a characteristic of the instruction for which the memory access was generated, or the type of functional unit of the processor that generated the memory access, or the operating mode of the processor when the memory access was generated or the data type being accessed by the memory access.

The operation specified by the instruction is a characteristic of the instruction, for example. Load units, store units, integer units, floating point units, media units, tablewalk engines, instruction fetch units, and hardware prefetchers (e.g., instruction prefetcher, stream prefetcher, box prefetcher, L1D prefetcher) are types of functional unit of the processor, for example. Supervisor mode (or privileged mode, or x86 ring 0), system management mode (e.g., x86 System Management Mode (SMM)), protected mode (e.g., x86 Real Mode, Virtual x86 mode, Protected mode, Long mode), virtual machine mode (e.g., x86 Virtual Machine eXtensions (VMX)), and are operating modes of the processor, for example. Code, descriptor tables (e.g., x86 instruction set architecture global descriptor table (GDT) and interrupt descriptor table (IDT)), page tables, system management mode (e.g., x86 SMM) state save space, virtual machine mode (e.g., x86 VMX) state save space, stack, compressed data, constants, floating point, cryptographic keys, cryptographic payloads, and linked lists are data types accessed, for example.

A memory access generated by an instruction fetch unit may be referred to as a code fetch, and a memory access generated by a hardware instruction prefetcher may be referred to as a code prefetch.

TABLE 1

| Memory Access Type (MAT) | Description |
| --- | --- |
| Boxpf | Load generated by bounding box hardware data prefetcher of the processor |
| fp_load | Load generated by floating point instruction |
| fp_store | Store generated by floating point instruction |

TABLE 1-continued

| Memory Access Type (MAT) | Description |
|---|---|
| fused_fp_store | Store generated by a fused microinstruction into which a floating point instruction was translated |
| fused_load | Load generated by a fused microinstruction into which a load instruction was translated |
| fused_store | Store generated by a fused microinstruction into which a store instruction was translated |
| fused_store_aps | Store generated by a fused microinstruction into which a media instruction was translated |
| fused_store_update | Store generated by a fused microinstruction into which an instruction that modifies an address (e.g., in stack pointer register implicit in x86 PUSH or POP, or string address register implicit in x86 REP MOVS) was translated |
| gpf | Load generated by guaranteed prefetch instruction |
| l1dpf | Load generated by L1 data cache hardware prefetcher of the processor |
| load | Load (basic) |
| load_aps | Load generated by media instruction |
| load_descr | Load of a descriptor (e.g., x86 ISA descriptor) |
| load_nac | Load that performs no alignment check (e.g., will not cause x86 #AC exception) |
| load_nt | Load of non-temporal data |
| load_store | Load and store |
| load_supervisor | Load generated by instruction at supervisor privilege level |
| load_zx | Load generated by zero extend instruction (e.g., x86 MOVZX) |
| pf_l1d | Load into L1 data cache generated by software prefetch instruction (e.g., x86 PREFETCHT0/T1) |
| pf_l2 | Load into L2 cache generated by software prefetch instruction (e.g., x86 PREFETCHT2) |
| pf_nt | Load into non-temporal cache generated by software prefetch instruction (e.g., x86 PREFETCHNTA) |
| pf_w | Load into cache in anticipation of a write generated by software prefetch instruction (e.g., x86 PREFETCHW) |
| store | Store (basic) |
| store_aps | Store generated by media instruction |
| store_mask | Store of non-temporal data generated by a masked move instruction (e.g., x86 MASKMOVQ) |
| store_nt | Store of non-temporal data |
| store_nt_aps | Store of non-temporal data generated by a media instruction |
| store_push | Store generated by a push instruction (e.g., x86 PUSH) that stores data on a stack in memory (e.g., specified by the x86 stack pointer register value) |
| store_supervisor | Store generated by instruction at supervisor privilege level |
| store_update | Store generated by an instruction that modifies an address (e.g., in stack pointer register or string address register) |
| store_update_nac | Store generated by an instruction that modifies an address (e.g., stack address or string address) and that performs no alignment check (e.g., will not cause x86 #AC exception) |
| tablewalk | Load or store generated by hardware tablewalk engine of the processor |

In one embodiment, the instructions include microinstructions generated by an instruction translator of the processor that translates architectural instructions (e.g., x86 instruction set architecture instructions) into the microinstructions.

A portion of the memory access 122 memory address, the index, selects one of the sets. Each of the sets includes storage for holding replacement information 114, or replacement policy bits 114, or replacement bits 114, used by an allocation unit 106 to determine which one of the ways of the selected set to replace, or allocate into, when the memory access 122 misses in the cache memory 102, as indicated by a false value on a hit signal 124 provided to the allocation unit 106. The allocation unit 106 indicates the way to replace on a replacement way indicator 116. For different embodiments, the replacement bits 114 may be different numbers of bits and may indicate different information. For example, in one embodiment the replacement bits 114 are 15 bits that indicate the pseudo-least recently used (pLRU) way of the set. In another embodiment, the replacement bits 114 are 16 bits that are a one-hot vector that indicates which one of the ways of the set was last replaced, which may be used by a round-robin replacement policy, or replacement scheme. In another embodiment, the replacement bits 114 indicate a true LRU way of the set. In another embodiment, the replacement bits 114 are used in a modified pLRU replacement scheme that further takes into account which core (in a multi-core processor) owns the cache line when updating the replacement bits 114. In another embodiment, the replacement bits 114 are used in a modified pLRU replacement scheme that further takes into account the MAT 101 of the memory access 122 when updating the replacement bits 114; for example, if the MAT 101 is one which is known, e.g., through offline analysis, to tend to be less likely to be needed, then the replacement scheme updates the replacement bits 114 such that the replaced way is inserted somewhere in the middle rather than in the most recently used position.

Each storage element 112 of the array 104 holds a cache line of data, the tag of the cache line, and status of the cache line, e.g., MESI state. Each set includes a storage element 112 for each way (e.g., sixteen ways) of the set. In one embodiment, a cache line is 64 bytes of data, although other embodiments are contemplated. As mentioned above, each set includes replacement bits 114. In one embodiment, the array 104 is a single array that holds the cache lines of data, tags, status and replacement bits 114. In another embodiment, the array 104 is two arrays, a first array that holds the cache lines of data (data array) and a second array that holds the tags, status and replacement bits 114 (tag array). In another embodiment, a third array (replacement array) holds the replacement bits 114 rather than the tag array.

In one embodiment, the allocation unit 106 is part of one or more tag pipelines of the cache memory 102. The tag pipeline receives a memory access, e.g., from a processing core (e.g., from the memory subsystem of a processing core, e.g., load/store queues or private cache memories) and accesses the array 104 to perform the memory access, e.g., to read data from the array 104 or to write data to the array 104. Preferably, the tag pipeline is a pipeline of stages, much like the pipeline stages of a processor, each of which performs a sub-operation of a memory access, e.g., invalidate entry having specified set and way, query tag array for status of address, determine which way to allocate into based on replacement bits of selected set if address not present, update status of specified set and way, generate request to read data from data array if address present, generate request to write data to data array if address present, and so forth. The sub-operations together accomplish the full operation of the memory access. Advantageously, by having a pipeline of stages, the allocation unit 106 may perform a series of sub-operations to accomplish relatively complex replacement schemes, such as described herein, when necessary. Preferably, a forwarding network is included that forwards results of later stages of the pipeline back to earlier stages.

The cache memory 102 also includes a mapping 108 of MATs to way subsets that is provided to the allocation unit 106 for use in determining which one of the ways of the selected set to allocate into when the memory access 122 misses in the cache memory 102. Generally, the allocation unit 106 attempts to allocate into invalid ways of the cache memory 102; however, often the allocation must replace a valid way and is therefore also referred to as a replacement. More specifically, for each MAT of a plurality of MATs, the mapping 106 associates the MAT with a subset of the ways of the array 104. The subset may be different for each MAT; however, some MATs may be associated with the same subset. When the memory access 122 misses in the cache memory 102, the allocation unit 106 allocates into the subset of ways associated with the MAT 101 of the memory access 122. This may advantageously result in the cache memory 102 being more efficient, e.g., having a higher hit rate, than a conventional cache memory that allocates according to conventional methods, e.g., allocates the least recently used (LRU) way without taking into account a MAT of the memory access that precipitated the allocation. In particular, the mapping 108 may be tailored to increase the likelihood of replacing cache lines that are less likely to be needed than other cache lines that are more likely to be needed. In one embodiment, advantageously, the mapping 108 may be tailored increase the efficiency of the cache memory 102 by performing offline analysis of programs, or program phases, of particular interest and determining a subset, or "budget," of the ways of the cache memory 102 associated with each MAT such that when a memory access 122 having the MAT 101 misses in the cache memory 102, the allocation unit 106 allocates only into ways of the selected set that are in the subset associated with the MAT 101. The mapping 108 may be updated via an update input 126.

Numerous embodiments of cache memories are described herein, e.g., with respect to FIGS. 10, 11, 14, 15, 17, 19, 23 and 25. To avoid repetition of the lengthy description above, it should be understood that those cache memories are similar in many ways to the cache memory 102 of FIG. 1, and differences from the cache memory 102 of FIG. 1 are described with respect to the other embodiments. Similarly, the processor that includes the cache memories of the other embodiments is similar to the descriptions of the processor that includes the cache memory 102 of FIG. 1.

Preferably, the processor that includes the cache memory 102 is a multi-core processor in which the cores share the cache memory 102. However, single-core embodiments are also contemplated. Additionally, the cache memory 102 may be at any level of the cache hierarchy of the processor. However, preferably the cache memory 102 is a last-level cache (LLC) of the processor. Preferably, the processor includes an instruction cache that provides instructions to an instruction decoder that decodes the instructions and provides the decoded instructions to an instruction dispatcher that dispatches the instructions to execution units for execution. Preferably, the microarchitecture of the processor is superscalar and out-of-order execution, although other embodiments are contemplated, such that the instruction dispatcher also includes an instruction scheduler for scheduling the dispatch of instructions to multiple execution units in a superscalar out-of-order fashion. Preferably, the processor also includes architectural registers that hold architectural state of the processor as well as non-architectural registers. Preferably, the processor also includes a register alias table (RAT) used to perform register renaming and a reorder buffer (ROB) used to retire instructions in program order. Preferably, the instruction dispatcher includes an instruction translator that translates architectural instructions into microinstructions of the microinstruction set architecture of the processor executable by the execution units. The processor also includes a memory subsystem that provides memory operands to the execution units and receives memory operands from the execution units. The memory subsystem preferably includes one or more load units, one or more store units, load queues, store queues, a fill queue for requesting cache lines from memory, a snoop queue related to snooping of a memory bus to which the processor is in communication, and other related functional units. The memory subsystem makes memory accesses 122 of the cache memory 102.

Referring now to FIG. 2, a mapping 108 of MATs to their respective subsets of ways of the cache memory 102 of FIG. 1 according to one embodiment is shown. The example mapping 108 of FIG. 2 includes the 32 MATs that correspond to Table 1, for illustration purposes. The mapping 108 of the example of FIG. 2 is reproduced below in Table 2.

TABLE 2

| Index | Memory Access Type (MAT) | Subset of Ways |
|---|---|---|
| 0 | boxpf | 15 |
| 1 | fp_load | 0-8 |
| 2 | fp_store | 0-8 |
| 3 | fused_fp_store | 0-8 |
| 4 | fused_load | 0-12 |
| 5 | fused_store | 0-12 |
| 6 | fused_store_aps | 6-10 |
| 7 | fused_store_update | 0-3 |
| 8 | gpf | 15 |
| 9 | l1dpf | 14 |
| 10 | load | 0-15 |

TABLE 2-continued

| Index | Memory Access Type (MAT) | Subset of Ways |
|---|---|---|
| 11 | load_aps | 6-10 |
| 12 | load_descr | 15 |
| 13 | load_nac | 1, 2, 4 |
| 14 | load_nt | 0, 4, 8 |
| 15 | load_store | 6-12 |
| 16 | load_supervisor | 5 |
| 17 | load_zx | 7 |
| 18 | pf_l1d | 13 |
| 19 | pf_l2 | 12 |
| 20 | pf_nt | 11 |
| 21 | pf_w | 10 |
| 22 | store | 0-15 |
| 23 | store_aps | 6-10 |
| 24 | store_mask | 9 |
| 25 | store_nt | 0, 4, 8 |
| 26 | store_nt_aps | 6-10 |
| 27 | store_push | 15 |
| 28 | store_supervisor | 5 |
| 29 | store_update | 0-3 |
| 30 | store_update_nac | 3 |
| 31 | tablewalk | 15 |

Taking an example from FIG. 2, when a memory access 122 with a MAT 101 of store_nt misses in the cache memory 102, the allocation unit 106 allocates into only way 0, 4 or 8 of the selected set, i.e., only into a way of the subset that the mapping 108 associates with the store_nt MAT. For another example, when a memory access 122 with a MAT 101 of load_descr misses in the cache memory 102, the allocation unit 106 allocates into only way 15 of the selected set, i.e., only into a way of the subset that the mapping 108 associates with the load_descr MAT.

In one embodiment, the mapping 108 comprises an array of 16-bit vectors. Each bit of the vector corresponds to a respective way of the 16 ways of the cache memory 102; preferably, a bit is one if the respective way is included in the subset and zero if the respective way is excluded from the subset. The array includes 32 vectors, one for each MAT, and is indexed by MAT number. However, other embodiments are contemplated in which the mapping 108 is embodied in other forms, such as an alternate embodiment described with respect to FIGS. 3 and 6.

It should be understood that although FIG. 2 (and Table 2) describes a particular set of MATs and a particular mapping of the MATs to their respective subset of ways, the embodiment is provided as an example for illustration purposes, and other embodiments are contemplated with a different set of MATs and different mappings of MATs to subsets. Indeed, in one embodiment the mapping is dynamically updated (e.g., via the update input 126 of FIG. 1) during operation of the processor based on which program or program phase is currently running, such as described below with respect to FIGS. 7-9.

Figure 3:
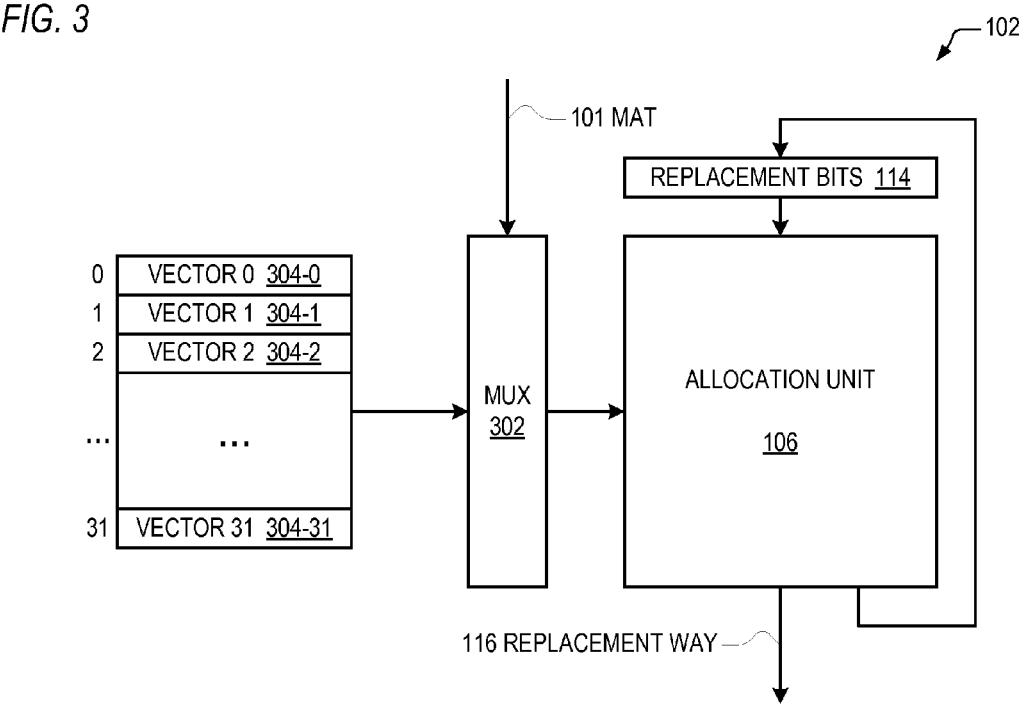
FIG. 3 is a block diagram illustrating a portion of the cache memory 102 of FIG. 1 in more detail.

Referring now to FIG. 3, a block diagram illustrating a portion of the cache memory 102 of FIG. 1 in more detail is shown. In the embodiment of FIG. 3, the mapping 108 of FIG. 1 includes a vector 304 for each of the 32 MATs. A mux 302 receives the 32 vectors 304 and selects one of them based on the value of the MAT indicator 101 of the memory access 122, and the selected vector 304 is provided to the allocation unit 106 of FIG. 1. The allocation unit 106 also receives the replacement bits 114 of FIG. 1 of the selected set, i.e., the set of the cache memory 102 selected by the index of the memory access 122 memory address. Based on the selected vector 304 and the replacement bits 114, the allocation unit 106 generates the replacement way 116 of FIG. 1. The allocation unit 106 also updates the replacement bits 114 based on the value of the replacement way 116. For example, in one embodiment, the replacement bits 114 are a pseudo-LRU (pLRU) vector that indicates the pseudo-least recently used way of the ways of the selected set. For other examples, the replacement bits 114 are a true LRU vector or a round-robin vector.

In one embodiment, the vector 304 is a bit vector that includes a respective bit for each way of the cache memory 102, e.g., 16 ways. A true bit indicates the respective way is included in the subset of the associated MAT and a false bit indicates the respective way is excluded from the subset. In an alternate the vector 304 includes a pair of masks that Boolean operate on replacement bits 114 that are a pLRU vector, as described below with respect to FIG. 6.

In an alternate embodiment, the cache memory 102 may include logic that maps a larger number of MATs (e.g., 32) into a smaller number of MAT groups (e.g., four). For example, in the embodiment of FIG. 3, MAT grouping logic (not shown) receives the MAT 101 and outputs a MAT group number that is provided as the selection input to the mux 302 (rather than the MAT 101). The MAT grouping logic maps each of the 32 MATs to one of four MAT groups. The MAT grouping logic is updateable along with the mapping 108. The mapping 108 includes only four vectors 304 (rather than 32), and the mux 302 selects one of the four vectors 304 for provision to the allocation unit. This embodiment may advantageously reduce hardware costs. The tradeoff in reduced MAT granularity may yield acceptable efficiency, particularly for programs whose memory access characteristics tend to clump together with respect to various MATs. The MAT grouping logic may be employed with the various embodiments described herein in order to reduce the amount of hardware required, and the reduction may be multiplied in embodiments that involve groups, such as the embodiments of FIGS. 10 through 22, and an embodiment that maps MATs to MAT groups is described with respect to FIGS. 29 through 30.

Figure 4:
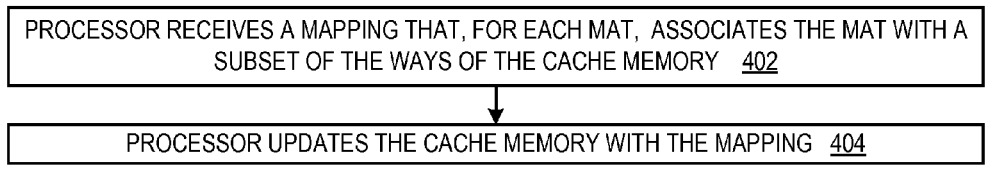
FIG. 4 is a flowchart illustrating operation of a processor that includes the cache memory 102 of FIG. 1.

Referring now to FIG. 4, a flowchart illustrating operation of a processor that includes the cache memory 102 of FIG. 1 is shown. Flow begins at block 402.

At block 402, the processor receives a mapping that associates each MAT of a plurality of MATs (e.g., of Table 1) to a subset of the ways of the cache memory 102 (e.g., the mapping of FIG. 2 and Table 2). Preferably, the cache memory 102 is manufactured with a default mapping 108. Preferably, the default mapping 108 is tailored to facilitate efficient operation of the cache memory 102 for a large variety of programs, or at least for a population of programs deemed of particular interest and/or likely to be executed on the processor that includes the cache memory 102. Flow proceeds to block 404.

At block 404, the processor updates the mapping 108 of the cache memory 102 with the mapping received at block 402 via the update input 126 of FIG. 1. Preferably the mapping 108 is updated by system software (e.g., BIOS or the operating system) at system initialization and/or boot of the operating system. Furthermore, preferably the mapping 108 is updated on a per program basis and/or a per program phase basis, such as described below with respect to FIGS. 7-9. Flow ends at block 404.

Figure 5:
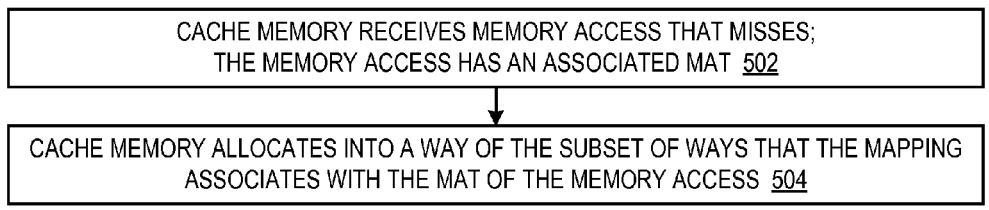
FIG. 5 is a flowchart illustrating operation of the cache memory 102 of FIG. 1.

Referring now to FIG. 5, a flowchart illustrating operation of the cache memory 102 of FIG. 1 is shown. Flow begins at block 502.

At block 502, the cache memory 102 receives a memory access 122 that misses in the cache memory 102. The memory access 122 index selects a set of the array 104. The memory access 122 specifies the MAT 101. Flow proceeds to block 504.

At block 504, the cache memory 102 allocates into a way of the selected set. More specifically, the allocation unit 106 allocates into one of the ways of the subset of ways with which the mapping 108 associates the MAT 101 of the memory access 122, which is described in more detail below with respect to FIG. 6. Flow ends at block 504.

Figure 6:
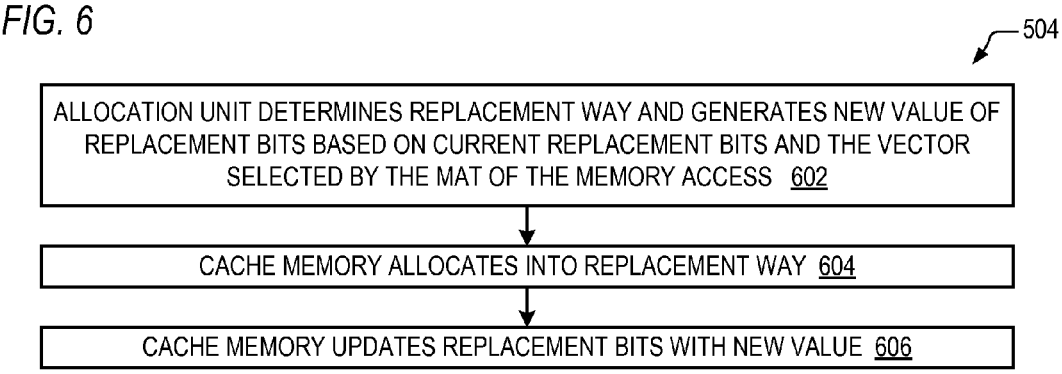
FIG. 6 is a flowchart illustrating operation of block 504 of FIG. 5 according to one embodiment.

Referring now to FIG. 6, a flowchart illustrating operation of block 504 of FIG. 5 according to one embodiment is shown. Flow begins at block 602.

At block 602, the allocation unit 106 determines the replacement way 116 and generates a new value of the replacement bits 114 based on the current replacement bits 114 and the MAT 101 of the memory access 122. In one embodiment, the allocation unit 106 determines the replacement way 116 and generates a new value of the replacement bits 114 as described with respect to the embodiment of FIG. 3 above, e.g., using the vector 304 selected by the MAT 101. In one embodiment, the replacement bits 114 are a pLRU vector, and the vector 304 includes a first portion (AND_MASK) that is Boolean ANDed with the pLRU vector 114 to generate a first result, and a second portion (OR_MASK) that is Boolean ORed with the first result to generate a second result. The second result is used to determine the replacement way 116 and to generate the new value with which to update the pLRU vector 114. Use of the AND_MASK and OR_MASK are described in more detail below after the description of block 606. Flow proceeds to block 604.

At block 604, the cache memory 102 allocates into the replacement way 116 indicated by the allocation unit 106 at block 602. Flow proceeds to block 606.

At block 606, the cache memory 102 updates the replacement bits 114 with the new value generated at block 602. Flow ends at block 606.

In one embodiment, the pLRU scheme for a 16-way embodiment comprises: 15 pLRU replacement bits 114 per set, logic to decode the LRU way from the replacement bits 114, logic to update the replacement bits 114 on a new allocation, and logic to update the replacement bits 114 on a memory access 122 that hits. Although an allocation is semantically different than a cache hit, the allocation update logic is effectively the hit logic with the LRU way fed in as the hit way.

Figure 40:
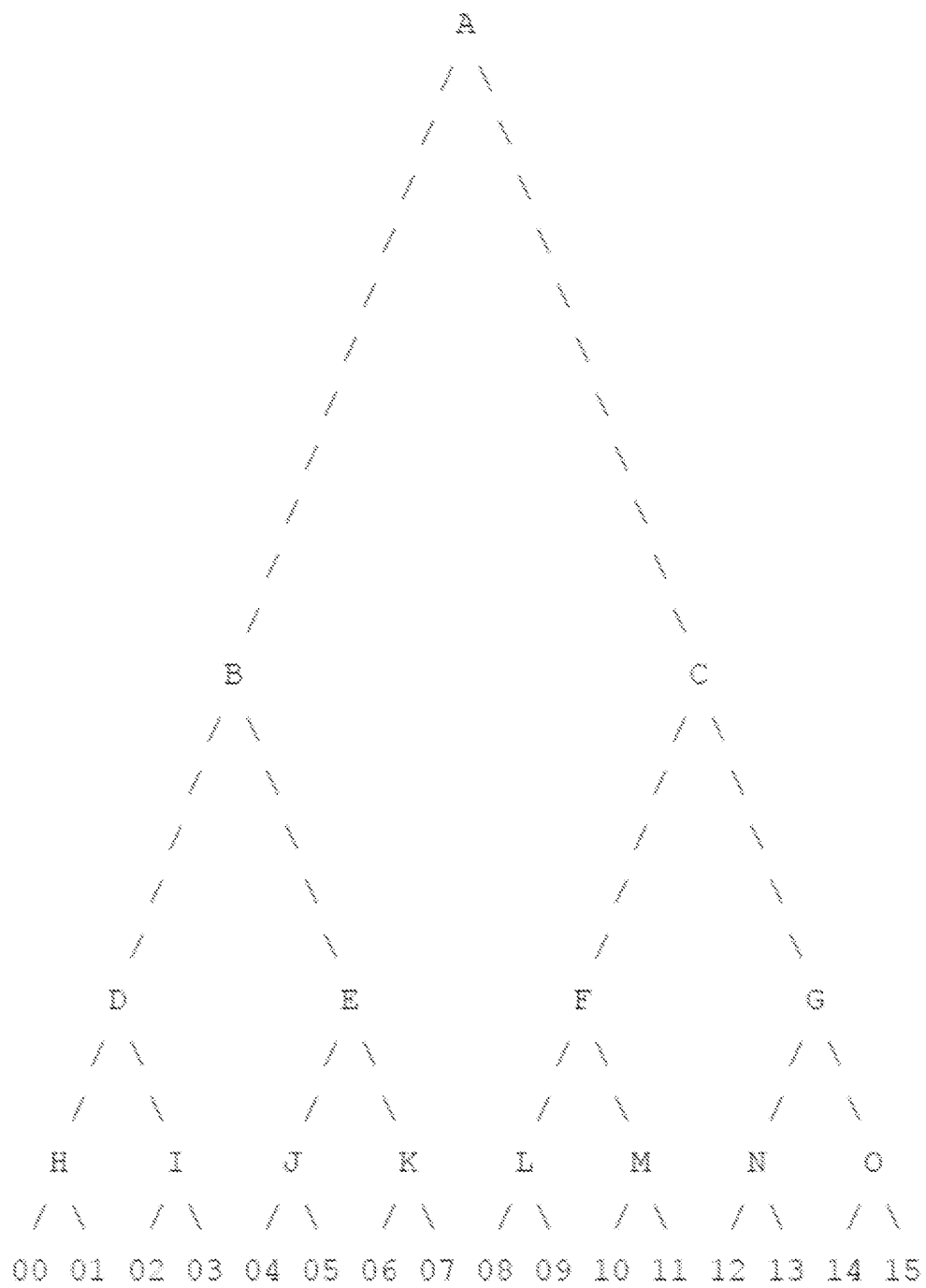
FIG. 40 is a pLRU tree illustrating an embodiment of a 16-way pLRU scheme that may be used according to the flowchart of FIG. 6.

The replacement bits 114 are a 15-bit vector that essentially describes a binary tree where each bit is an internal node (fully specifying 4 levels of nodes), and each leaf is a way. For example, if the bits are labeled A-O, the pLRU tree might be defined as shown in FIG. 40.

The logic to determine the LRU way from the pLRU vector walks the pLRU tree in the direction specified by node bits A-O. The values of node bits A-O, beginning at the root node A, always point in the "direction" of LRU, where 0 means "pointing left" and 1 means "pointing right". For example, in the case of:

```
ABCDEFGHIJKLMNO
000000010000000
``` the LRU way is 01 (A=0, B=0, D=0, H=1).

It should be noted that in this particular case, the LRU way is only determined by four node bits: A, B, D, and H. The other nodes are still there and are storing useful information, but they do not contribute to the LRU determination in the case of 000000010000000.

When the pLRU array needs to be updated because of a hit or an allocation, the next state of the pLRU bits is calculated as a function of the current state and the specified way. The update is a two step process. First, determine the four node bits {a,b,c,d} of the pLRU node bits A-O that point to the way being promoted into the most recently used (MRU) position. Second, for every node bit X in the pLRU node bits A-O, if X is in {a,b,c,d}, that node bit is updated to point away from the way in question.

For example, in the previous case, a load that hits in way 05 updates nodes {A=>1, B=>0, E=>1, J=>0} so that each of the four node bits points in the direction opposite of way 05.

Use of the two portions of the first portion (AND_MASK) and second portion (OR_MASK) of the vector 304 mentioned above with respect to block 602 will now be described in more detail. Assuming the subset of ways into which it is desired to allocate is ways {0,5,6,7}. First, the way subset is converted into the AND_MASK and OR_MASK based on the tree diagram, as shown here.

```
              ABCDEFGHIJKLMNO
AND_MASK  =   01-01--0-11----
OR_MASK   =   00-00--0-10----
```

The dashes represent bit positions that are "don't-cares" because the masks obviate them. For example, node bit C is a don't-care here because node bit A of the AND_MASK is 0, which means the left branch will always be followed in determining the LRU.

Updating the LRU on hits or allocations is performed the same as in the normal pLRU case. However, because pLRU is imperfect with respect to LRU behavior, pLRU updates for two mutually exclusive subsets of ways affect each other, due to the nature of sharing the replacement bits 114. However, the crosstalk may be tolerable in most situations.

Figure 7:
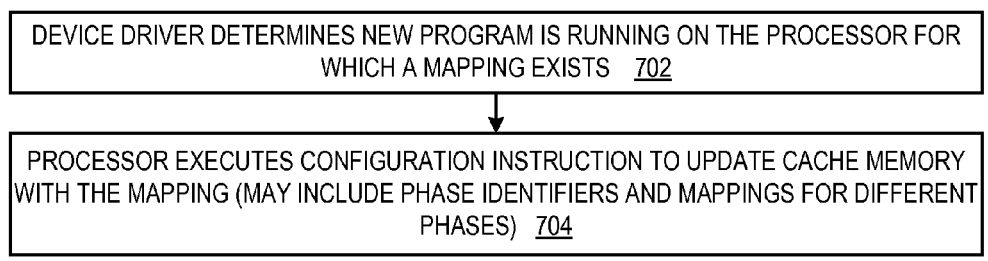
FIG. 7 is a flowchart illustrating operation of a system that includes a processor that includes the cache memory 102 of FIG. 1.

Referring now to FIG. 7, a flowchart illustrating operation of a system that includes a processor that includes the cache memory 102 of FIG. 1 is shown. Flow begins at block 702.

At block 702, a device driver (or other component of system software) determines that a program is running (or about to run, e.g., is the running program as indicated in process table of the operating system), and the program is in a list of programs known by the device driver for which a mapping, or configuration, exists for updating the mapping 108 of FIG. 1, for example. For example, offline analysis of the program running on the processor (either via software simulation of the processor or an actual processor part) has been performed to determine a mapping that improves the efficiency of the cache memory 102. It should be understood that the mapping does not provide a 100% hit rate; however, the mapping may improve the efficiency of the cache memory 102. Furthermore, it should be understood that some programs will not have tendencies with respect to the MATs that are significant enough to benefit from the mappings; however, the analysis of some programs may display tendencies that can be exploited and benefit from the mappings. Flow proceeds to block 704.

At block 704, the processor executes an instruction (e.g., a write to a model specific register (MSR), e.g., x86 WRMSR instruction) that instructs the processor to update the mapping 108 of the cache memory 102 with a mapping provided by the instruction. In one embodiment, the mapping is located in memory, and the memory address of the location of the mapping is provided by the instruction.

Preferably, the instruction is part of the device driver code. The device driver may also provide information that may be used by the processor to detect that the program has entered each of different phases, such as described below with respect to FIG. 8, and the device driver may provide a different mapping for each of phases. In response to the instruction, the processor updates the mapping 108 and, if provided, loads the phase detectors (804 of FIG. 8) with the initial phase identifiers (802 of FIG. 8). Flow ends at block 704.

Figure 8:
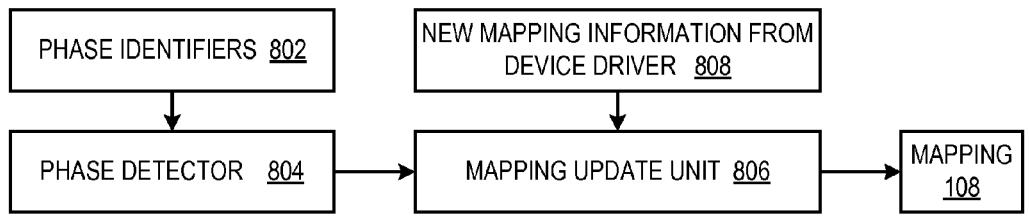
FIG. 8 is a block diagram illustrating elements of the processor that includes the cache memory 102 of FIG. 1.

Referring now to FIG. 8, a block diagram illustrating elements of the processor that includes the cache memory 102 of FIG. 1 is shown. The processor includes a phase detector 804 that detects the running program has entered a new phase. The phase detector 804 makes the determination based on phase identifiers 802 provided to it, such as by a device driver as described above with respect to FIG. 7. The phase identifiers 802 may include an instruction pointer (or program counter) value of an instruction of the program. The instruction may be a subroutine call instruction, in which case the phase identifiers 802 may also include an instruction pointer (or program counter) value of the target instruction of the call instruction. Furthermore, the phase identifiers 802 may also include one or more parameter values of the call instruction, e.g., return address, register values and/or stack values. One example of a phase detector, which is referred to therein as a fingerprint unit, is described in more detail in U.S. patent application Ser. Nos. 14/050,687 and 14/050,757, both filed on Oct. 10, 2013, both of which claim priority to U.S. Provisional Application No. 61/880,620, filed on Sep. 20, 2013, each of which is hereby incorporated by reference in its entirety for all purposes. The processor also includes a mapping update unit 806 that is notified by the phase detector 804 that a new phase has been detected and receives an identifier of the new phase. The mapping update unit 806 also receives the mapping information, e.g., from the device driver as described above with respect to FIG. 7. The mapping update unit 806 updates the mapping 108 in the cache memory 102, as described below with respect to FIG. 9. In one embodiment, the mapping update unit 806 comprises microcode of the processor that is invoked by the phase detector 804. In an alternate embodiment, the mapping update unit 806 comprises a state machine that receives an indicator from the phase detector 804 that a new phase has been detected and the identifier of the new phase. Phase analysis is described in more detail with respect to FIG. 36 below.

Figure 9:
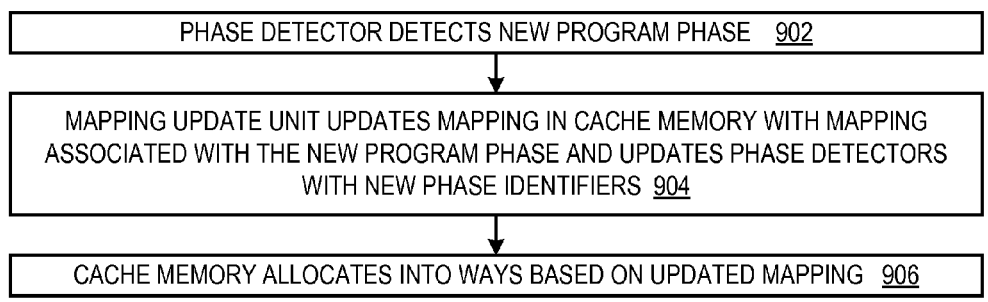
FIG. 9 is a flowchart illustrating operation of the processor of FIG. 8 that includes the cache memory 102 of FIG. 1.

Referring now to FIG. 9, a flowchart illustrating operation of the processor of FIG. 8 that includes the cache memory 102 of FIG. 1 is shown. Flow begins at block 902.

At block 902, the phase detector 804 of FIG. 8 detects the running program has entered a new phase. In response to detecting the new phase, the phase detector 804 notifies the mapping update unit 806 of FIG. 8. Flow proceeds to block 904.

At block 904, the mapping update unit 806 looks up the identifier of the new phase received from the phase detector 804 in the mapping information 808 (e.g., received from the device driver at block 704 of FIG. 7) and updates the mapping 108 of the cache memory 102 with the mapping found in the lookup. Additionally, the mapping update unit 806 updates the phase detectors 804 with new phase identifiers 802, as necessary. In one embodiment, the phases to be looked for next depend upon the current phase; hence, the phase identifiers 802 to be loaded into the phase detector 804 may be different depending upon the current phase. Flow proceeds to block 906.

At block 906, the processor executes the running program and generates memory accesses to the cache memory 102, in response to which the cache memory 102 allocates into the subsets of ways as described with respect to FIGS. 5 and 6 based on the updated mapping 108 performed at block 904. Flow ends at block 906.

It should be understood that although embodiments of the cache memories described herein have a particular number of ways, sets, cache line sizes, tag sizes, status protocols and so forth, other embodiments are contemplated in which the cache memory has a different numbers of these structures or characteristics of the cache memory.

Figure 10:
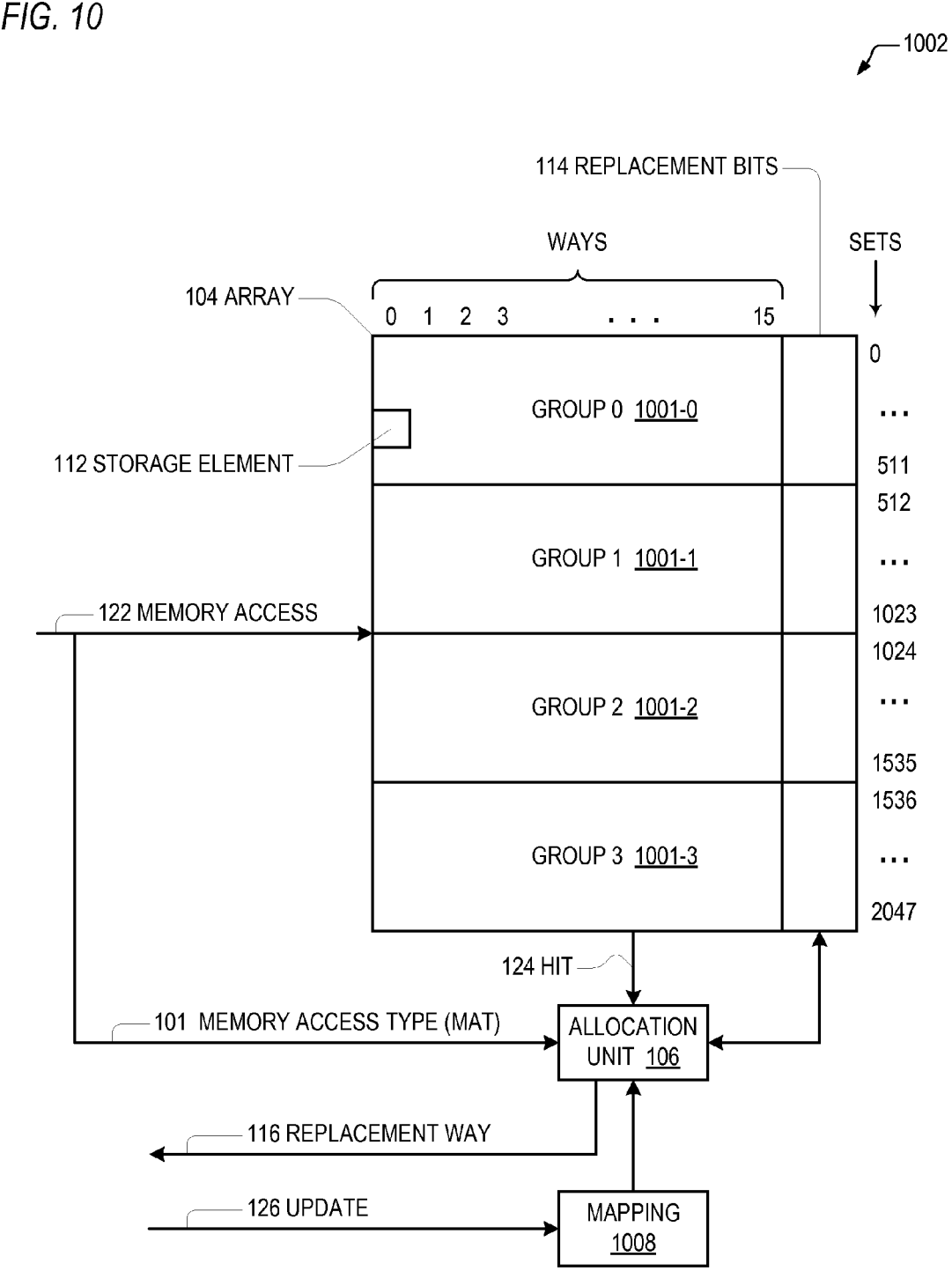
FIG. 10 is a block diagram illustrating a set associative cache memory 1002.

Referring now to FIG. 10, a block diagram illustrating a set associative cache memory 1002 is shown. The cache memory 1002 of FIG. 10 is similar in many respects to the cache memory 102 of FIG. 1 and like-numbered elements are similar. However, the cache memory 1002 of FIG. 10 includes a mapping 1008 that is different from the mapping 108 of FIG. 1. With respect to the cache memory 1002 of FIG. 10, each set belongs in one of a plurality of mutually exclusive groups 1001, referred to herein as L groups. More specifically, the mapping 1008 of FIG. 10, for each MAT of the MATs, associates the MAT with a subset of the plurality of ways of the array 104, but further does so for each group 1001 of the L groups. Thus, for example, the mapping 1008 of FIG. 10 effectively includes, for each of the L groups 1001, a mapping 108 like that of FIG. 2. Hence, whereas the mapping 108 of FIG. 2 is effectively one-dimensional indexed by MAT 101 number, the mapping 1008 of FIG. 10 is effectively two-dimensional indexed both the MAT 101 number and by group 1001 number.

In the example of FIG. 10, there are four groups of sets, denoted group 0 1001-0, which includes sets 0 through 511; group 1 1001-1, which includes sets 512 through 1023; group 2 1001-2, which includes sets 1024 through 1535; and group 3 1001-3, which includes sets 1536 through 2047. Thus, the mapping 1008, for each of the four groups 1001, associates each MAT with a subset of the 16 ways of the array 104. That is, the mapping 1008 of FIG. 10 not only maps MATs to subsets of ways, but does so on a set group basis, rather than on an entire cache memory 102 basis as with the embodiment of FIG. 1. Consequently, the allocation unit 106 allocates into the subset of ways specified by the mapping 1008, which takes into account both the MAT of the memory access 122 and the group 1001 to which the selected set belongs.

This may be particularly advantageous for programs that tend to clump their memory accesses associated with certain MATs in specific set groups of the cache memory 1002. For example, assume for a given program, the memory accesses with MATs related to stack operations tend to clump around the first few sets of the cache memory 1002. In this case, the mapping 1008 may include a larger number of ways in the subset associated with the MATs related to stack operations in the group that includes the first few sets of the cache memory 1002. These tendencies may be observed by offline analysis of programs and program threads, and an efficient mapping may be determined for them and provided to the cache memory 1002 for updating the mapping 1008 to increase the efficiency of the cache memory 1002 when the program is running, similar to the manner described above with respect to FIGS. 7-9.

It should be understood that although an example embodiment is described with a specific number of groups (e.g., four of FIG. 10), the number of groups 1001 may be greater (or smaller). A tradeoff is that the larger the number of groups, the larger the size of the mapping 1008. In one embodiment, the granularity of a group is very fine, down to each set of the cache memory 1002.

Figure 11:
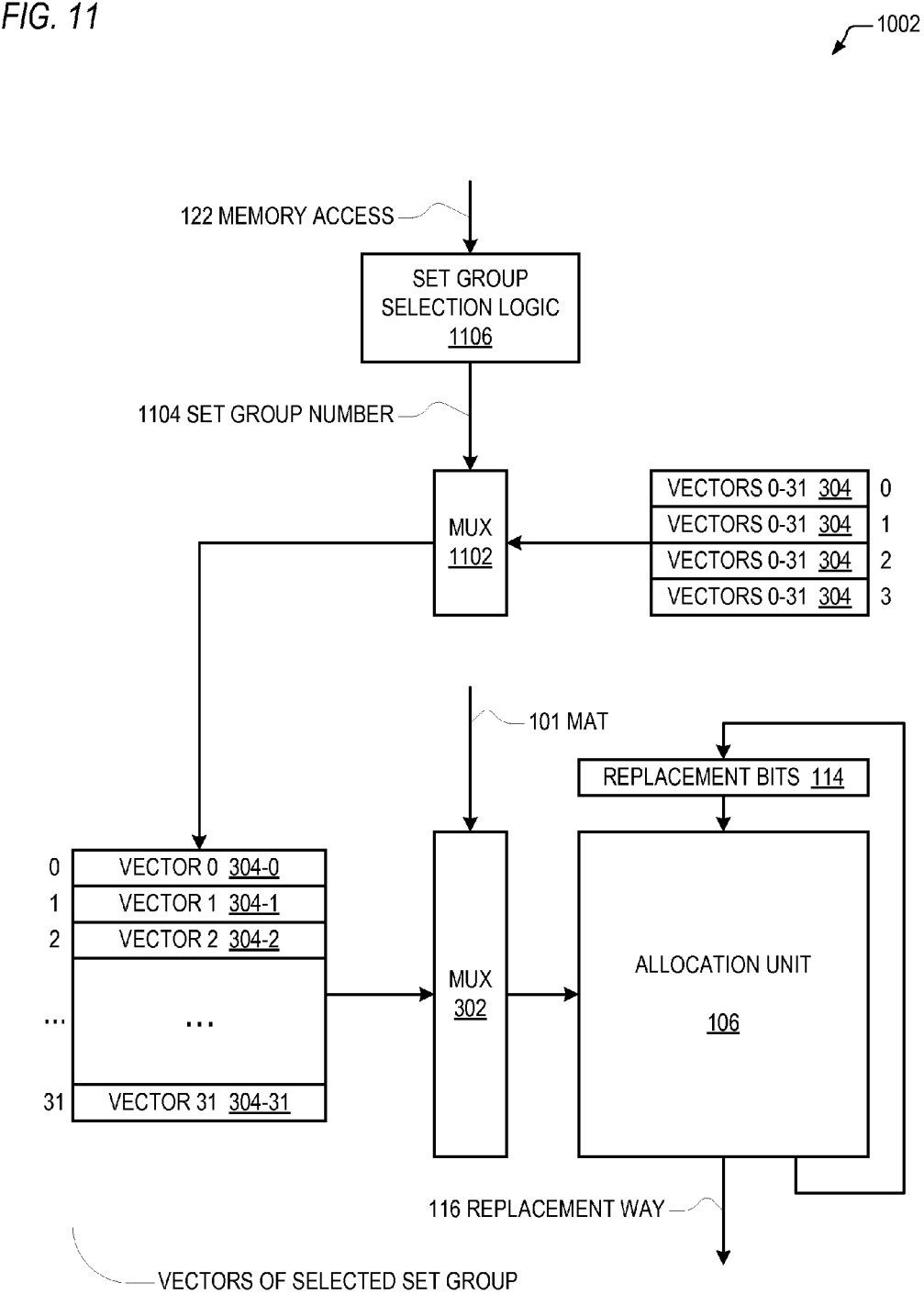
FIG. 11 is a block diagram illustrating a portion of the cache memory 1002 of FIG. 10.

Referring now to FIG. 11, a block diagram illustrating a portion of the cache memory 1002 of FIG. 10 in more detail is shown. The portion of the cache memory 1002 of FIG. 10 is similar in many respects to that of FIG. 3. However, it also includes group selection logic 1106 that maps a memory access 122 to a group 1001. More specifically, the group selection logic 1106 receives the memory access 122, or more specifically the index of the memory address, and generates a set group number 1104 in response that specifies the number of the group 1001 that includes the set selected by the index of the memory access 122. The set group number 1104 is provided as a selection input to a mux 1102 that receives the vectors 304 (i.e., one for each MAT, similar to those of FIG. 3) for every set group (e.g., four in the example of FIG. 11) and selects the vectors 304 associated with the group 1001 specified by the set group number 1104 for provision to a mux 302. The mux 302 selects one vector 304 of the 32 selected vectors 304 for provision to the allocation unit 106. The allocation unit 106 generates a replacement way 116 based on the selected vector 304 and replacement bits 114 of the selected set, similar to the manner described above with respect to FIG. 3. The allocation unit 106 also updates the replacement bits 114 based on the value of the replacement way 116, similar to the manner described above with respect to FIG. 3.

Figure 12:
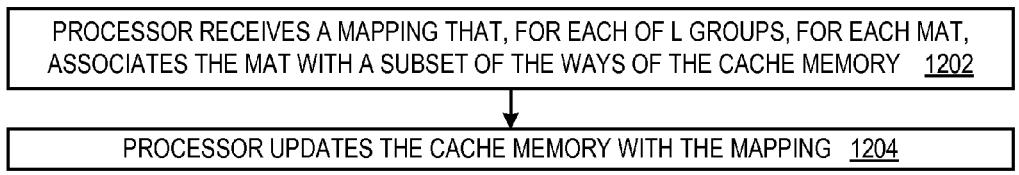
FIG. 12 is a flowchart illustrating operation of a processor that includes the cache memory 1002 of FIG. 1.

Referring now to FIG. 12, a flowchart illustrating operation of a processor that includes the cache memory 1002 of FIG. 1 is shown. Flow begins at block 1202.

At block 1202, the processor receives a mapping that, for each of the L set groups 1001 of the cache memory 1002, associates each MAT of a plurality of MATs (e.g., of Table 1) to a subset of the ways of the cache memory 1002. For some MATs it may be desirable to specify the subset to include all the ways of the set. Flow proceeds to block 1204.

At block 1204, the processor updates the mapping 1008 of the cache memory 1002 with the mapping received at block 1202 via the update input 126 of FIG. 10. Flow ends at block 1204.

Figure 13:
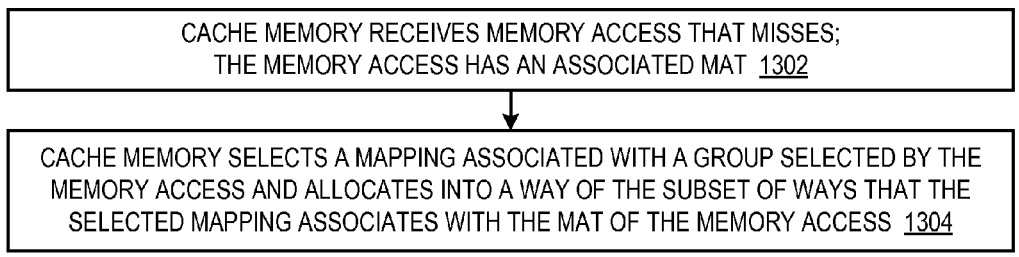
FIG. 13 is a flowchart illustrating operation of the cache memory 1002 of FIG. 10.

Referring now to FIG. 13, a flowchart illustrating operation of the cache memory 1002 of FIG. 10 is shown. Flow begins at block 1302.

At block 1302, the cache memory 1002 receives a memory access 122 that misses in the cache memory 1002. The memory access 122 index selects a set of the array 104. The memory access 122 specifies the MAT 101. Flow proceeds to block 1304.

At block 1304, the cache memory 1002 allocates into a way of the selected set. More specifically, the allocation unit 106 allocates into one of the ways of the subset of ways that the mapping 1008 of the group to which the selected set belongs associates with the MAT 101 of the memory access 122. Preferably, the allocation unit 106 selects the one of the ways of the subset of ways to allocate into using the replacement bits 114 and replacement policy for all the ways of the selected set. For example, if the replacement policy is LRU, the allocation unit 106 selects the LRU way of the subset. Preferably, the allocation unit 106 updates the replacement bits 114 by making the replaced way the most recently used and aging all the other ways. For another example, if the replacement policy is pLRU, the allocation unit 106 selects the approximate pLRU way of the subset. In one embodiment, the allocation unit 106 updates the replacement bits 114 in a manner similar to that described with respect to block 602 of FIG. 6. For another example, if the replacement policy is round-robin, the allocation unit 106 selects the way of the subset that is the way number of the round-robin pointer modulo the number of ways in the subset and rotates the round-robin pointer by one. For another example, if the replacement policy is random, the allocation unit 106 selects a random way of the subset. Flow ends at block 1304.

Figure 14:
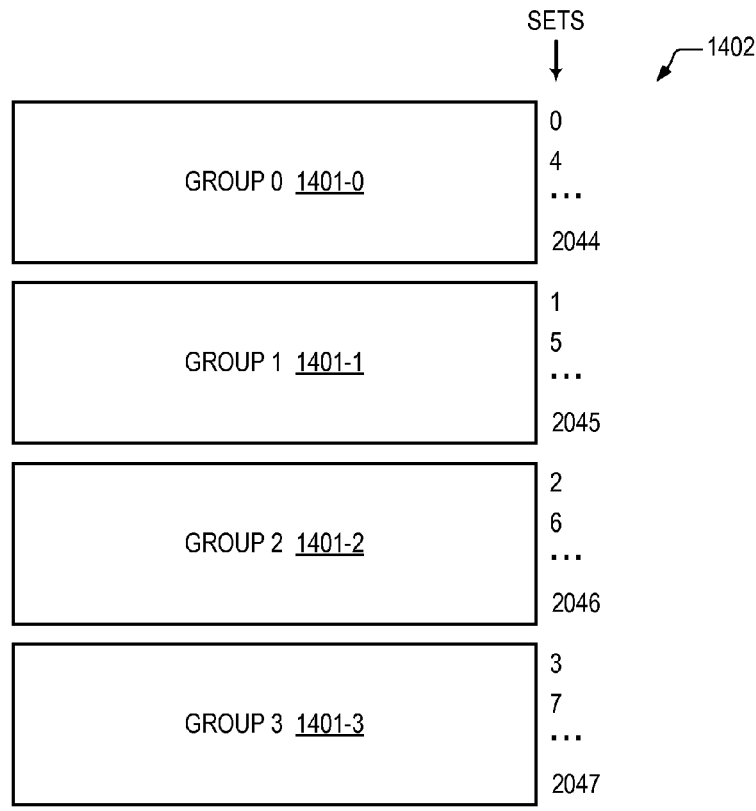
FIG. 14 is a block diagram illustrating a set associative cache memory 1402 according to an alternate embodiment.

Referring now to FIG. 14, a block diagram illustrating a set associative cache memory 1402 according to an alternate embodiment is shown. The cache memory 1402 of FIG. 14 is similar in many respects to the cache memory 1002 of FIG. 10. However, the sets of the cache memory 1402 of FIG. 14 are grouped differently from those of FIG. 10. In particular, whereas the groups 1001 of FIG. 10 include adjacently numbered sets, the groups 1401 of FIG. 14 include groups whose group number have the same result of a modulo operation of their set number by a modulus, where the modulus is the number of groups. In the example of FIG. 14, there are four groups 1401. Group 0 1401-0 includes all the sets whose set number modulo 4 is zero, namely 0, 4, 8, 12 and so forth to 2044; group 1 1401-1 includes all the sets whose set number modulo 4 is one, namely 1, 5, 9, 13 and so forth to 2045; group 2 1401-2 includes all the sets whose set number modulo 4 is two, namely 2, 6, 10, 14 and so forth to 2046; and group 3 1401-3 includes all the sets whose set number modulo 4 is three, namely 3, 7, 11, 15 and so forth to 2047. The embodiment of FIG. 14 includes logic similar to that described above with respect to FIG. 11, except the group selection logic 1106 generates a group number as just described, i.e., by performing a modulo operation on the set number using a modulus that is the number of groups. The embodiment of FIG. 14 may be advantageous for some programs that tend to clump their memory accesses for certain MATs in a manner that exhibits a correlation with a modulus. The embodiment of FIG. 14 may be synergistic with a banked cache memory embodiment in which the number of banks corresponds to the number of groups, and the sets of each bank correspond to the sets of the groups.

Preferably, the group selection logic 1106 is updatable such that it can generate a set group number 1104 for selecting the desired mapping 1008 for either a consecutive set grouping, such as that of FIG. 10, or a modulus-based set grouping, such as that of FIG. 14, or a different grouping scheme, such as a hash of the set number, a hash of tag bits of the memory address of the memory access 122, or a combination thereof. Furthermore, preferably the group selection logic 1106 is updatable to support different numbers of groups. The update of the group selection logic 1106 may be performed when the mapping 1008 is updated, such as described with respect to FIG. 12. This updatability of the group selection logic 1106 may increase the likelihood of updating the mapping 1008 with values that will improve the efficiency of the cache memory 1002/1402 for a wider variety of programs and program phases.

Figure 15:
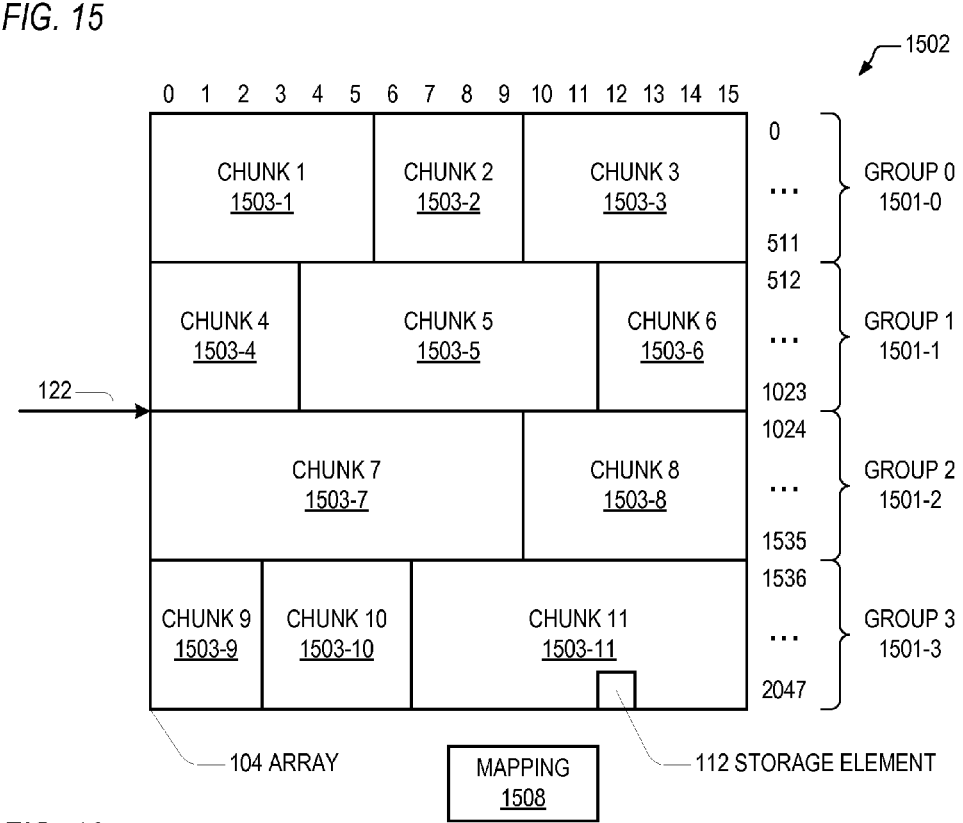
FIG. 15 is a block diagram illustrating a set associative cache memory 1502 according to an alternate embodiment.

Referring now to FIG. 15, a block diagram illustrating a set associative cache memory 1502 according to an alternate embodiment is shown. The cache memory 1502 of FIG. 15 is similar in many respects to the cache memory 1002 of FIG. 10. The cache memory 1502 of FIG. 15 includes a mapping 1508 that specifies a plurality of mutually exclusive groups of sets, which in the embodiment of FIG. 15 is four groups 1501 similar to the embodiment of FIG. 10 (although other set groupings are contemplated, such as the grouping of FIG. 14, for example). However, the mapping 1508 of FIG. 15 additionally specifies a plurality of chunks 1503 of storage elements 112 of the array 104. Assuming, generally speaking, the array 104 has N ways and L mutually exclusive groups 1501, a chunk 1503 encompasses the storage elements 112 of the array 104 that are a logical intersection of one of the L mutually exclusive groups and one or more ways of the N ways of the array 104. The example of FIG. 15 shows eleven different chunks 1503. For example, chunk 2 1503-2 is the storage elements 112 that are in group 0 1501-0 and ways 6 through 9; chunk 8 1503-8 is the storage elements 112 that are in group 2 1501-2 and ways 10 through 15; and chunk 11 1503-11 is the storage elements 112 that are in group 3 1501-3 and ways 7 through 12. In the embodiment of FIG. 15, every storage element 112 is included in a chunk 1503, in contrast to the embodiment of FIG. 17 in which, for one or more set groups, some of the ways of the group are unmapped into a chunk, as described in more detail below. A mapping structure similar to that described below with respect to FIGS. 20 and 21 may be employed to specify the chunks 1501, as may be observed from FIG. 22D. However, the parcel specifiers 2001 need not include the replacement bits pointer 2012 if the same replacement scheme is used across the entire set and all the replacement bits 114 are used for all the ways of the set.

Another characteristic of the embodiment of FIG. 15 is that the mapping 1508 associates the MATs with the chunks 1503. More specifically, for a given group 1501, there may be some MATs that the mapping 1508 does not associate with any of the chunks 1503 of the group 1501.

Figure 16:
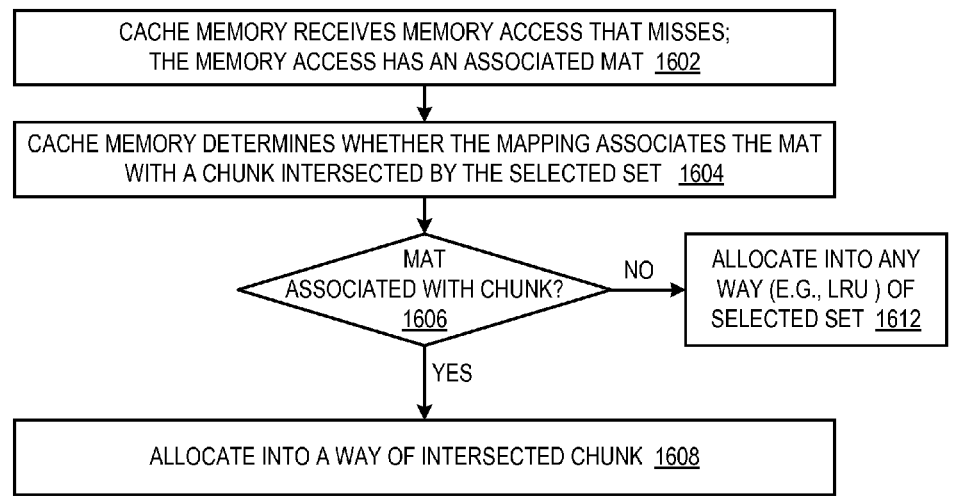
FIG. 16 is a flowchart illustrating operation of the cache memory 1502 of FIG. 15.

Referring now to FIG. 16, a flowchart illustrating operation of the cache memory 1502 of FIG. 15 is shown. Flow begins at block 1602.

At block 1602, the cache memory 1002 receives a memory access 122 that misses in the cache memory 1502. The memory access 122 index selects a set of the array 104. The memory access 122 specifies the MAT 101. Flow proceeds to block 1604.

At block 1604, the cache memory 1502 determines whether the mapping 1508 associates the MAT 101 with a chunk 1503 intersected by the selected set. Flow proceeds to decision block 1606.

At decision block 1606, if at block 1604 the cache memory 1502 determined that the mapping 1508 associates the MAT 101 with a chunk 1503 intersected by the selected set, flow proceeds to block 1608; otherwise, flow proceeds to block 1612.

At block 1608, the allocation unit 106 allocates into a way of the selected set. More specifically, the allocation unit 106 allocates into a way of the chunk 1503 intersected by the selected set, e.g., as described with respect to block 1304 of FIG. 13. If the mapping 1508 associates the MAT 101 with multiple chunks 1503 intersected by the selected set, then the allocation unit 106 allocates into any of the ways of the union of the ways of the intersected chunks 1503. Flow ends at block 1608.

At block 1612, the allocation unit 106 allocates into any of the ways of the selected set. For example, the replacement bits 114 may include bits that maintain pLRU information for the entire set, i.e., all ways of the set, and the allocation unit 106 may allocate into the pLRU way of the selected set; alternatively, the allocation unit 106 may allocate into the selected set in a true LRU, round-robin or random fashion or other of the replacement schemes described herein, such as involve prioritizing based on the MAT as an input to the replacement scheme. Flow ends at block 1612.

The following example mapping is intended to illustrate a use of the embodiment of FIGS. 15 and 16. Consider a program with the following characteristics. First, the program is very call/return heavy and generates a lot of memory accesses having the fused_store_update, store_push, store_ update and store_update_nac MATs (generally speaking, a MAT group associated with stack accesses), and they tend to index into the upper fourth of the cache memory 1902. Second, the memory accesses generated with MATs boxpf, fused_store_aps, load_aps, store_aps and store_nt aps MATs (generally a MAT group associated with media data) tend to dominate memory traffic. Third, the program tends to benefit from having dedicated ways for tablewalk MAT memory accesses, and they tend to index into the lower fourth of the cache memory 1902. Offline analysis may indicate the program would benefit from a mapping 1008 that creates: a chunk 0 that intersects a first set group that includes the top fourth of the cache memory 1902 and associates the media MAT group with ways 0 through 13; a chunk 1 that intersects the first set group and associates the stack MAT group with ways 0 through 13; a chunk 2 that intersects a second set group that includes the bottom fourth of the cache memory 1902 and associates the media data MAT group with ways 0 through 14; and a chunk 3 that intersects the second set group and associates the stack access MAT group with ways 0 through 13. In this case, the middle half of the sets of the cache memory 1902 are left unmapped with chunks because the media data and related boxpf prefetches tend to dominate (and will tend to want all ways of the cache memory 1902), and it is not necessary to insulate the tablewalk or stack memory accesses from them.

Figure 17:
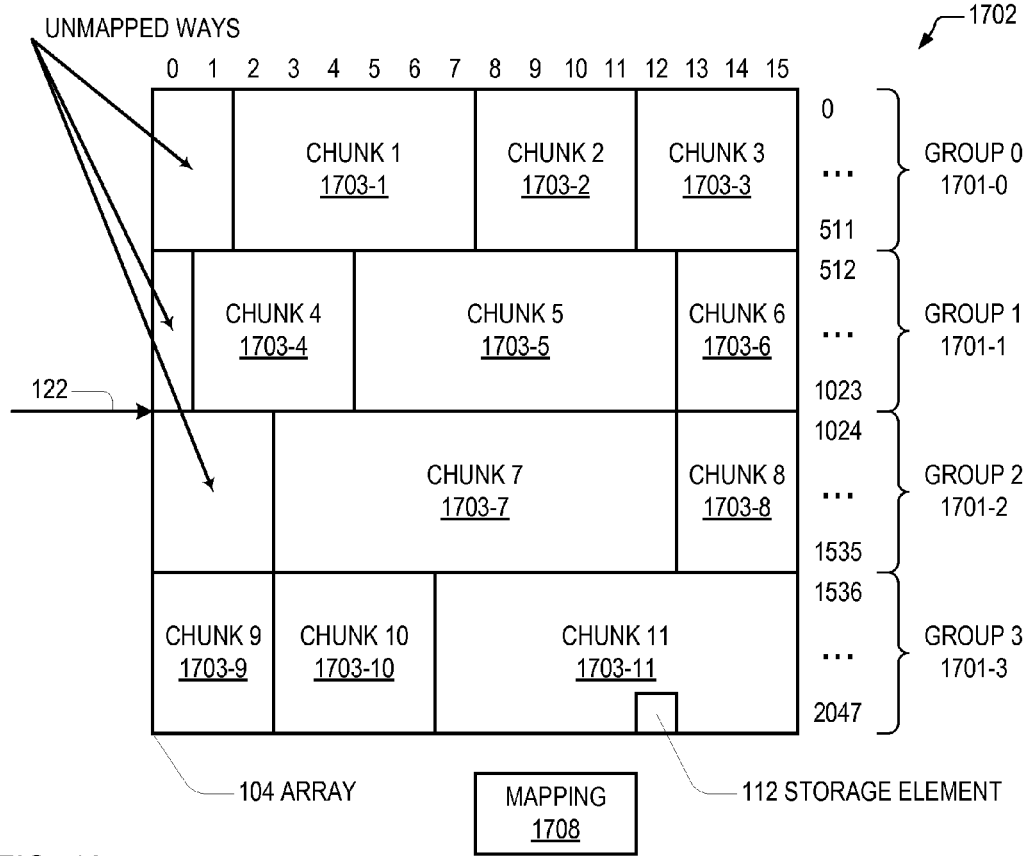
FIG. 17 is a block diagram illustrating a set associative cache memory 1702 according to an alternate embodiment.

Referring now to FIG. 17, a block diagram illustrating a set associative cache memory 1702 according to an alternate embodiment is shown. The cache memory 1702 of FIG. 17 is similar in many respects to the cache memory 1502 of FIG. 15. The cache memory 1702 of FIG. 17 includes a mapping 1708 that is different from the mapping 1508 of FIG. 15 in that, for some of the groups 1701, the mapping may not include all the ways in chunks 1703 of the group 1701. That is, there may be some ways unmapped into any of the chunks 1703 of the group 1701. In the example of FIG. 17, ways 0 through 1 of group 0 1701-0, way 0 of group 1 1701-1, and ways 0 through 2 of group 2 1701-2 are unmapped into a chunk 1703 by the mapping 1708.

Figure 18:
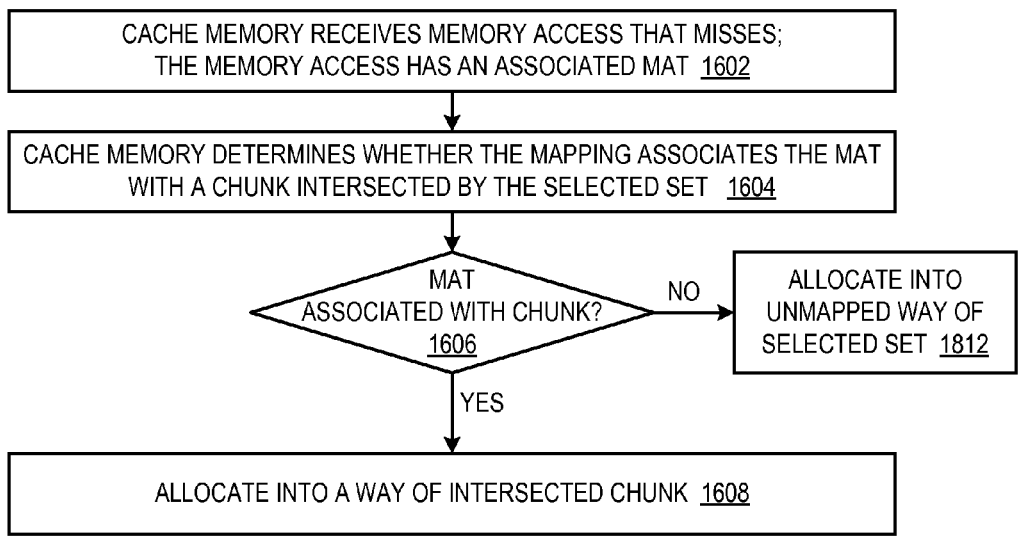
FIG. 18 is a flowchart illustrating operation of the cache memory 1702 of FIG. 17.

Referring now to FIG. 18, a flowchart illustrating operation of the cache memory 1702 of FIG. 17 is shown. FIG. 18 is similar to FIG. 16, and like-numbered blocks are similar. However, flow proceeds from the "NO" exit of decision block 1606 to a block 1812, rather than to block 1612 as in FIG. 16.

At block 1812, the allocation unit 106 allocates into any unmapped way of the selected set, e.g., as described with respect to block 1304 of FIG. 13. For example, if the selected set belongs in group 2 1701-2, then the allocation unit 106 allocates into one of ways 0 through 2, which are unmapped in the example of FIG. 17. Flow ends at block 1812.

Various embodiments are contemplated in which the granularity of a chunk varies. For example, in the embodiments of FIGS. 10, 14, 15 and 17, the sets are grouped into four mutually exclusive groups, thereby allowing for up to 64 chunks (4 groups of set×16 ways). However, other embodiments are contemplated with different numbers of mutually exclusive groups to allow for more or less chunks. In one embodiment, each set may be its own mutually exclusive group such that each storage element, or entry, in the cache memory may be a chunk. It is noted that the larger the number of groups the more fine-grained the cache memory may be budgeted to tailor it towards the needs of the analyzed program, whereas the fewer the number of groups the less control bits are needed to describe the chunk characteristics.

Figure 19:
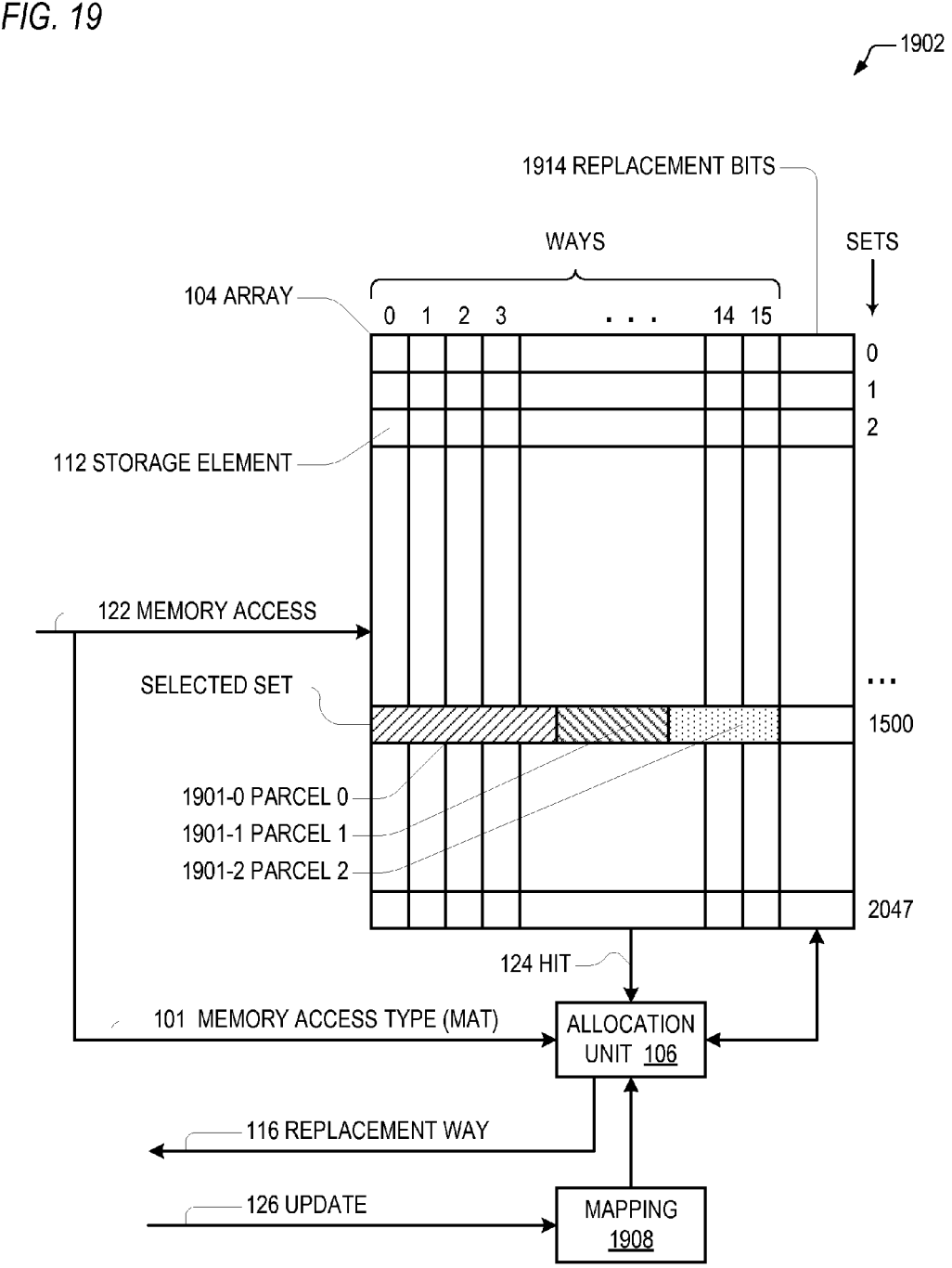
FIG. 19 is a block diagram illustrating a set associative cache memory 1902.

Referring now to FIG. 19, a block diagram illustrating a set associative cache memory 1902 is shown. The cache memory 1902 of FIG. 19 is similar in many respects to the cache memory 102 of FIG. 1 and like-numbered elements are similar. However, the cache memory 1902 of FIG. 19 includes a mapping 1908 that is different from the mapping 108 of FIG. 1. Additionally, the replacement bits 1914 are different from the replacement bits 114 of FIG. 1. The mapping 1908 and replacement bits 1914 of FIG. 19 enable the cache memory 1902 to employ a heterogeneous replacement scheme. That is, each set has subsets of ways, referred to as parcels, and each parcel has its own replacement scheme. That is, each parcel of a set may include a different number of ways and may use a different portion of the replacement bits 1914 of the set and may employ a different replacement scheme for replacing ways within the parcel, as described in more detail below. Offline analysis, for example, may reveal that some programs benefit from grouping MATs into the parcels and then employing different replacement schemes for the parcels.

In FIG. 19, three parcels 1901 are shown within a selected set at index 1500, for example. Parcel 0 1901-0 includes ways 0 through 4 of the set, parcel 1 1901-1 includes sets 5 through 12, and parcel 2 1901-2 includes sets 13 through 15. The replacement bits 1914 include separate portions for each of the parcels 1901, as described in more detail with respect to FIG. 20. In one embodiment, parcels 1901 are global to all sets of the cache memory 1902, i.e., every set of the array 104 is parceled the same, as illustrated with respect to FIG. 22C. This embodiment is compatible with the embodiment of FIG. 1, for example. In another embodiment, parcels 1901 are associated with groups of sets, i.e., every set group 2291 is parceled the same, as illustrated with respect to FIG. 22D. This embodiment is compatible with the embodiments of FIGS. 10 through 18, for example. In another embodiment, parcels 1901 are associated with individual sets, i.e., every set has its own parcels, as illustrated with respect to FIG. 22E.

Figure 20:
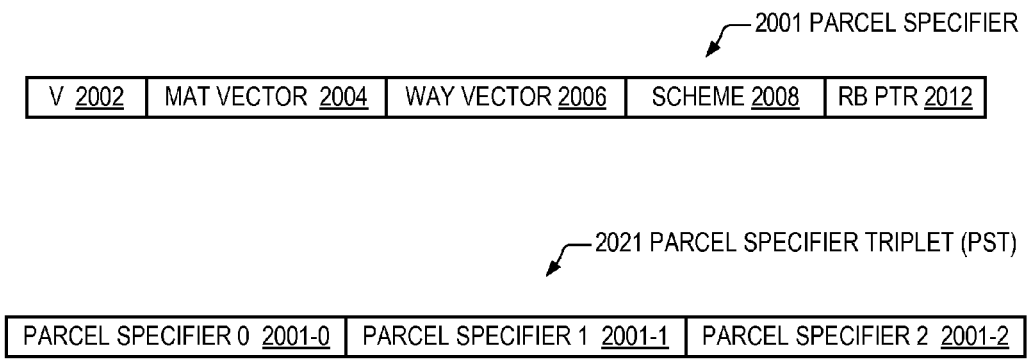
FIG. 20 is a block diagram illustrating a parcel specifier 2001 and a parcel specifier triplet 2021 according to one embodiment.

Referring now to FIG. 20, a block diagram illustrating a parcel specifier 2001 and a parcel specifier triplet 2021 according to one embodiment is shown. The parcel specifier 2001 includes a valid bit 2002, a MAT vector 2004, a way vector 2006, a replacement scheme 2008, and a replacement bits pointer 2012. The valid bit 2002 indicates whether the parcel specifier 2001 is valid. The number of parcels 1901 for a selected set is determined by the number of true valid bits 2002 in the parcel specifier triplet 2021, described in more detail below.

The MAT vector 2004 has a corresponding bit for each MAT of the plurality of MAT (e.g., the 32 MATs of Table 1). A set bit in the MAT vector 2004 indicates the corresponding MAT is associated with the parcel 1901. In an alternate embodiment, the parcel specifier 2001 includes a MAT group vector rather than a MAT vector 2004. The MAT group vector has a corresponding bit for each MAT group (e.g., 4 MAT groups). In this embodiment, the mapping 1908 includes a MAT to MAT group mapping, such as described with respect to FIG. 29, for example. The allocation unit 106 uses the MAT 101 of the memory access 122 as an input to the MAT to MAT group mapping and uses the MAT group output to the parcel specifier 2001 of the parcel to allocate into. The MAT group vector may require fewer bits than the MAT vector 2004, which may be particularly advantageous if the number of parcel specifiers 2001 is relatively large.

The way vector 2006 has a corresponding bit for each way of the N ways of the array 104 (e.g., 16 ways). A set bit in the way vector 2006 indicates the corresponding way is included in the parcel 1901. That is, the way vector 2006 specifies the subset of ways included in the parcel 1901. In an alternate embodiment, the way vector 2006 includes first and second portions that are Boolean operated upon with the portion of the replacement bits 1914 associated with the parcel 1901 to generate the new value (e.g., pLRU vector) with which to update the replacement bits 1914, similar to the manner described above with respect to an alternate embodiment of FIG. 6. In this embodiment, the subset of ways included in the parcel 1901 is indirectly specified, and the allocation unit 106 derives the subset of included ways from the way vector 2006. In another alternate embodiment, the parcel specifier 2001 includes a way pointer rather than a way vector 2006. The way pointer points to the first way in the parcel 1901. In this embodiment, the ways included in a parcel are all adjacent. The pointer may also specify the number of ways; alternatively, the first parcel 1901 must specify way 0 in its way pointer, and the allocation unit 106 computes the number of ways as the difference of adjacent way pointers.

The replacement scheme 2008 specifies the replacement policy that is used to replace, or allocate into, the associated parcel 1901. In one embodiment, the different replacement schemes (e.g., true LRU, pLRU, round-robin, random, priority by MAT, various hybrids include MAT priorities, and so forth) are numbered and the replacement scheme field 2008 holds the encoded value of the replacement scheme.

The replacement bits pointer 2012 specifies the portion of the replacement bits 1914 that are used as the replacement policy bits for the associated parcel 1901. Preferably, the replacement bits pointer 2012 points to the first bit of the portion of the replacement bits 1914 that are used as the replacement policy bits for the associated parcel 1901. The number of replacement bits 1914 required for a parcel 1901 depends upon the number of ways in the parcel 1901 and the scheme 2008. In one embodiment, bits for the pointer 2012 are not included, but are instead computed by the allocation unit 106 from the number of valid parcels 1901, the number of ways of the parcels 1901, and the schemes 2008, i.e., the number of bits required for a given scheme 2008 and its associated number of ways.

In the case of a parcel 1901 that includes a single way, there is no need for any of the replacement bits 1914 to be consumed by that parcel 1901 since the one way of the parcel 1901 will always be replaced. In the case of a parcel 1901 that is two ways and has a LRU replacement scheme 2008, a single bit of the replacement bits 1914 may be used to indicate the LRU way of the two ways, for example. Alternatively, assume a four way parcel 1901 with a replacement scheme 2008 based on MAT priorities, e.g., the MAT vector 2004 associates five different MATs with the parcel, and two of them (e.g., load_supervisor and store_supervisor) are higher priority than the other three MATs. In this case, there are four replacement bits 1914 (equal to the number of ways of the parcel), and if a replacement bit 1914 is true it indicates the way was allocated in response to a memory access with the higher priority load_supervisor or store_supervisor MAT and otherwise the replacement bit 1914 is false; the allocation unit 106 attempts to replace a way with a false replacement bit 1914 and avoid replacing a way with a true replacement bit 1914. An extension of the replacement scheme 2008 just described is to have additional replacement bits 1914 for each parcel that indicate the LRU way among ways that are associated with the higher priority MATs. So, for example, if all four ways of the parcel 1901 are associated with a high priority MAT, the allocation unit 106 allocates into the LRU way of the four ways as indicated by the LRU-related replacement bits 1914 of the parcel 1901. Other replacement schemes that incorporate priority with respect to MATs are contemplated. Other replacement schemes 2008 include round-robin, in which the portion of the replacement bits 1914 specifies the last way allocated within the parcel 1901.

The parcel specifier triplicate (PST) 2021 includes three parcel specifiers 2001, denoted parcel specifier 1 2001-1, parcel specifier 2 2001-2, and parcel specifier 3 2001-3. The embodiment of FIG. 20 with the PST 2021 limits the number of parcels 1901 per set to three. However, other embodiments are contemplated in which the maximum number of parcels 1901 (and therefore, parcel specifiers 2001) per set is different than three, but is at least two. In an embodiment in which parcels 1901 are global to all sets of the cache memory 1902 (e.g., FIG. 22C), there is a single PST 2021 for the cache memory 1902. In an embodiment in which parcels 1901 are associated with groups of sets (e.g., FIG. 22D), there is a PST 2021 per set group 2291. In an embodiment in which parcels 1901 are associated with individual sets (e.g., FIG. 22E), there is a PST 2021 per set.

Figure 21:
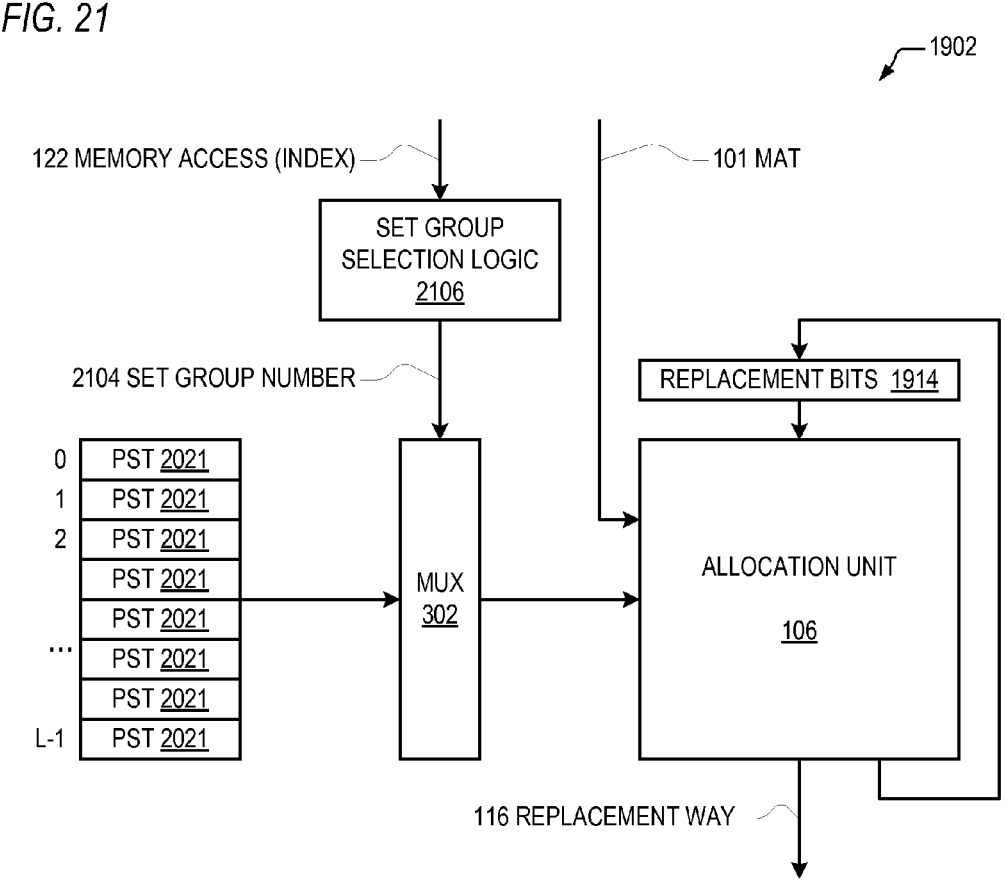
FIG. 21 is a block diagram illustrating a portion of the cache memory 1902 of FIG. 19 in more detail.

Referring now to FIG. 21, a block diagram illustrating a portion of the cache memory 1902 of FIG. 19 in more detail is shown. FIG. 21 describes an embodiment in which parcels 1901 are associated with groups of sets (e.g., FIG. 22D). In the embodiment of FIG. 21, the mapping 1908 of FIG. 19 includes a PST 2021 for each of a plurality of groups, denoted L in FIG. 21. A mux 302 receives the L PSTs 2021 and selects one of them for provision to the allocation unit 106 based on the value of a set group number 2104 that is generated by set group selection logic 2106 in response to the memory access 122, in particular, the index portion of the memory access 122 of the memory access 122. The MAT indicator 101 of the memory access 122 is provided to the allocation unit 106. In one embodiment, the allocation unit 106 selects the parcel 1901 associated with the memory access 122 based on the MAT 101 and the PST 2021. However, in other embodiments, the allocation unit 106 selects the parcel 1901 associated with the memory access 122 based on the memory address of the memory access 122 and the PST 2021 without use of the MAT 101. That is, the employment of a heterogeneous replacement policy in a cache memory may be used with a cache memory that does not receive MATs. The allocation unit 106 also receives the replacement bits 1914 of FIG. 19 of the selected set, i.e., the set of the cache memory 102 selected by the index of the memory access 122 memory address. Based on the selected PST 2021 and the portion of the replacement bits 1914 specified by the parcel specifier 2001, and in some embodiments also based on the MAT 101, the allocation unit 106 generates the replacement way 116 of FIG. 19. The allocation unit 106 also updates the portion of the replacement bits 1914 specified by the parcel specifier 2001 based on the value of the replacement way 116.

Figure 22A:
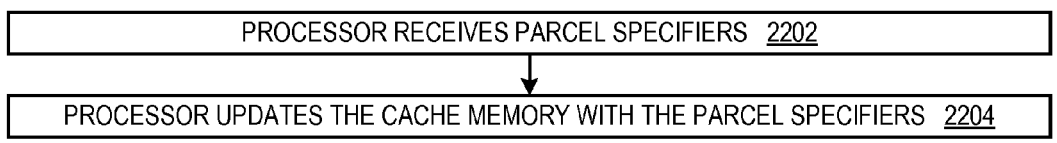
FIG. 22A is a flowchart illustrating operation of a processor that includes the cache memory 1902 of FIG. 19.

Referring now to FIG. 22A, a flowchart illustrating operation of a processor that includes the cache memory 1902 of FIG. 19 is shown. Flow begins at block 2202.

At block 2202, the processor receives a mapping that includes the parcel specifier triplets 2021 of FIG. 20. Flow proceeds to block 2204.

At block 2204, the processor updates the mapping 1908 of the cache memory 1902 with the mapping received at block 2202 via the update input 126 of FIG. 19. Flow ends at block 2204.

Figure 22B:
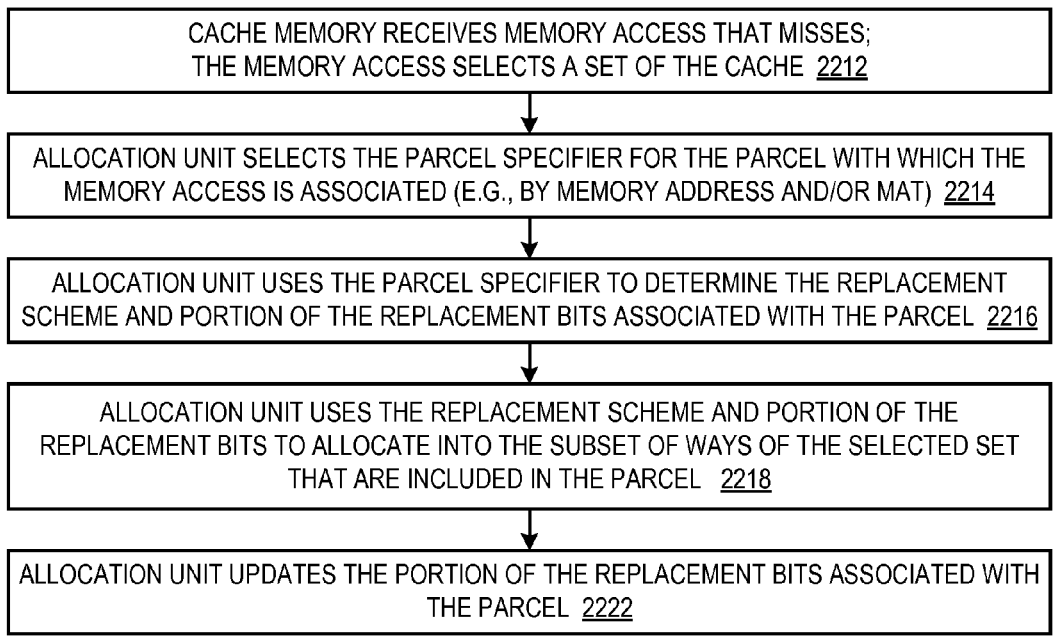
FIG. 22B is a flowchart illustrating operation of the cache memory 1902 of FIG. 19 according to one embodiment.

Referring now to FIG. 22B, a flowchart illustrating operation of the cache memory 1902 of FIG. 19 according to one embodiment is shown. Flow begins at block 2212.

At block 2212, the cache memory 1902 receives a memory access 122 that misses in the cache memory 1902. The memory access 122 index selects a set of the array 104. The memory access 122 specifies the MAT 101. The memory address of the memory access 122 is also used to determine the set group associated with the selected set, e.g., the set group selection logic 2106 generates the set group number 2104 of FIG. 21 in response to the memory address of the memory access 122. In the global parcel embodiment (e.g., FIG. 22C), there is no need to select a PST 2021 because there is only a single PST 2021. In the parcel-per-set embodiment (e.g., FIG. 22E), the selection of the set also selects the PST 2021 because it is associated with the selected set. Flow proceeds to block 2214.

At block 2214, the allocation unit 106 determines which parcel 1901 the memory access 122 is associated with and selects the parcel specifier 2001 of the associated parcel 1901. In the embodiment of FIG. 21, the allocation unit 106 examines the PST selected 2021 and determines from it which parcel specifier 2001 to select. The allocation unit 106 examines the MAT vector 2004 of each parcel specifier 2001 to determine which one specifies the MAT 101. The allocation unit 106 selects the parcel specifier 2001 that specifies the MAT 101. In one embodiment, if the MAT 101 is not specified by the MAT vector 2004 of any of the parcel specifiers 2001, then the allocation unit 106 allocates into any of the ways of the selected set.

In an alternate embodiment, the allocation unit 106 determines the parcel 1901 from the memory address of the memory access 122 without reference to the MAT 101 but instead by comparing the memory address with a set or range of memory addresses provided to the allocation unit 106. In one embodiment, a thrashing detector of the processor (e.g., a bloom filter) monitors for cache line allocations that match recent evictions. The thrashing may occur, for example, because a program is generating random memory accesses to a large data structure. If the program is exhibiting this behavior—for example, the program is traversing a linked list through memory in such a manner that creates a worst-case scenario for the current replacement scheme, e.g., pLRU—the poor temporal and spatial locality of the behavior may result in very low hit rates in the cache memory 1902. The thrashing detector determines a set of memory addresses in which the thrashing is occurring, and provides the set of memory addresses to the allocation unit 106. The PSTs 2021 are updated to create separate parcels 1901 associated with the set of memory addresses such that the allocation unit 106 employs a random replacement scheme for allocations into sets implicated by a memory access 122 that falls into the set of memory addresses specified by the thrashing detector. Changing to a random replacement policy may or may not help the cache hit rate on the memory accesses; however, specifying a parcel 1901 for them in addition to the new replacement policy may improve overall program performance by insulating the program's remaining data from the ill-behaved random accesses.

In another embodiment, a streaming data detector, for example in a prefetcher of the processor such as the bounding box prefetcher, detects streaming data memory accesses 122 within a range of memory addresses that should be quarantined into a small subset of the ways of the cache memory 1902 and/or for which a different replacement scheme would be beneficial. For example, assume a program is operating on a large data structure in memory in a regular fashion (e.g., the program consists of nested loops iterating over a multidimensional array of objects). The regularity can have bad effects on the memory hierarchy, depending upon the relative sizes of the array and the cache memory 1902 and/or the replacement policy. If the objects in the data structure are compact, and if the cache lines are accessed with regular stride, the effect on the cache memory 1902 is to effectively fill up the cache memory 1902 with data that is essentially use-once data while kicking out potentially useful data that is not part of the data structure. It should be noted that the data may not actually be use-once, but if the data structure is large enough to alias many times (e.g., greater than 16, the number of ways of the cache memory 1902) into the same set, the data may as well be use-once because the Nth cache line is unlikely to be accessed again before the cache memory 1902 is forced to kick it out to make room for the N+16th cache line. In this case, the prefetcher identifies these streams and signals to the cache memory 1902 that memory accesses 122 that are prefetches generated by the prefetcher within the range of memory addresses provided by the prefetcher to the allocation unit 106 should be quarantined into a parcel 1901 having a small subset of the ways of the cache memory 1902. In addition to (or possibly instead of) quarantining the new allocations, the prefetcher directs the cache memory 1902 to employ a different replacement policy (e.g. round-robin/FIFO or random) for the ways to which the allocations are directed. The PSTs 2021 are accordingly updated to create the necessary parcels 1901 with the appropriate replacement schemes.

Flow proceeds from block 2214 to block 2216.

At block 2216, the allocation unit 106 uses the parcel specifier 2001 selected at block 2214 to determine the subset of ways, replacement scheme and portion of the replacement bits 1914 associated with the parcel 1901. Flow proceeds to block 2218.

At block 2218, the allocation unit 106 uses the associated replacement scheme and portion of the replacement bits 1914 to allocate into the subset of ways associated with the parcel 1901 of the selected set, e.g., indicated on the replacement way 116. Flow proceeds to block 2222.

At block 2222, the allocation unit 106 updates the portion of the replacement bits 1914 associated with the parcel 1901 based on the way that was allocated into at block 2218. Flow ends at block 2222.

Referring now to FIG. 22C, a block diagram illustrating an embodiment of the cache memory 1902 of FIG. 19 that employs a heterogeneous replacement policy is shown. In the embodiment of FIG. 22C, the parcels 1901 are global to all sets of the cache memory 1902, i.e., every set of the array 104 is parceled the same. In FIG. 22C, for all the sets of the array 104, the subset of ways 0 through 5 are included in parcel 0 and specified by parcel specifier 0 as shown with the bottom-to-top diagonal line shading, the subset of ways 6 through 9 are included in parcel 1 and specified by parcel specifier 1 as shown with the top-to-bottom diagonal line shading, and the subset of ways 10 through 15 are included in parcel 2 and specified by parcel specifier 2 as shown with the cross-hatched shading.

Figure 22D:
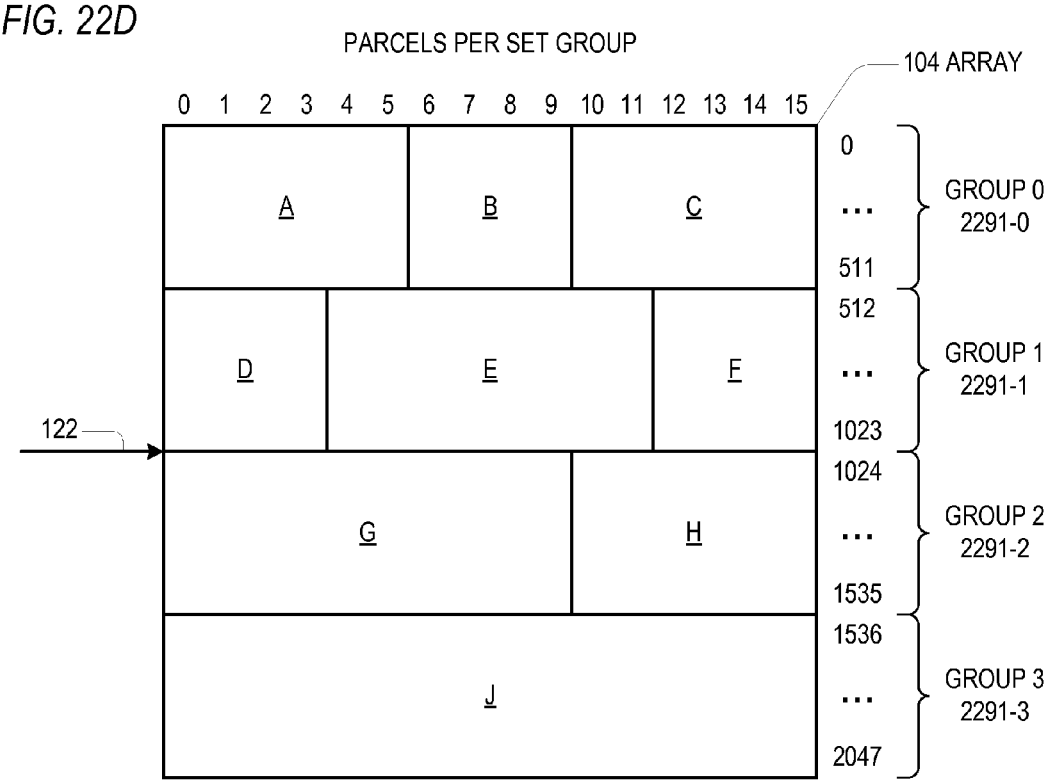
FIG. 22D is a block diagram illustrating an embodiment of the cache memory 1902 of FIG. 19 that employs a heterogeneous replacement policy.

Referring now to FIG. 22D, a block diagram illustrating an embodiment of the cache memory 1902 of FIG. 19 that employs a heterogeneous replacement policy is shown. In the embodiment of FIG. 22D, the parcels 1901 are associated with groups 2291 of sets, i.e., every set group 2291 is parceled the same. In FIG. 22D, for set group 0 2291-0 (sets 0 through 511) of the array 104: the subset of ways 0 through 5 are included in parcel A and specified by parcel specifier 1, the subset of ways 6 through 9 are included in parcel B and specified by parcel specifier 2, and the subset of ways 10 through 15 are included in parcel C and specified by parcel specifier 3. For set group 1 2291-1 (sets 512 through 1023) of the array 104: the subset of ways 0 through 3 are included in parcel D and specified by parcel specifier 4, the subset of ways 4 through 11 are included in parcel E and specified by parcel specifier 5, and the subset of ways 12 through 15 are included in parcel F and specified by parcel specifier 6. For set group 2 2291-2 (sets 1024 through 1535) of the array 104: the subset of ways 0 through 9 are included in parcel G and specified by parcel specifier 7, and the subset of ways 10 through 15 are included in parcel H and specified by parcel specifier 8; that is, group 2 2291-2 includes only two parcels 1901. For set group 3 2291-3 (sets 1536 through 2047) of the array 104: all of ways 0 through 15 are included in parcel J and specified by parcel specifier 9; that is, group 3 2291-3 includes only one parcel 1901.

Referring now to FIG. 22E, a block diagram illustrating an embodiment of the cache memory 1902 of FIG. 19 that employs a heterogeneous replacement policy is shown. In the embodiment of FIG. 22E, the parcels 1901 are associated with individual sets, i.e., every set has its own parcels. In FIG. 22E, for set 0: the subset of ways 0 through 5 are included in parcel A and specified by parcel specifier 1, the subset of ways 6 through 9 are included in parcel B and specified by parcel specifier 2, and the subset of ways 10 through 15 are included in parcel C and specified by parcel specifier 3. For set 1 of the array 104: the subset of ways 0 through 3 are included in parcel D and specified by parcel specifier 4, the subset of ways 4 through 11 are included in parcel E and specified by parcel specifier 5, and the subset of ways 12 through 15 are included in parcel F and specified by parcel specifier 6. For set 2 of the array 104: the subset of ways 0 through 9 are included in parcel G and specified by parcel specifier 7, and the subset of ways 10 through 15 are included in parcel H and specified by parcel specifier 8. For set 2047 of the array 104: the subset of ways 0 through 3 are included in parcel J and specified by parcel specifier 9, the subset of ways 4 through 7 are included in parcel K and specified by parcel specifier 10, and the subset of ways 8 through 15 are included in parcel L and specified by parcel specifier 11. The illustrated parcels 1901 are representative, and not all parcels 1901 of the array 104 are shown for succinctness.

Various tendencies may be observed by offline analysis of programs and program threads, and an efficient mapping may be determined for them and provided to the cache memory 1902 for updating the mapping 1908 to increase the efficiency of the cache memory 1902 when the program is running, similar to the manner described above with respect to FIGS. 7-9.

Figure 23:
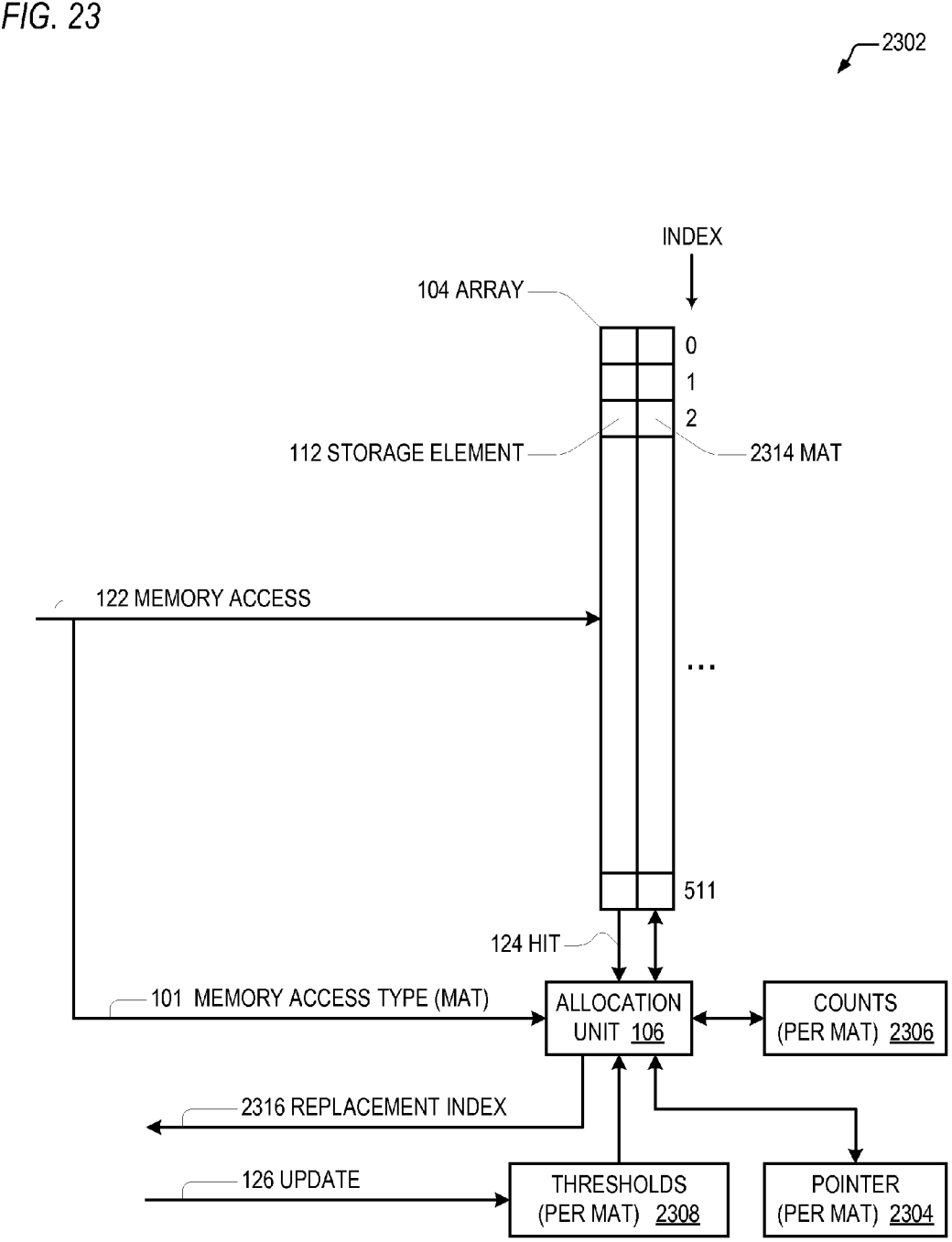
FIG. 23 is a block diagram illustrating a fully associative cache memory 2302.

Referring now to FIG. 23, a block diagram illustrating a fully associative cache memory 2302 is shown. The fully associative cache memory 2302 includes an array 104 of storage elements 112 each having an index, which in the example of FIG. 23 is 0 through 511, although other embodiments are contemplated with different numbers of storage elements 112. Preferably, the fully associative cache memory 2302 is a relatively small cache memory to accomplish acceptable timing. The fully associative cache memory 2302 receives a memory access 122 that has an associated MAT 101. The fully associative cache memory 2302 includes an allocation unit 106 that receives a hit indication 124 from the array 104. The storage element 112, memory access 122, and allocation unit 106 are similar to those described above except where noted. Each storage element 112 of the array 104 includes a corresponding MAT 2314 that specifies the MAT of the memory access that precipitated the allocation of the storage element 112.

The fully associative cache memory 2302 also includes counters 2306, one associated with each MAT, in communication with the allocation unit 106. Each counter 2306 maintains a count of the number of valid entries (storage elements 112) of the array 104 whose MAT 2314 is of the MAT associated with the counter 2306.

The fully associative cache memory 2302 also includes thresholds 2308, one associated with each MAT, in communication with the allocation unit 106. Each threshold 2308 specifies the maximum number of valid entries of the array 104 that may be allocated to a memory access 122 having the MAT associated with the threshold 2308. The thresholds 2308 are dynamically updatable via an update 126 input similar to the update inputs 126 described above. An example of the thresholds 2308 is described below with respect to FIG. 24.

Preferably, the fully associative cache memory 2302 also includes pointers 2304, one associated with each MAT, in communication with the allocation unit 106. In one embodiment, each pointer 2304 specifies the index of the most recently replaced one of the valid entries of the array 104 that is associated with the MAT. The pointer 2304 is used to allocate in a round-robin fashion with respect to valid entries having the MAT when the count 2306 of the MAT has reached the threshold 2308 for the MAT. In another embodiment, each pointer 2304 specifies the index of the LRU or pLRU one of the valid entries of the array 104 that is associated with the MAT. The pointer 2304 is used to allocate in a LRU or pLRU fashion with respect to valid entries having the MAT when the count 2306 of the MAT has reached the threshold 2308 for the MAT. In one embodiment, some of the MATs may employ the pointer 2304 in one replacement policy and other of the MATs may employ the pointer 2304 in another replacement policy, preferably whichever is most efficient as determined by offline analysis. The pointer 2304 may include one or more bits that indicate the desired replacement policy.

The allocation unit 106 generates a replacement index 2316 based on the MAT 101, counters 2306, thresholds 2308 and pointers 2304 in response to a memory access 122 that misses in the fully associative cache memory 2302. The replacement index 2316 specifies the index of the storage element 112 to be allocated into, or replaced, as described in more detail below.

Referring now to FIG. 24, a mapping of MATs to their respective thresholds 2308 of FIG. 23 according to one embodiment is shown. The example mapping of FIG. 24 includes 32 MATs that correspond to Table 1, for illustration purposes. The mapping of the example of FIG. 24 is reproduced below in Table 3.

TABLE 3

| Memory Access Type (MAT) | Threshold |
| --- | --- |
| boxpf | 50 |
| fp_load | 70 |
| fp_store | 70 |
| fused_fp_store | 70 |
| fused_load | 90 |
| fused_store | 90 |
| fused_store_aps | 300 |
| fused_store_update | 30 |
| gpf | 45 |
| l1dpf | 35 |
| Load | 150 |
| load_aps | 44 |
| load_descr | 73 |

TABLE 3-continued

| Memory Access Type (MAT) | Threshold |
| --- | --- |
| load_nac | 99 |
| load_nt | 90 |
| load_store | 786 |
| load_supervisor | 321 |
| load_zx | 67 |
| pf_l1d | 21 |
| pf_l2 | 59 |
| pf_nt | 102 |
| pf_w | 115 |
| store | 450 |
| store_aps | 33 |
| store_mask | 90 |
| store_nt | 5 |
| store_nt_aps | 45 |
| store_push | 56 |
| store_supervisor | 88 |
| store_update | 98 |
| store_update_nac | 33 |
| tablewalk | 100 |

It should be understood that although FIG. 24 (and Table 3) describes a particular set of MATs and a particular mapping of the MATs to their respective thresholds, the embodiment is provided as an example for illustration purposes, and other embodiments are contemplated with a different set of MATs and different mappings of MATs to thresholds. Indeed, in one embodiment the mapping is dynamically updated (e.g., via the update input 126 of FIG. 1) during operation of the processor based on which program or program phase is currently running, such as described below with respect to FIGS. 7-9.

Figure 25:
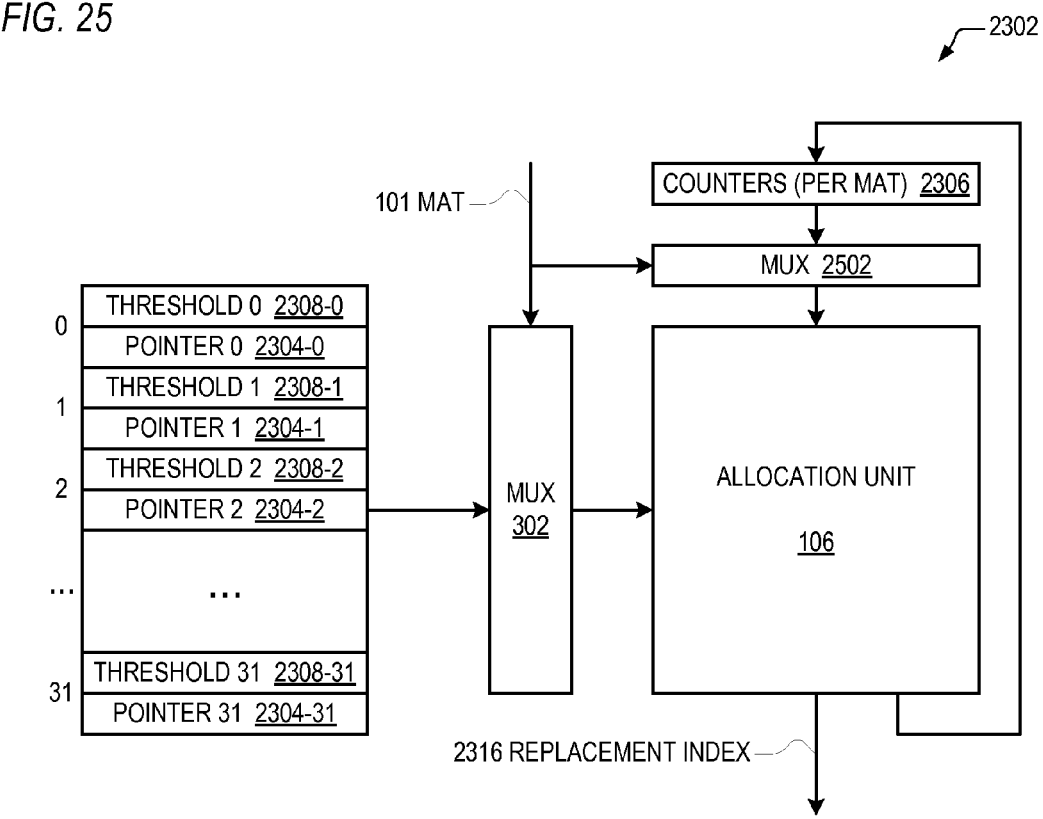
FIG. 25 is a block diagram illustrating a portion of the cache memory 102 of FIG. 1 in more detail.

Referring now to FIG. 25, a block diagram illustrating a portion of the cache memory 102 of FIG. 1 in more detail is shown. In the embodiment of FIG. 25, the pointer 2304 and threshold 2308 pair for each of the 32 MATs is provided to a mux 302 that selects one of the pairs based on the value of the MAT indicator 101 of the memory access 122, and the selected pointer 2304 and threshold 2308 pair is provided to the allocation unit 106 of FIG. 23.

Additionally, the counter 2306 for each of the 32 MATs is provided to a second mux 2502 that selects one of the counters 2306 based on the value of the MAT 101. Based on the selected pointer 2304, counter 2306 and threshold 2308, the allocation unit 106 generates the replacement index 2316 of FIG. 23. The allocation unit 106 also updates the MAT 2314 of FIG. 23, the counters 2306 and the pointer 2304 based on the value of the replacement index 2316, as described in more detail below with respect to FIGS. 27 and 30, for example.

Similar to the manner described above with respect to FIG. 3, in an alternate embodiment, the cache memory 102 may include logic that maps a larger number of MATs (e.g., 32) into a smaller number of MAT groups (e.g., two), as described below with respect to FIGS. 29 and 30. For example, in the embodiment of FIG. 25, MAT grouping logic (not shown) receives the MAT 101 and outputs a MAT group number that is provided as the selection input to the mux 302 and the mux 2502 (rather than the MAT 101). This may advantageously reduce hardware costs by reducing the number of counters 2306, thresholds 2308 and pointers 2304, and may reduce the size of each MAT 2314 storage element.

Figure 26:
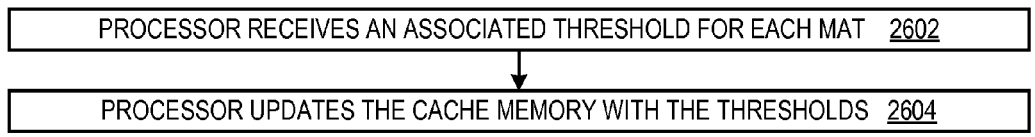
FIG. 26 is a flowchart illustrating operation of a processor that includes the cache memory 2302 of FIG. 23.

Referring now to FIG. 26, a flowchart illustrating operation of a processor that includes the cache memory 2302 of FIG. 23 is shown. Flow begins at block 2602.

At block 2602, the processor receives a mapping that associates each MAT of a plurality of MATs (e.g., of Table 1) to a threshold (e.g., the mapping of FIG. 24 and Table 3). Preferably, the cache memory 102 is manufactured with a default mapping of thresholds 2308. Preferably, the default mapping of thresholds 2308 is tailored to facilitate efficient operation of the cache memory 2302 for a large variety of programs, or at least for a population of programs deemed of particular interest and/or likely to be executed on the processor that includes the cache memory 2302. Flow proceeds to block 2604.

At block 2604, the processor updates the mapping of thresholds 2308 of the cache memory 2302 with the mapping received at block 2602 via the update input 126 of FIG. 23. Preferably the mapping 2308 is updated by system software (e.g., BIOS or the operating system) at system initialization and/or boot of the operating system. Furthermore, preferably the mapping 2308 is updated on a per program basis and/or a per program phase basis, such as described above with respect to FIGS. 7-9. Flow ends at block 2604.

Figure 27:
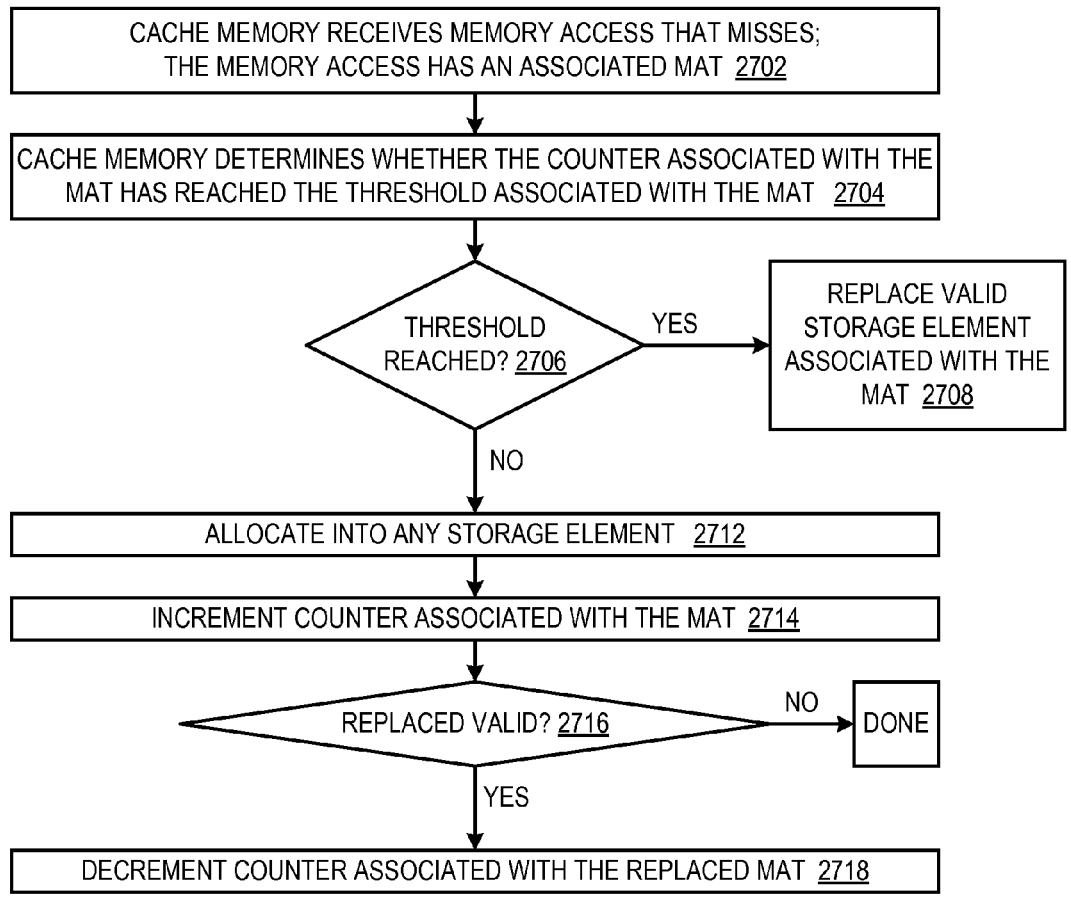
FIG. 27 is a flowchart illustrating operation of the cache memory 2302 of FIG. 23.

Referring now to FIG. 27, a flowchart illustrating operation of the cache memory 2302 of FIG. 23 is shown. Flow begins at block 2702.

At block 2702, the cache memory 2302 receives a memory access 122 that misses in the cache memory 2302. The memory access 122 index selects an entry 112 of the array 104. The memory access 122 specifies the MAT 101. Flow proceeds to block 2704.

At block 2704, the allocation unit 106 determines whether the counter 2306 associated with the MAT 101 of the memory access 122 has reached the threshold 2308 associated with the MAT 101. Flow proceeds to decision block 2706.

At decision block 2706, if the counter 2306 associated with the MAT 101 of the memory access 122 has reached the threshold 2308 associated with the MAT 101, flow proceeds to block 2708; otherwise, flow proceeds to block 2712.

At block 2708, the allocation unit 106 replaces a valid entry 112 of the array 104 whose MAT 2314 matches the MAT 101 of the memory access 122. As described above with respect to FIG. 23, the entry 112 to be replaced may be selected by various replacement policies, preferably using the pointer 2304 associated with the MAT 101. Flow ends at block 2708.

At block 2712, the allocation unit 106 allocates into any entry 112 of the array 104. The replacement policy used may be any of those described herein. In one embodiment, the fully associative cache memory 2302 maintains a global pointer (not shown) that points to the index of the most recently replaced one of the valid entries of the array 104 irrespective of MAT. Preferably, the allocation unit 106 finds the next entry 112 after the one pointed to by the pointer that is either invalid or that does not have the MAT 101 of the memory access 122. Flow proceeds to block 2714.

At block 2714, the allocation unit 106 increments the counter 2306 associated with the MAT 101 of the memory access 122. Flow proceeds to decision block 2716.

At decision block 2716, the allocation unit 106 determines whether the replaced entry 112 was valid. If so, flow proceeds to block 2718; otherwise, flow ends.

At block 2718, the allocation unit 106 decrements the counter 2306 associated with the MAT 2314 of the replaced entry 112. Flow ends at block 2718.

Figure 28:
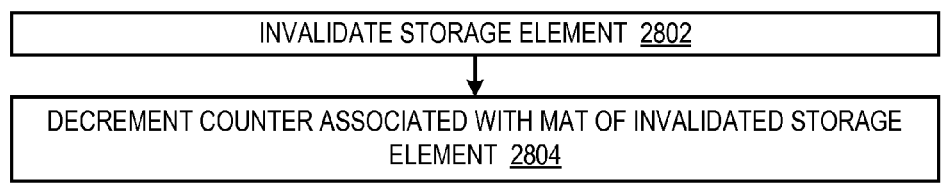
FIG. 28 is a flowchart illustrating operation of the fully associative cache memory 2302 of FIG. 23.

Referring now to FIG. 28, a flowchart illustrating operation of the fully associative cache memory 2302 of FIG. 23 is shown. Flow begins at block 2802.

At block 2802, the fully associative cache memory 2302 invalidates an entry 112, e.g., in response to an eviction of the cache line from the fully associative cache memory 2302 or to a snoop. Flow proceeds to block 2804.

At block 2804, the fully associative cache memory 2302 decrements the counter 2306 associated with the MAT 2314 of the invalidated entry 112. Flow ends at block 2804.

Referring now to FIG. 29, a block diagram illustrating a mapping 2908 of MATs to MAT groups 2909 and a mapping of MAT groups 2909 to thresholds 2911, according to one embodiment is shown. In the example of FIG. 29, there are four MAT groups, denoted MAT group 0, MAT group 1, MAT group 2 and MAT group 3. The thresholds 2911 of FIG. 29 are similar to the thresholds 2308 of FIG. 23, but with respect to the four MAT groups 2909 rather than with respect to the 32 MATs. The example mapping of MATs to MAT groups 2909 of FIG. 29 includes 32 MATs that correspond to Table 1, for illustration purposes. The mapping of the example of FIG. 29 is reproduced below in Table 4.

TABLE 4

| Memory Access Type (MAT) | MAT Group 2909 |
|---|---|
| Boxpf | 0 |
| fp_load | 1 |
| fp_store | 1 |
| fused_fp_store | 1 |
| fused_load | 1 |
| fused_store | 1 |
| fused_store_aps | 0 |
| fused_store_update | 2 |
| gpf | 3 |
| l1dpf | 0 |
| Load | 1 |
| load_aps | 0 |
| load_descr | 3 |
| load_nac | 3 |
| load_nt | 3 |
| load_store | 1 |
| load_supervisor | 2 |
| load_zx | 1 |
| pf_l1d | 1 |
| pf_l2 | 1 |
| pf_nt | 1 |
| pf_w | 1 |
| store | 1 |
| store_aps | 0 |
| store_mask | 3 |
| store_nt | 3 |
| store_nt_aps | 3 |
| store_push | 2 |
| store_supervisor | 2 |
| store_update | 2 |
| store_update_nac | 3 |
| tablewalk | 3 |

The mapping of MAT groups to thresholds 2911 maps MAT group 0 to a threshold 2911 of 400 entries 112, maps MAT group 0 to a threshold 2911 of 400 entries 112, maps MAT group 0 to a threshold 2911 of 400 entries 112, and maps MAT group 0 to a threshold 2911 of 400 entries 112. It should be understood that although FIG. 29 (and Table 4) describes a particular set of MATs and a particular mapping of the MATs to their respective MAT groups and MAT groups to their respective thresholds, the embodiment is provided as an example for illustration purposes, and other embodiments are contemplated with a different set of MATs and different mappings of MATs to MAT groups and MAT groups to thresholds. Indeed, in one embodiment the mapping is dynamically updated (e.g., via the update input 126 of FIG. 1) during operation of the processor based on which program or program phase is currently running, such as described below with respect to FIGS. 7-9. Furthermore, different numbers of MAT groups 2909 may be employed.

As described above with respect to FIG. 25, additional logic is included in the fully associative cache memory 2302 to accommodate the use of MAT groups 2909, which may advantageously reduce the amount of hardware required in exchange for potentially less configurability and efficiency of the fully associative cache memory 2302. For example, preferably the fully associative cache memory 2302 includes only the number of MAT groups 2909 worth of counters 2306, thresholds 2308 and pointers 2304, and the MAT 2314 of each entry holds the MAT group of the entry 112.

Figure 30:
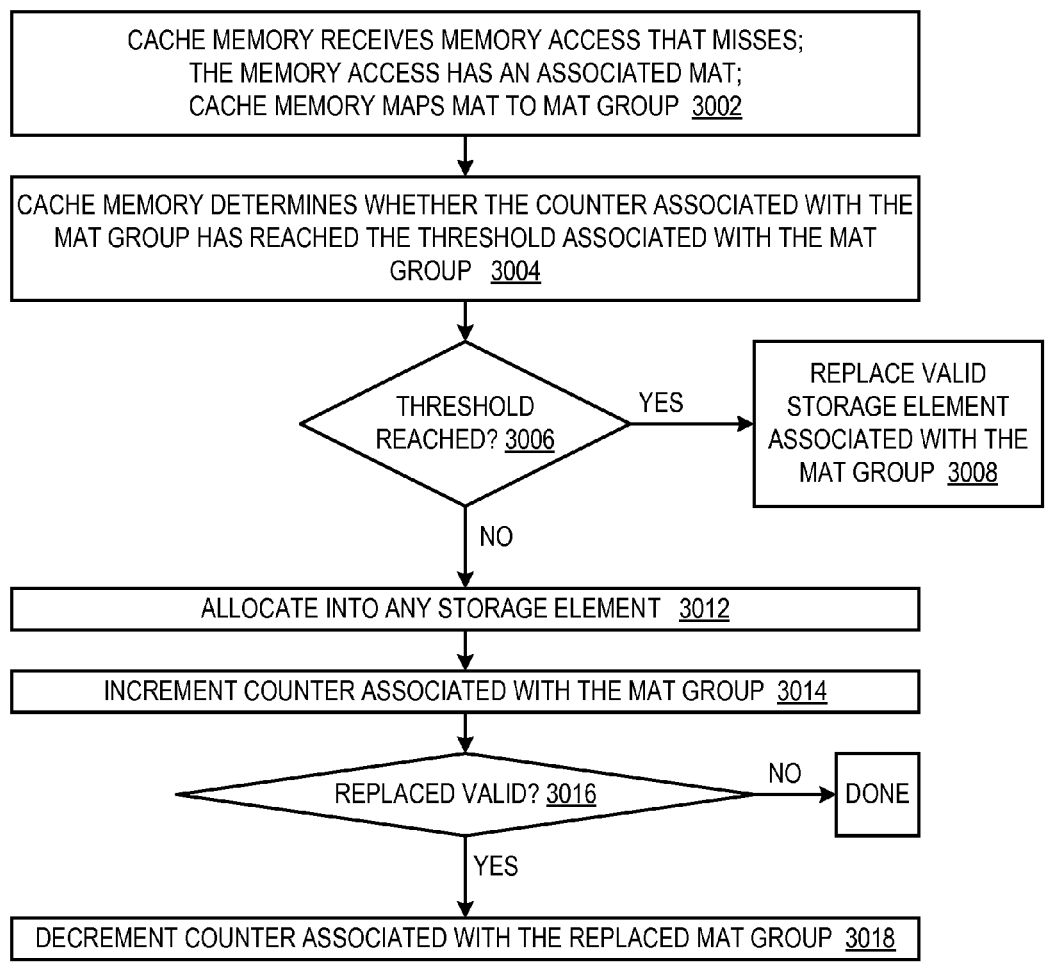
FIG. 30 is a flowchart illustrating operation of the cache memory 2302 of FIG. 23.

Referring now to FIG. 30, a flowchart illustrating operation of the cache memory 2302 of FIG. 23 is shown. Flow begins at block 3002.

At block 3002, the cache memory 2302 receives a memory access 122 that misses in the cache memory 2302. The memory access 122 index selects an entry 112 of the array 104. The memory access 122 specifies the MAT 101. The allocation unit 106 maps the MAT 101 to a MAT group 2909. Flow proceeds to block 3004.

At block 3004, the allocation unit 106 determines whether the counter 2306 associated with the MAT group 2909 has reached the threshold 2911 associated with the MAT group 2909. Flow proceeds to decision block 3006.

At decision block 3006, if the counter 2306 associated with the MAT group 2909 has reached the threshold 2911 associated with the MAT group 2909, flow proceeds to block 3008; otherwise, flow proceeds to block 3012.

At block 3008, the allocation unit 106 replaces a valid entry 112 of the array 104 whose MAT group 2314 matches the MAT group 2909 of the memory access 122. As described above with respect to FIG. 23, the entry 112 to be replaced may be selected by various replacement policies, preferably using a pointer 2304 associated with the MAT group 2909. Flow ends at block 3008.

At block 3012, the allocation unit 106 allocates into any entry 112 of the array 104, similar to the manner described above with respect to block 2712 of FIG. 27. Flow proceeds to block 3014.

At block 3014, the allocation unit 106 increments the counter 2306 associated with the MAT group 2909 of the memory access 122. Flow proceeds to decision block 3016.

At decision block 3016, the allocation unit 106 determines whether the replaced entry 112 was valid. If so, flow proceeds to block 3018; otherwise, flow ends.

At block 3018, the allocation unit 106 decrements the counter 2306 associated with the MAT group 2314 of the replaced entry 112. Flow ends at block 3018.

The embodiment of FIGS. 29 and 30 may be employed to increase efficiency for a particular level of cache since it could be budgeted such that a first MAT group of two MAT groups is allowed to allocate at most a threshold amount of the fully associative cache memory 2302 (e.g., 80%). The first MAT group could include all data-related MATs, and the second MAT group could include all code-related MATs (e.g., code fetch and code prefetch). This could be useful to pin down cache lines containing code in the fully associative cache memory 2302 by preventing data, e.g., streaming data, from causing contention with a private instruction cache.

Figure 31:
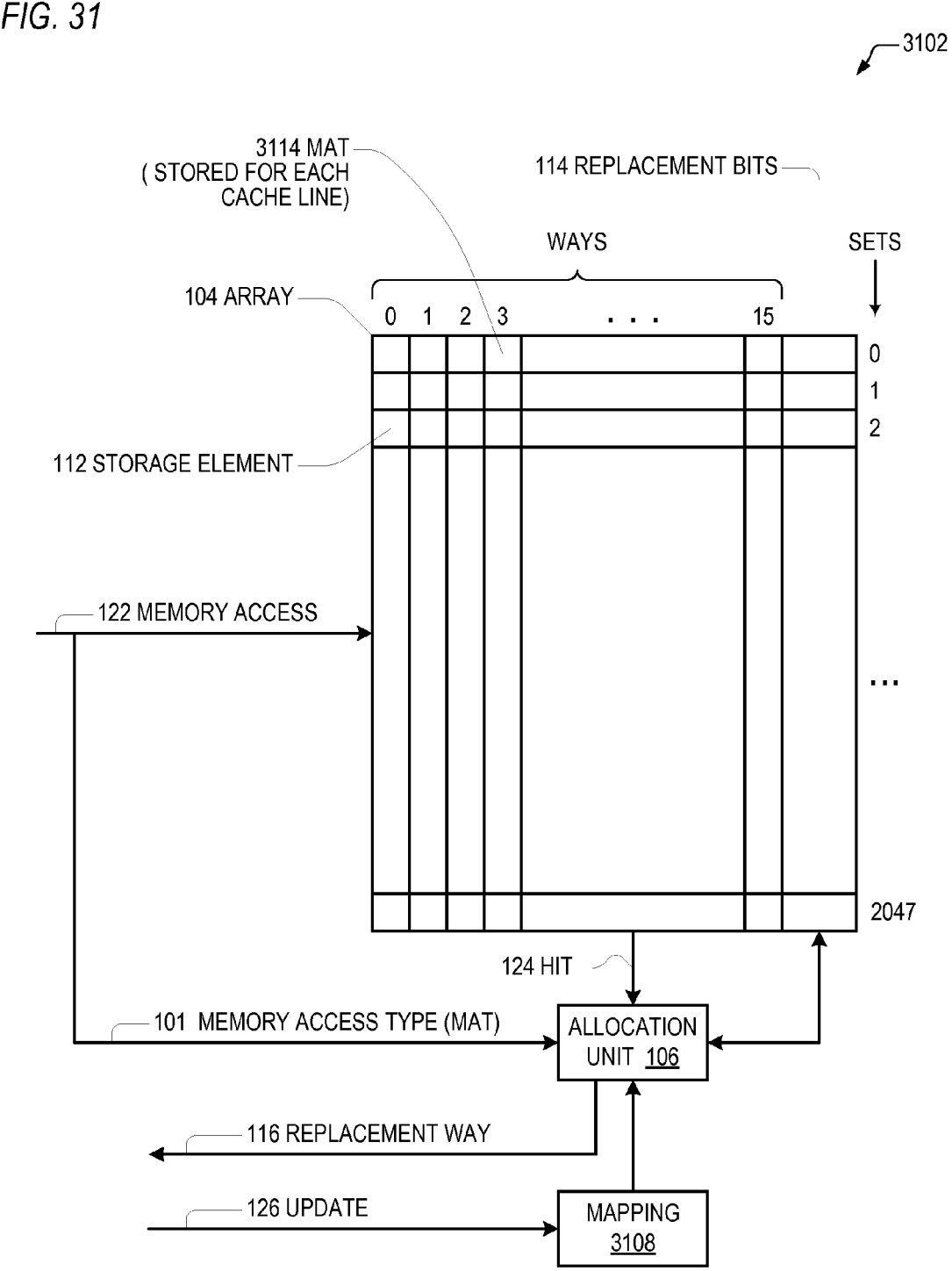
FIG. 31 is a block diagram illustrating a set associative cache memory 3102.

Referring now to FIG. 31, a block diagram illustrating a set associative cache memory 3102 is shown. The cache memory 3102 of FIG. 31 is similar in many respects to the cache memory 102 of FIG. 1 and like-numbered elements are similar. However, the cache memory 3102 of FIG. 31 includes a mapping 3108 that is different from the mapping 108 of FIG. 1. The mapping 3108 of FIG. 31 may include any of the various mappings of the embodiments related to FIGS. 1 through 22E; however, the mapping 3108 of FIG. 31 also includes a mapping 3018 of the different plurality of MATs to a MAT priority, an example of which is shown in FIG. 32. Additionally, the MAT 3114 for each valid cache line is stored in the array 104. That is, when a storage element 112 is allocated for a cache line, the MAT 101 of the memory access 122 that precipitated the allocation is stored in the storage element 112 for the cache line. Advantageously, the storage of the MAT 3114 along with the MAT to MAT priority mapping 3108 enables the cache memory 3102 to include the MATs 3114 of the valid cache lines of a selected set of the array 104 in the replacement policy to select a way of the selected set to allocate into, as described in more detail below, particularly with respect to FIG. 33.

Referring now to FIG. 32, a mapping of MATs to their respective priorities 3108 of FIG. 31 according to one embodiment is shown. The example mapping of FIG. 32 includes 32 MATs that correspond to Table 1, for illustration purposes. The mapping of the example of FIG. 32 is reproduced below in Table 5.

TABLE 5

| Memory Access Type (MAT) | MAT Priority |
|---|---|
| boxpf | 6 |
| fp_load | 1 |
| fp_store | 1 |
| fused_fp_store | 1 |
| fused_load | 3 |
| fused_store | 1 |
| fused_store_aps | 0 |
| fused_store_update | 4 |
| gpf | 3 |
| l1dpf | 5 |
| Load | 1 |
| load_aps | 3 |
| load_descr | 3 |
| load_nac | 4 |
| load_nt | 3 |
| load_store | 1 |
| load_supervisor | 2 |
| load_zx | 1 |
| pf_l1d | 7 |
| pf_l2 | 1 |
| pf_nt | 6 |
| pf_w | 1 |
| store | 1 |
| store_aps | 0 |
| store_mask | 3 |
| store_nt | 2 |
| store_nt_aps | 3 |
| store_push | 2 |
| store_supervisor | 7 |
| store_update | 2 |
| store_update_nac | 3 |
| tablewalk | 3 |

It should be understood that although FIG. 32 (and Table 5) describes a particular set of MATs and a particular mapping of the MATs to their respective MAT priorities, the embodiment is provided as an example for illustration purposes, and other embodiments are contemplated with a different set of MATs and different mappings of MATs to MAT priorities. Indeed, in one embodiment the mapping is dynamically updated (e.g., via the update input 126 of FIG. 1) during operation of the processor based on which program or program phase is currently running, such as described below with respect to FIGS. 7-9.

Figure 33:
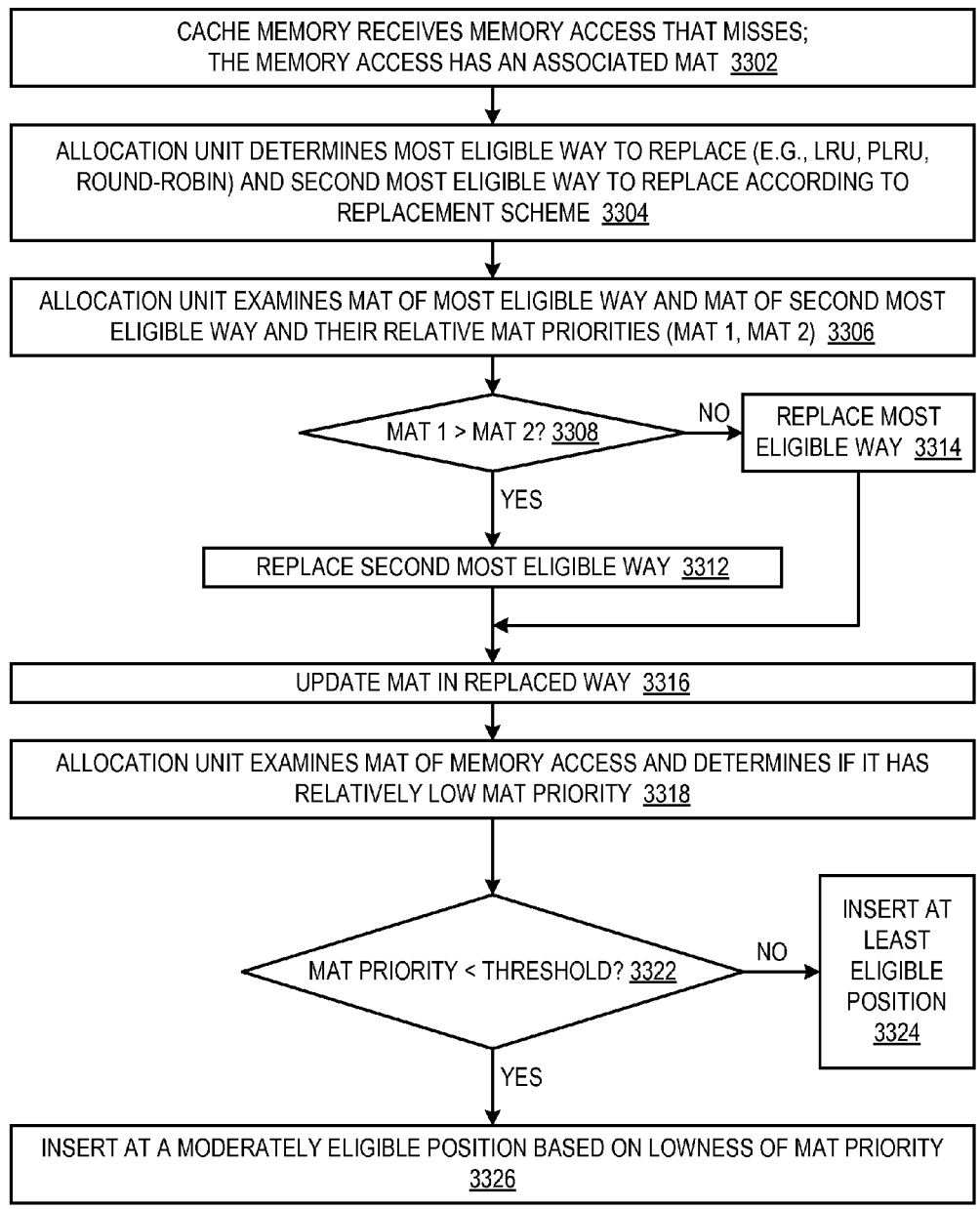
FIG. 33 is a flowchart illustrating a cache line replacement policy that considers the MAT of the cache lines.

Referring now to FIG. 33, a flowchart illustrating a cache line replacement policy that considers the MAT of the cache lines is shown. Flow begins at block 3302.

At block 3302, the cache memory 3102 receives a memory access 122 that misses in the cache memory 3102. The memory access 122 index selects a set of the array 104. The memory access 122 specifies the MAT 101. Flow proceeds to block 3304.

At block 3304, the allocation unit 106 determines the most eligible way to replace and the second most eligible way to replace of the ways in the selected set according to the replacement policy for the selected set. For example, if the replacement policy is LRU/pLRU, the allocation unit 106 determines the LRU way and the second most LRU way of the selected set according to the replacement bits 114. For another example, if the replacement policy is round-robin, the allocation unit 106 determines the way pointed to by the round-robin pointer in the replacement bits 114 and the next way in the direction of the round-robin order. For another example, if the replacement policy is random, the allocation unit 106 randomly determines two ways. It should be understood that in an embodiment in which the cache memory 3102 is budgeted by ways or set groups or chunks or parcels, for example, such that the allocation unit 106 considers only a subset of the ways of the selected set, then the allocation unit 106 examines the MAT priority of the most eligible and second most eligible ways in the subset of ways. Flow proceeds to block 3306.

At block 3306, the allocation unit 106 examines the MAT 3114 of the most eligible way and the MAT 3114 of the second most eligible way determined at block 3304 and then compares the relative MAT priorities 3277 of the two MATs 3114. Flow proceeds to decision block 3308.

At decision block 3308, if the MAT priority 3327 of the most eligible way is higher than the MAT priority 3327 of the second most eligible way, flow proceeds to block 3312; otherwise, flow proceeds to block 3314. In one embodiment, the allocation unit 106 calculates a difference between the MAT priority 3327 of the most eligible and second most eligible ways and determines whether the difference is greater than a threshold, rather than testing merely that the MAT priority 3327 of the most eligible way is greater than the second most eligible way. It should be noted that if there is an invalid way in the selected set (or relevant subset thereof), then the allocation unit 106 allocates the invalid way rather than replacing the most or second most eligible way.

At block 3312, the allocation unit 106 replaces the second most eligible way rather than the most eligible way. Flow proceeds to block 3316.

At block 3314, the allocation unit 106 replaces the most eligible way. Flow proceeds to block 3316.

At block 3316, the allocation unit 106 updates the MAT 3114 in the replaced way with the MAT 101 of the memory access 122. In this manner, the MATs 3114 of the entries of the array 104 are maintained. Flow proceeds to block 3318.

At block 3318, the allocation unit 106 examines the MAT 101 of the memory access 122 and determines whether it has a relatively low priority, e.g., lower than a threshold. For example, in the embodiment of FIG. 32, the allocation unit 106 may determine whether the MAT 101 of the memory access 122 is lower than 3. Flow proceeds to decision block 3322.

At decision block 3322, if the MAT 101 of the memory access 122 has a relatively low priority, flow proceeds to block 3326; otherwise, flow proceeds to block 3324.

At block 3324, the allocation unit 106 inserts the replaced way at the least eligible position of the replacement bits 114 according to the replacement scheme. For example, in the case of an LRU/pLRU scheme, the allocation unit 106 inserts the replaced way into the most recently used position. For another example, in the case of a round-robin scheme, the allocation unit 106 updates the round-robin pointer just past the replaced way. Flow ends at block 3324.

At block 3326, the allocation unit 106 inserts the replaced way at a moderately eligible position of the replacement bits 114 according to the replacement scheme, preferably based on how low the MAT priority 3277 of the memory access 122 is. For example, in the case of an LRU/pLRU scheme, the allocation unit 106 inserts the replaced way into a middle position. Preferably, the lower the MAT priority 3277, the allocation unit 106 inserts the replaced way closer to the middle position, whereas the higher the MAT priority 3327, the allocation unit 106 inserts the replaced way farther from the middle position and closer to the most recently used position. In one embodiment, for very low MAT priority 3277 (e.g., a prefetch with a very low confidence having a priority of 0), the allocation unit 106 inserts the replaced way at the LRU position or next-to-LRU position. For another example, in the case of a round-robin scheme, the allocation unit 106 updates the round-robin pointer more positions past the replaced way depending upon how low the MAT priority 3327 is. In one embodiment, the allocation unit 106 also takes into account the relative MAT priorities 3327 associated with the MATs 3114 of one or more other ways near the least eligible position when deciding where to insert the replaced way. Flow ends at block 3326.

Although an embodiment has been described in which the two most eligible ways are considered, other embodiments are contemplated in which more of the most eligible ways are considered, e.g., if the MAT priority of the third most eligible way is less than the most and second most eligible ways, then the allocation unit 106 replaces the third most eligible way.

The configuration of a cache memory in the various manners described herein, such as mapping to budget a cache memory by ways, set groups, chunks, MAT group thresholds, parcels with different replacement policies, etc., may be either by static configuration, by dynamic configuration or both. Generally speaking, the static configuration is pre-silicon. That is, the designers employ intuition, preferably aided by software simulation of the processor design, to determine good configurations, that is, configurations that potentially improve the performance of the processor in general, and of the cache memory in particular. Improving performance of the processor is improving the speed at which the processor executes the program (e.g., reduces the clocks per instruction rate or increases the instructions per clock rate) and/or reduces the power consumption. The programs may be operating systems, executable programs (e.g., applications, utilities, benchmarks), dynamic link libraries, and the like. The software simulation may be employed to perform offline analysis of the execution of programs for which it is desirable to improve performance of the processor, as described below with respect to FIGS. 34 through 36 for example, particularly with respect to cache memory configuration. Preferably, the designers determine a static configuration that tends to be good over the set of programs at large. The designers then include the good static configuration into the design that is manufactured into silicon.

In contrast, the analysis to determine dynamic configuration is performed post-silicon, generally speaking That is, after the processor is manufactured, the designers perform offline analysis of a different kind to determine how the processor performs when executing the programs with configurations different than the static, or default, configuration manufactured into silicon. The post-silicon testing may involve a more rigorous, perhaps more brute force, technique in which automated performance regression against a configuration matrix is performed, and then the regression performance data is analyzed, as described below with respect to FIG. 37, for example. The designer may employ the results of the pre-silicon testing for the population of programs as initial seeds to the post-silicon testing, e.g., to attempt to avoid local maxima that are not the global maxima.

Regardless of whether the testing is pre-silicon or post-silicon, with the dynamic configuration testing, good configurations are determined on a per-program basis, or even on a per-program phase basis. Then, when the system, e.g., a device driver, detects a known program is running on the processor (i.e., a program for which the analysis has been performed and a good configuration is known), the system provides the good program-specific configuration to the processor, and the processor updates the cache memory with the program-specific configuration in a dynamic fashion while the processor is running Preferably, the program-specific configuration includes different configurations for different phases of the program, and the processor detects the phase changes and dynamically updates the configuration in response with the phase-specific configuration, as described with respect to FIG. 36, for example.

A program phase, with respect to a given set of characteristics, is a subset of a computer program characterized by a consistent behavior among those characteristics. For example, assume the relevant characteristics are branch prediction rate and cache hit rate, a phase of a program is a subset of the runtime behavior of the program in which the branch prediction rate and cache hit rate are consistent. For instance, offline analysis may determine that a particular data compression program has two phases: a dictionary construction phase and a dictionary lookup phase. The dictionary construction phase has a relatively low branch prediction rate and a relatively high cache hit rate, consistent with building a set of substrings common to a larger set of strings; whereas, the dictionary lookup phase has a relatively high branch prediction rate and a relatively low cache hit rate, consistent with looking up substrings in a dictionary larger than the size of the cache.

In one embodiment, offline analysis is performed using the notion of an "oracle cache," which, as its name implies, knows the future. Given the limited amount of space in the cache memory, the oracle cache knows the most useful data that should be in the cache at any point in time. It may be conceptualized as a cycle-by-cycle or instruction-by-instruction snapshot of the contents of the cache that would produce the highest hit ratio.

Figure 38:
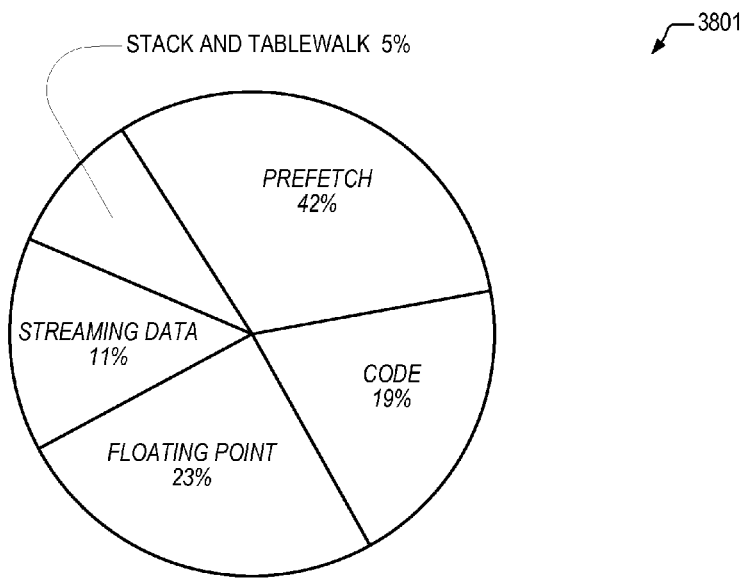
FIG. 38 is a pie chart 3801 illustrating analysis results.

First, one generates the sequence of oracle cache snapshots for a program execution and keeps track of the MAT of the memory access that produced the allocation of each cache line in the snapshots. Then, one produces a pie chart for each snapshot that shows, for each MAT or group of MATs, the percentage of the cache occupied by a cache line that was allocated in response to a memory access of the MAT, an example of which is shown in FIG. 38. Then, on a subsequent execution instance of the program, the processor continually re-budgets the cache (in terms of ways, set groups, chunks, parcels, thresholds, MAT priorities, and so forth) using the MAT percentages from the sequence of pie charts.

When it is impractical to re-budget on the granularity of a clock cycle or instruction, one examines the pie chart sequences for tendencies over much longer time durations, e.g., an entire program or program phase. One takes the average of all the pie charts in the sequence (of the program or phase) for each MAT and makes the average pie chart the budget.

Broadly speaking, the idea of the oracle cache is that, because it knows all of the memory accesses in advance, it can pre-execute all of the memory accesses. Then as the program executes, the oracle cache predicts the best set of cache lines to be in the cache at any given point in time. For instance, in the graph of FIG. 35, the oracle cache would predict that the short duration cache line of MAT 1 (the line second from the top depicted with a solid line) should not be cached after its last access. Using such analysis, one derives observations about cache budgeting and replacement policy on a per MAT basis.

Figure 34:
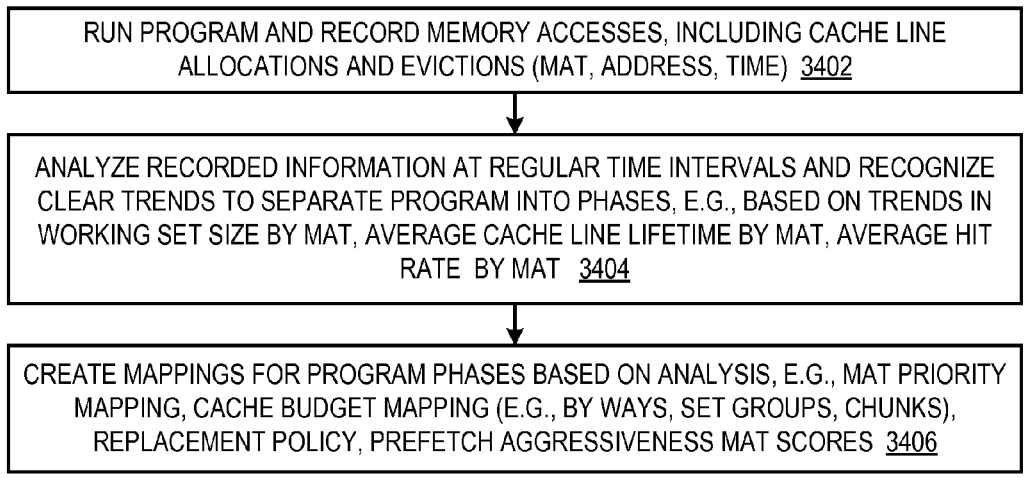
FIG. 34 is a flowchart illustrating generation of mappings for programs and program phases.

Referring now to FIG. 34, a flowchart illustrating generation of mappings for programs and program phases is shown. Flow begins at block 3402.

At block 3402, the designer, preferably in an automated fashion, runs a program and records memory accesses 122 to the cache memory, e.g., 102, 1002, 1402, 1502, 1702, 1902, 2302, 3102, made by the program. Preferably, the allocations, hits and evictions of cache lines are recoded. The memory address, MAT 101 and time (e.g., relative clock cycle) of the memory accesses 122 are recorded. Flow proceeds to block 3404.

At block 3404, the designer, preferably in an automated fashion, analyzes the information recorded at block 3402 at regular time intervals and recognizes clear trends to separate the program into phases, e.g., as described below with respect to FIG. 36. For example, clear trends in working set size by MAT 101, average cache line lifetime by MAT 101, average hit rate by MAT 101 may be recognized. Flow proceeds to block 3406.

At block 3406, the designer, preferably in an automated fashion, creates mappings, or configurations, for the different program phases based on the analysis performed at block 3404. For example, the mappings, or configurations, may be a cache budget mapping by ways, e.g., 108 of FIG. 2; a cache budget mapping by set groups, e.g., 1008 of FIG. 10, 14 or 15; a cache budget mapping by chunks, e.g., 1508 or 1708 of FIG. 15 or FIG. 17; a cache budget mapping supporting a heterogeneous replacement policy, e.g., 1908 of FIGS. 19-22E; MAT-based entry allocation thresholds, e.g., 2308 of FIGS. 23 through 24; MAT to MAT group and MAT group to threshold mapping, e.g., 2908 of FIG. 29; and a MAT priority mapping, e.g., 3108 of FIGS. 31 and 32. In one embodiment, the analysis to determine the mappings, or configurations, may include analysis similar that described below with respect to FIGS. 35 through 38. It should be understood that some programs might not exhibit clear trends such that they are susceptible to being broken down into distinct phases, in which case a single mapping, or configuration, may suffice for the entire program. Flow ends at block 3406.

Figure 35:
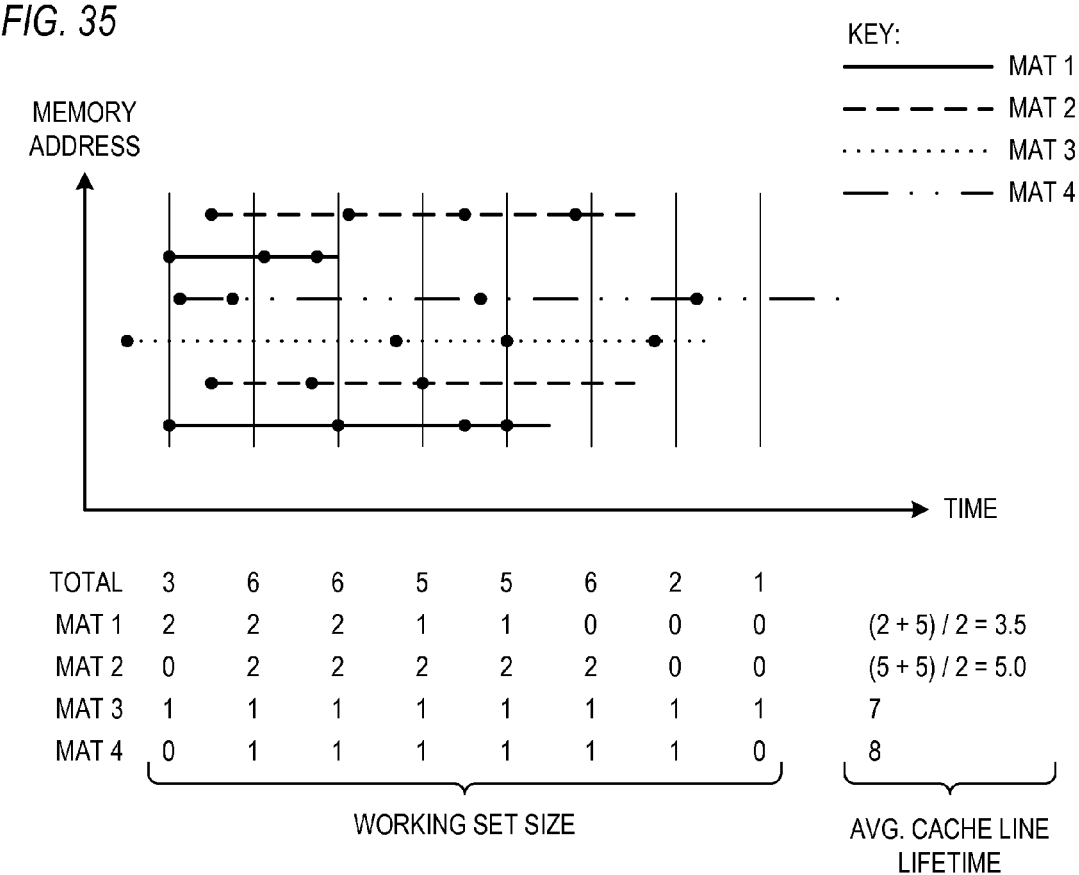
FIG. 35 is a memory access graph and extracted data from the graph.

Referring now to FIG. 35, a memory access graph and extracted data from the graph is shown. The graph plots memory accesses, indicated by dots, in which time is the independent variable shown on the horizontal axis, and memory address is the dependent variable shown on the vertical axis. Horizontal lines correspond to individual cache line at the specified memory address. The left edge of the line signifies the allocation of the cache line, and the right edge of the line signifies the eviction of the cache line from the cache memory. Each cache line has an associated MAT, which in the example of FIG. 35 are denoted MAT 1, MAT 2, MAT 3 and MAT 4. In the example of FIG. 35, six cache lines are illustrated in which two have associated MAT 1, two have associated MAT 2, one has associated MAT 3 and one has associated MAT 4.

Below the graph is shown, at each of eight different regular time intervals, the total working set size and working set size for each respective MAT. The time intervals may be correlated to basic block transfers as described below with respect to FIG. 36, for example, and used to determine program phases and configurations, or mappings, for each of the program phases. For example, during a particular program or phase, the configuration, or mapping, may budget more ways, set groups, chunks, or parcels to MATs with relatively larger working set sizes and budget fewer ways to MATs with relatively smaller working set sizes, or at least take working set size into consideration, which is shown for each MAT in FIG. 35.

Additionally, observations may be made about how long cache lines per individual MAT tend to be useful, such as average cache line lifetime. The average cache line lifetime is calculated as the sum of the lifetime (from allocation to eviction) of all the cache lines of the respective MAT over the phase divided by the number of cache lines of the MAT. This information can be used to influence the replacement policy of the cache memory.

If the oracle cache constrains the number of cached lines to correspond to the intended number of sets and ways that are included in the cache memory, the accuracy of the cache budgeting and average lifetime observations may increase. Other indicators may also be gathered, such as cache line hits per MAT.

Figure 36:
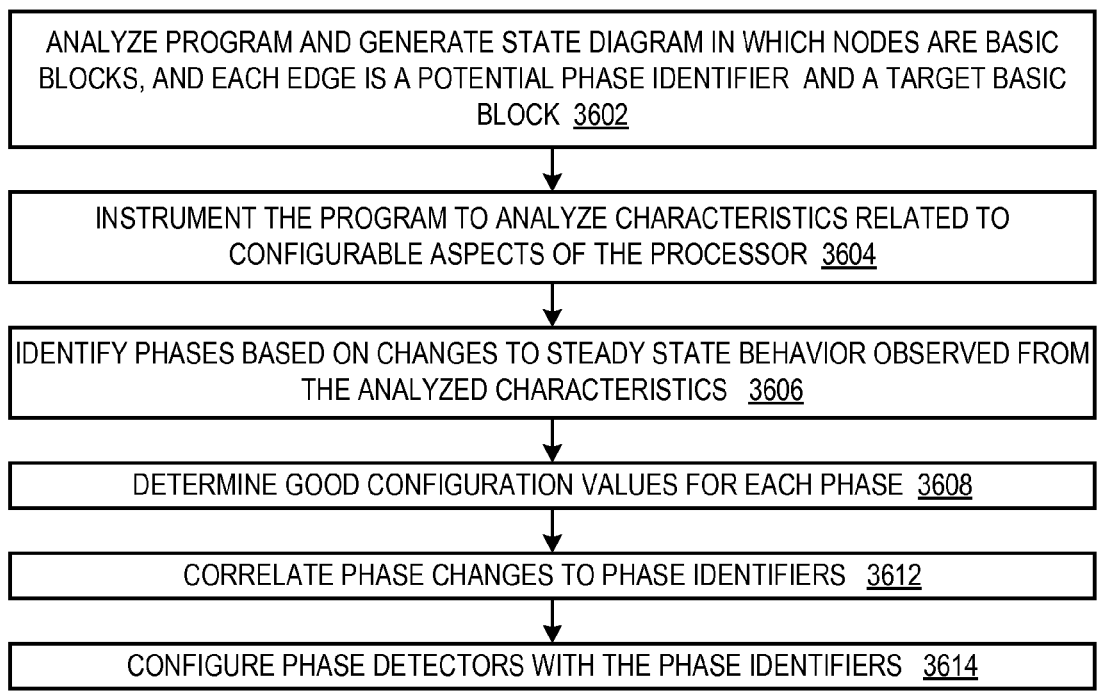
FIG. 36 is a flowchart illustrating phase analysis of a program.

Referring now to FIG. 36, a flowchart illustrating phase analysis of a program is shown. The phase analysis is a form of offline analysis that may be used to determine good configurations, or mappings, of configurable aspects of the processor, such as its cache memory or prefetchers. Flow begins at block 3602.

At block 3602, a program for which it is desirable to improve performance by the processor when executing the program is analyzed and broken down to generate state diagrams. The nodes of the state diagram are basic blocks of the program. Basic blocks are sequences of instructions between program control instructions (e.g., branches, jumps, calls, returns, etc.). Each edge in the stage diagram is a target basic block to which the edge leads and state change information, which may become a phase identifier, as described more below. A phase identifier may include the instruction pointer (IP), or program counter (PC), of a control transfer instruction, a target address of the control transfer instruction, and/or the call stack of a control transfer instruction. The call stack may include the return address and parameters of the call. The program phases are portions of the programs that comprise one or more basic blocks. Flow proceeds to block 3604.

At block 3604, the program is instrumented to analyze characteristics related to configurable aspects of the processor such as cache memory mappings, prefetcher MAT scores, and cache configuration modes. Examples of the characteristics include cache hit rate, branch prediction accuracy, working set size, average cache line lifetime, and cache pollution (e.g., the number of cache lines prefetched but never used). Flow proceeds to block 3606.

At block 3606, the program is executed with a given configuration, e.g., of cache memory and/or prefetcher, and phases of the program are identified by observing steady state behavior in the analyzed characteristics of block 3604. For example, assume cache hit rate is the analyzed characteristic of interest, and assume the cache hit rate changes from 97% to 40%. The cache hit rate change tends to indicate that the cache memory configuration was good for the program prior to the change and not good for the program after the change. Thus, the sequence of basic blocks prior to the cache hit rate change may be identified as one phase and the sequence of basic blocks after the cache hit rate change may be identified as a second phase. For another example, assume working set size of different MATs is the analyzed characteristic of interest, then significantly large shifts in working set sizes for the different MATs, or MAT groups, may signal a desirable location in the program to identify a phase change. Flow proceeds to block 3608.

At block 3608, once the phases are identified, good configurations, or mappings, or configuration values, are determined for each phase. For example, various offline analysis techniques may be used, such as the method described above with respect to FIGS. 34 and 35 or below with respect to FIG. 37. Flow proceeds to block 3612.

At block 3612, phase identifiers are correlated to the phase changes. The state change information, or potential phase identifiers, of the basic block transition described above at which a change in the analyzed characteristic occurred are recorded along with the good configuration values determined at block 3608 for the program so the information may be provided to the processor when it is detected, e.g., by a device driver, that the analyzed program is about to run. Flow proceeds to block 3614.

At block 3614, after receiving the information associated with the analyzed program, the processor loads the phase detectors 804 with the phase identifiers 802 of FIG. 8 as described above with respect to FIGS. 7 through 9. Flow ends at block 3614.

Figure 37:
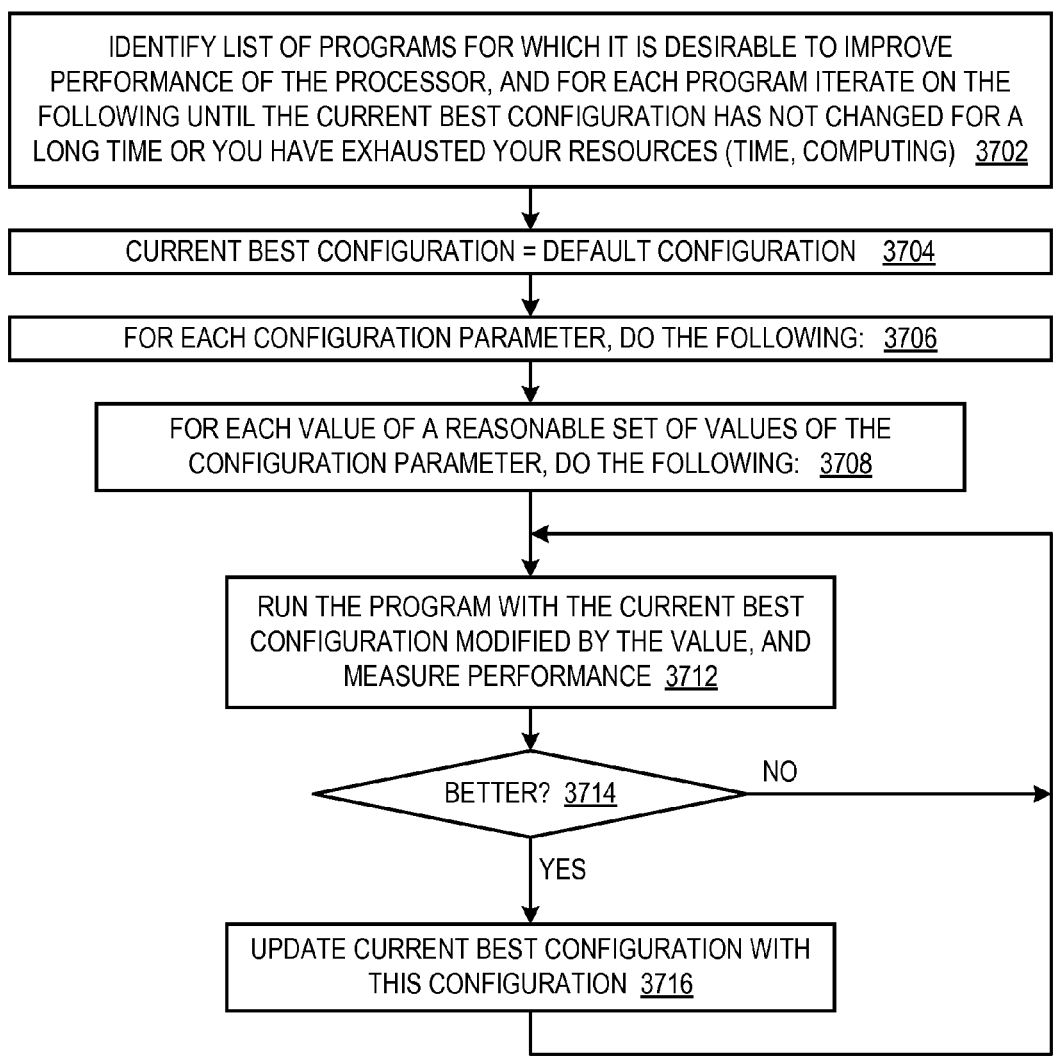
FIG. 37 is a flowchart illustrating a brute force method of determining a good configuration, or mapping, for configurable aspects of the processor, e.g., cache memory, prefetcher.

Referring now to FIG. 37, a flowchart illustrating a brute force method of determining a good configuration, or mapping, for configurable aspects of the processor, e.g., cache memory, prefetcher, is shown. The method described employs aspects of the "coordinate descent" optimization algorithm. Flow begins at block 3702.

At block 3702, for each program, or program phases, in a list of programs identified for which it is desirable to improve performance of the processor, the method iterates through blocks 3704 through 3716 until a good configuration is determined (e.g., the best current configuration—see below—has not changed for a relatively long time) or resources have expired (e.g., time and/or computing resources). Flow proceeds to block 3704.

At block 3704, the current best configuration is set to a default configuration, e.g., a default mapping of the cache memory or prefetcher, which in one embodiment is simply the configuration with which the processor is manufactured. Flow proceeds to block 3706.

At block 3706, for each configuration parameter, blocks 3708 through 3712 are performed. An example of a configuration parameter is a single configuration bit, e.g., that turns a feature on or off. Another example of a configuration parameter is a configuration field, e.g., vectors 304, set group selection logic 1106/2106, parcel specifiers 2001, thresholds 2308, MAT to MAT group and MAT group to threshold mappings 2908, MAT to MAT priority mappings 3108. Flow proceeds to block 3708.

At block 3708, for each value of a reasonable set of values of the configuration parameter of block 3706, perform blocks 3712 through 3716. A reasonable set of values of the configuration parameter depends upon the size of the configuration parameter, the deemed importance of the parameter, and the amount of resources required to iterate through its values. For example, in the case of a single configuration bit, both values are within a reasonable set. For example, the method may try all possible values for any parameter having sixteen or fewer values. However, for relatively large fields, e.g., a 32-bit field, it may be infeasible to try all $2^{32}$ possible values. In this case, the designer may provide a reasonable set of values to the method. For example, the designer may observe groups of MATs with similar characteristics and group them together, as described above, to limit the number of possibilities. If the designer does not supply values and the number of possibilities is large, the method may iterate through blocks 3712 through 3716 with a reasonable number of random values of the parameter. Flow proceeds to block 3712.

At block 3712, the program, or program phase, is run with the current best configuration but modified by the next value of the parameter per block 3708, and the performance is measured. Flow proceeds to decision block 3714.

At decision block 3714, the method compares the performance measured at block 3712 with the current best performance and if the former is better, flow proceeds to block 3716; otherwise, flow returns to block 3712 to try the next value of the current parameter until all the reasonable values are tried, in which case flow returns to block 3708 to iterate on the next configuration parameter until all the configuration parameters are tried, in which case the method ends, yielding the current best configuration for the program, or program phase.

At block 3716, the method updates the current best configuration with the configuration tried at block 3712. Flow returns to block 3712 to try the next value of the current parameter until all the reasonable values are tried, in which case flow returns to block 3708 to iterate on the next configuration parameter until all the configuration parameters are tried, in which case the method ends, yielding the current best configuration for the program, or program phase.

It should be noted that a good configuration found using methods similar to those of FIG. 37 may not be, and need not be, understood by the designer why the particular configuration yields the good result.

Referring now to FIG. 38, a pie chart 3801 illustrating analysis results is shown. The results of the various analyses, such as those performed according to FIGS. 34, 36 and 37, may be conceptualized as a pie chart having a slice for each MAT, i.e., a percentage of the pie for each MAT. In the case of budgeting the cache by ways, for example, the subset of ways for each MAT corresponds roughly to its percentage of the pie. Alternatively, as described above, the MATs may be grouped and the subset of ways for each MAT group corresponds roughly to the sum of the percentages of the pie of the included MATs in the group. FIG. 38 illustrates an example. In the case of budgeting the cache by set groups, chunks or parcels, a pie graph is constructed for each set group, chunk, or parcel and then a similar technique is applied. The pie chart 3801 includes a slice for different MAT groups. In the example of FIG. 38, a prefetch group is 42%, a code group is 19%, a floating point group is 23%, a streaming data group is 11%, and a stack and tablewalk group is 5%.

Figure 39:
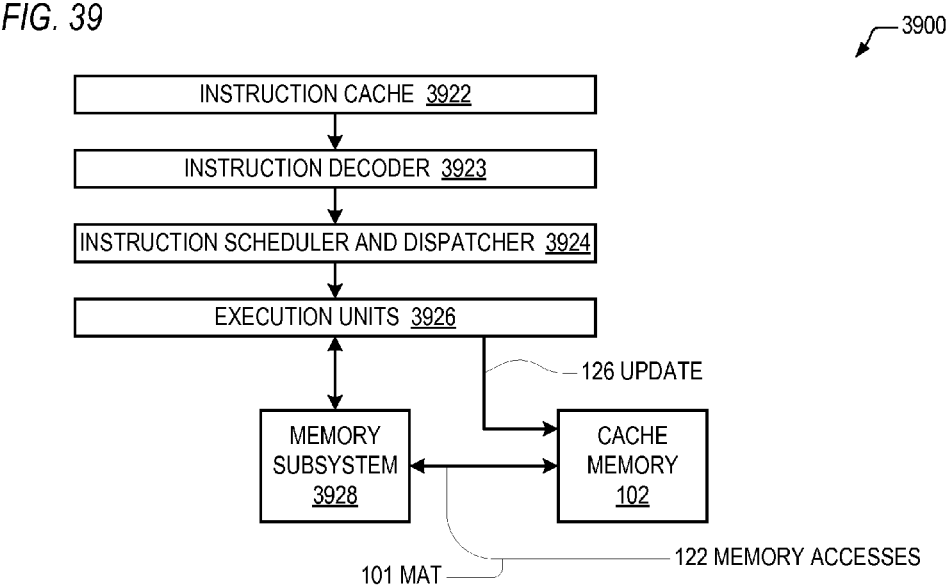
FIG. 39 is a block diagram illustrating a processor 3900.

Referring now to FIG. 39, a block diagram illustrating a processor 3900 is shown. The processor 3900 includes an instruction cache 3922 that provides instructions to an instruction decoder 3923 that decodes the instructions and provides the decoded instructions to an instruction dispatcher 3924 that dispatches the instructions to execution units 3926 for execution. Preferably, the microarchitecture of the processor 3900 is superscalar and out-of-order execution, although other embodiments are contemplated, such that the instruction dispatcher 3924 also includes an instruction scheduler for scheduling the dispatch of instructions to multiple execution units 3926 in a superscalar out-of-order fashion. Preferably, the processor 3900 also includes architectural registers (not shown) that hold architectural state of the processor 3900 as well as non-architectural registers (not shown). Preferably, the processor 3900 also includes a register alias table (RAT) (not shown) used to perform register renaming and a reorder buffer (ROB) (not shown) used to retire instructions in program order. Preferably, the instruction dispatcher includes an instruction translator (not shown) that translates architectural instructions into microinstructions of the microinstruction set architecture of the processor 3900 executable by the execution units 3926.

The processor 3900 also includes a memory subsystem 3928 that provides memory operands to the execution units 3926 and receives memory operands from the execution units 3926. The memory subsystem 3928 preferably includes one or more load units, one or more store units, load queues, store queues, a fill queue for requesting cache lines from memory, a snoop queue related to snooping of a memory bus to which the processor 3900 is in communication, a tablewalk engine, and other related functional units.

The processor 3900 also includes a cache memory 102 in communication with the memory subsystem 3928. Preferably, the cache memory 102 is similar to the cache memories described with respect to FIGS. 1 through 38. Although a single cache memory 102 is shown, the cache memory 102 may be one of a larger cache memory subsystem that includes a hierarchy of cache memories, such as the level-1 (L1) instruction cache, a L1 data cache, and a unified level-2 (L2) cache that backs the L1 caches. In one embodiment, the cache subsystem also includes a level-3 (L3) cache. The processor 3900 may also include one or more prefetchers that prefetch data from memory into the cache memory 102. In one embodiment, the processor 3900 is a multi-core processor, each of the cores having the functional units described above, and in which the cache memory 102 shared by the cores.

The memory subsystem 3928 makes memory accesses 122 of the cache memory 102 as described in the embodiments of FIGS. 1 through 38. The memory accesses 122 include a memory address of the memory location to be accessed. Each of the memory accesses 122 also includes a memory access type (MAT) 101, embodiments of which are described above.

While various embodiments of the present invention have been described herein, it should be understood that they have been presented by way of example, and not limitation. It will be apparent to persons skilled in the relevant computer arts that various changes in form and detail can be made therein without departing from the scope of the invention. For example, software can enable, for example, the function, fabrication, modeling, simulation, description and/or testing of the apparatus and methods described herein. This can be accomplished through the use of general programming languages (e.g., C, C++), hardware description languages (HDL) including Verilog HDL, VHDL, and so on, or other available programs. Such software can be disposed in any known computer usable medium such as magnetic tape, semiconductor, magnetic disk, or optical disc (e.g., CD-ROM, DVD-ROM, etc.), a network, wire line, wireless or other communications medium. Embodiments of the apparatus and method described herein may be included in a semiconductor intellectual property core, such as a processor core (e.g., embodied, or specified, in a HDL) and transformed to hardware in the production of integrated circuits. Additionally, the apparatus and methods described herein may be embodied as a combination of hardware and software. Thus, the present invention should not be limited by any of the exemplary embodiments described herein, but should be defined only in accordance with the following claims and their equivalents. Specifically, the present invention may be implemented within a processor device that may be used in a general-purpose computer. Finally, those skilled in the art should appreciate that they can readily use the disclosed conception and specific embodiments as a basis for designing or modifying other structures for carrying out the same purposes of the present invention without departing from the scope of the invention as defined by the appended claims.

The invention claimed is:

1. A set associative cache memory, comprising:
    an array of storage elements arranged as M sets by N ways, wherein each set of the M sets belongs in one of L mutually exclusive groups;
    an allocation unit that allocates the storage elements of the array in response to memory accesses that miss in the cache memory;
    wherein each of the memory accesses selects a set of the M sets;
    wherein each of the memory accesses has an associated memory access type (MAT) of a plurality of predetermined MATs, wherein the MAT is received by the cache memory;
    a mapping that comprises a plurality of replacement policies to select among the N ways into which to allocate into;
    wherein the mapping, for each group of the L mutually exclusive groups, and for each MAT of the plurality of predetermined MATs, associates the MAT with a subset of one or more of the N ways of the array, so that the mapping accommodates different replacement policies for at least two different MATs in within at least one of the L mutually exclusive groups; and
    wherein for each memory access of the memory accesses, the allocation unit allocates into a way of the subset of one or more ways of the selected set that the mapping associates with the MAT of the memory access and with one of the L mutually exclusive groups in which the selected set belongs.

2. The set associative cache memory of claim 1, wherein the allocation unit comprises selection logic that receives as input the memory access and generates an indicator of the one of the L mutually exclusive groups in which the selected set belongs.

3. The set associative cache memory of claim 2, wherein the allocation unit further comprises second selection logic that selects a set of vectors associated with the one of the L mutually exclusive groups to which the selected set belongs using the indicator.

4. The set associative cache memory of claim 3, wherein the set of vectors specify, for each MAT of the plurality of MATs, the subset of one or more of the N ways of the array associated with the MAT.

5. The set associative cache memory of claim 4, wherein the plurality of predetermined MATs includes at least three from the following list:
    a memory access generated by a hardware prefetcher of the processor;
    a memory access generated by a floating point instruction;
    a memory access generated by a fused microinstruction;
    a memory access generated by a media instruction;
    a memory access generated by an instruction that modifies a memory address;
    a memory access generated by a software prefetch instruction;
    a memory access that loads an architectural descriptor;
    a memory access generated by an instruction that specifies non-temporal data;
    a memory access generated by an instruction that performs no alignment checks;
    a memory access generated by a supervisor privilege level instruction;
    a memory access generated by a zero extend instruction;
    a memory access generated by a masked move instruction;
    a memory access generated by a stack push instruction; and
    a memory access generated by a hardware tablewalk engine of the processor.

6. A method for operating a set associative cache memory having an array of storage elements arranged as M sets by N ways, wherein each set of the M sets belongs in one of L mutually exclusive groups, and an allocation unit that allocates the storage elements of the array in response to memory accesses that miss in the cache memory, wherein each of the memory accesses selects a set of the M sets, wherein each of the memory accesses has an associated memory access type (MAT) of a plurality of predetermined MATs, the method comprising:
    storing a mapping that comprises a plurality of replacement policies to select among the ways into which to allocate into, wherein the mapping, for each group of the L mutually exclusive groups and for each MAT of the plurality of predetermined MATs, associates the MAT with a subset of one or more of the N ways of the array, so that the mapping accommodates different replacement policies for at least two different MATs in within at least one of the L mutually exclusive groups; and
    for each memory access of the memory accesses, allocating into a way of the subset of one or more ways of the selected set that the mapping associates with the MAT of the memory access and with one of the L mutually exclusive groups in which the selected set belongs.

7. The method of claim 6, further comprising:
    updating the mapping during operation of the cache memory.

8. The method of claim 7, further comprising:
    determining that a program is running on the processor, wherein the mapping is determined by offline analysis of the program; and
    said updating the mapping in response to said determining that the program is running on the processor.

9. A set associative cache memory, comprising:
    an array of storage elements arranged as M sets by N ways, wherein each set of the M sets belongs in one of L mutually exclusive groups, wherein at least one of the L mutually exclusive groups comprises at least two of the M sets;

a mapping that specifies a plurality of chunks of the array, wherein a chunk encompasses the storage elements of the array that are a logical intersection of one group of the L mutually exclusive groups and one or more ways of the N ways of the array, and wherein the mapping comprises a plurality of replacement policies to select ways into which to allocate into;

an allocation unit that allocates the storage elements of the array in response to memory accesses that miss in the cache memory, wherein each of the memory accesses selects a set of the M sets;

wherein each of the memory accesses has an associated memory access type (MAT) of a plurality of predetermined MATs, wherein the MAT is received by the cache memory;

the mapping further, for each chunk of the plurality of chunks, associates one or more MATs of the plurality of MATs with the chunk;

wherein for each memory access of the memory accesses, the allocation unit allocates into a way of the selected set that is included in a chunk of the plurality of chunks intersected by the selected set; and wherein the plurality of predetermined MATs includes at least three from the following list:
- a memory access generated by a hardware prefetcher of the processor;
- a memory access generated by a floating point instruction;
- a memory access generated by a fused microinstruction;
- a memory access generated by a media instruction;
- a memory access generated by an instruction that modifies a memory address;
- a memory access generated by a software prefetch instruction;
- a memory access that loads an architectural descriptor;
- a memory access generated by an instruction that specifies non-temporal data;
- a memory access generated by an instruction that performs no alignment checks;
- a memory access generated by a supervisor privilege level instruction;
- a memory access generated by a zero extend instruction;
- a memory access generated by a masked move instruction;
- a memory access generated by a stack push instruction; and
- a memory access generated by a hardware tablewalk engine of the processor.

10. The set associative cache memory of claim 9, wherein if the mapping does not associate the MAT of the memory access with a chunk intersected by the selected set, the allocation unit allocates into any of the N ways of the selected set.

11. The set associative cache memory of claim 9,
wherein at least one of the N ways of each set is unmapped by the mapping into any of the plurality of chunks; and
if the mapping does not associate the MAT of the memory access with any chunk intersected by the selected set, the allocation unit allocates into one of the at least one of the unmapped ways of the selected set.

12. A method for operating a set associative cache memory having an array of storage elements arranged as M sets by N ways, wherein each set of the M sets belongs in one of L mutually exclusive groups and at least one of the L mutually exclusive groups comprises at least two of the M sets, and an allocation unit that allocates the storage elements of the array in response to memory accesses that miss in the cache memory, wherein each of the memory accesses selects a set of the M sets, the method comprising:

holding a mapping that specifies a plurality of chunks of the array, wherein a chunk encompasses the storage elements of the array that are a logical intersection of one group of the L mutually exclusive groups and one or more ways of the N ways of the array, and wherein the mapping comprises a plurality of replacement policies to select ways into which to allocate into;

wherein each of the memory accesses has an associated memory access type (MAT) of a plurality of predetermined MATs, wherein the MAT is received by the cache memory;

the mapping further, for each chunk of the plurality of chunks, associates one or more MATs of the plurality of MATs with the chunk;

for each memory access of the memory accesses, allocating into a way of the selected set that is included in a chunk of the plurality of chunks intersected by the selected set; and wherein the plurality of predetermined MATs includes at least three from the following list:
- a memory access generated by a hardware prefetcher of the processor;
- a memory access generated by a floating point instruction;
- a memory access generated by a fused microinstruction;
- a memory access generated by a media instruction;
- a memory access generated by an instruction that modifies a memory address;
- a memory access generated by a software prefetch instruction;
- a memory access that loads an architectural descriptor;
- a memory access generated by an instruction that specifies non-temporal data;
- a memory access generated by an instruction that performs no alignment checks;
- a memory access generated by a supervisor privilege level instruction;
- a memory access generated by a zero extend instruction;
- a memory access generated by a masked move instruction;
- a memory access generated by a stack push instruction; and
- a memory access generated by a hardware tablewalk engine of the processor.

13. The method of claim 12, further comprising:
if the mapping does not associate the MAT of the memory access with a chunk intersected by the selected set, allocating into any of the N ways of the selected set.

14. The method of claim 12,
wherein at least one of the N ways of each set is unmapped by the mapping into any of the plurality of chunks; and
if the mapping does not associate the MAT of the memory access with any chunk intersected by the selected set, allocating into one of the at least one of the unmapped ways of the selected set.

15. The method of claim 14, further comprising:
updating the mapping during operation of the cache memory.

16. The method of claim 15, further comprising:
determining that a program is running on the processor, wherein the mapping is determined by offline analysis of the program; and
said updating the mapping in response to said determining that the program is running on the processor.

* * * * *